(12) United States Patent
Tanner et al.

(10) Patent No.: US 12,539,624 B2
(45) Date of Patent: Feb. 3, 2026

(54) NESTED DYNAMICALLY RIGIDIZING ROBOTIC SYSTEMS

(71) Applicant: NEPTUNE MEDICAL INC., Burlingame, CA (US)

(72) Inventors: Neal Tanner, Burlingame, CA (US); Mark C. Scheeff, Oakland, CA (US); Francisco G. Lopez, San Mateo, CA (US)

(73) Assignee: Neptune Medical Inc., Burlingame, CA (US)

( * ) Notice: Subject to any disclaimer, the term of this patent is extended or adjusted under 35 U.S.C. 154(b) by 40 days.

(21) Appl. No.: 18/550,123

(22) PCT Filed: Mar. 10, 2022

(86) PCT No.: PCT/US2022/019711
§ 371 (c)(1),
(2) Date: Sep. 11, 2023

(87) PCT Pub. No.: WO2022/192515
PCT Pub. Date: Sep. 15, 2022

(65) Prior Publication Data
US 2024/0165833 A1    May 23, 2024

Related U.S. Application Data

(60) Provisional application No. 63/159,196, filed on Mar. 10, 2021.

(51) Int. Cl.
*B25J 9/16*         (2006.01)
*A61B 34/30*        (2016.01)
*B25J 18/02*        (2006.01)

(52) U.S. Cl.
CPC ............. *B25J 18/025* (2013.01); *A61B 34/30* (2016.02); *B25J 9/1697* (2013.01); *A61B 2034/301* (2016.02)

(58) Field of Classification Search
USPC .................................................. 700/245–264
See application file for complete search history.

(56) References Cited

U.S. PATENT DOCUMENTS 2,268,321 A    12/1941  Flynn
2,767,705 A    10/1956  Moore
(Continued)

FOREIGN PATENT DOCUMENTS

AU    2013207571 B2    8/2013
CN       2613655 Y     4/2004
(Continued)

OTHER PUBLICATIONS

Dow, Dow white paper: Can you estimate modulus from durometer hardness for silicones: Yes, but you only roughly and you must choose your modulus carefully!; 5 pages; retrieved from the internet (https://www.dow.com/content/dam/dcc/documents/en-us/tech-art/11/11-37/11-3716-01-durometer-hardness-for-silicones.pdf) on Jan. 18, 2023.

(Continued)

*Primary Examiner* — Jonathan L Sample
(74) *Attorney, Agent, or Firm* — Shay Glenn LLP

(57) ABSTRACT

Nested robotic systems including rigidizing members that are configured to aid in transporting a scope, e.g., endoscope, or other medical instrument through a body. These apparatuses may include a first rigidizing device coaxially located relative to a second rigidizing device, a user-activated control for steering, advancing and/or retracting the systems, an actuator to enable axial movement and/or steering of the second rigidizing device, and a controller for coordinating the rigidity of the first and second rigidizing devices. The first and second rigidizing devices may be configured to be rigidized by the application of pressure and/or vacuum.

13 Claims, 24 Drawing Sheets

(56) References Cited

U.S. PATENT DOCUMENTS

| | | |
|---|---|---|
| 3,466,220 A | 9/1969 | Allinikov et al. |
| 3,859,986 A | 1/1975 | Okada et al. |
| 3,998,216 A | 12/1976 | Hosono |
| 4,066,071 A | 1/1978 | Nagel |
| 4,141,364 A | 2/1979 | Schultze |
| 4,151,800 A | 5/1979 | Dotts et al. |
| 4,160,451 A | 7/1979 | Chittenden |
| 4,176,662 A | 12/1979 | Frazer |
| 4,425,919 A | 1/1984 | Alston, Jr. |
| 4,551,140 A | 11/1985 | Shinohara |
| 4,690,131 A | 9/1987 | Lyddy, Jr. et al. |
| 4,696,544 A | 9/1987 | Costella |
| 4,717,379 A | 1/1988 | Ekholmer |
| 4,794,412 A | 12/1988 | Casey et al. |
| 4,794,912 A | 1/1989 | Lia |
| 4,815,450 A | 3/1989 | Patel |
| 4,817,613 A | 4/1989 | Jaraczewski et al. |
| 4,890,602 A | 1/1990 | Hake |
| 4,893,613 A | 1/1990 | Hake |
| 4,913,369 A | 4/1990 | Lia et al. |
| 4,959,058 A | 9/1990 | Michelson |
| 4,961,738 A | 10/1990 | Mackin |
| 4,967,732 A | 11/1990 | Inoue |
| 5,018,436 A | 5/1991 | Evangelista et al. |
| 5,019,121 A | 5/1991 | Krauter |
| 5,037,386 A | 8/1991 | Marcus et al. |
| 5,037,404 A | 8/1991 | Gold et al. |
| 5,050,585 A | 9/1991 | Takahashi |
| 5,105,819 A | 4/1992 | Wollschlager et al. |
| 5,123,421 A | 6/1992 | Sinofsky |
| 5,125,143 A | 6/1992 | Takahashi |
| 5,174,276 A | 12/1992 | Crockard |
| 5,188,595 A | 2/1993 | Jacob |
| 5,193,525 A | 3/1993 | Silverstein et al. |
| 5,201,908 A | 4/1993 | Jones |
| 5,251,611 A | 10/1993 | Zehel et al. |
| 5,337,733 A | 8/1994 | Bauerfeind et al. |
| 5,360,440 A | 11/1994 | Andersen |
| 5,447,148 A | 9/1995 | Oneda et al. |
| 5,496,292 A | 3/1996 | Burnham |
| 5,531,685 A | 7/1996 | Hemmer et al. |
| 5,531,719 A | 7/1996 | Takahashi |
| 5,577,992 A | 11/1996 | Chiba et al. |
| 5,601,588 A | 2/1997 | Tonomura et al. |
| 5,603,991 A | 2/1997 | Kupiecki et al. |
| 5,607,435 A | 3/1997 | Sachdeva et al. |
| 5,624,381 A | 4/1997 | Kieturakis |
| 5,632,734 A | 5/1997 | Galel et al. |
| 5,637,075 A | 6/1997 | Kikawada |
| 5,662,587 A | 9/1997 | Grundfest et al. |
| 5,662,621 A | 9/1997 | Lafontaine |
| 5,746,692 A | 5/1998 | Bacich et al. |
| 5,749,828 A | 5/1998 | Solomon et al. |
| 5,759,151 A | 6/1998 | Sturges |
| 5,779,624 A | 7/1998 | Chang |
| 5,782,811 A | 7/1998 | Samson et al. |
| 5,823,961 A | 10/1998 | Fields et al. |
| 5,882,347 A | 3/1999 | Mouris Laan et al. |
| 5,891,112 A | 4/1999 | Samson |
| 5,891,114 A | 4/1999 | Chin et al. |
| 5,906,591 A | 5/1999 | Dario et al. |
| 5,916,145 A | 6/1999 | Chu et al. |
| 5,916,147 A | 6/1999 | Boury |
| 5,951,539 A | 9/1999 | Nita et al. |
| 5,976,074 A | 11/1999 | Moriyama |
| 6,090,099 A | 7/2000 | Samson et al. |
| 6,159,187 A | 12/2000 | Park et al. |
| 6,162,171 A | 12/2000 | Ng et al. |
| 6,165,123 A | 12/2000 | Thompson |
| 6,179,776 B1 | 1/2001 | Adams et al. |
| 6,190,357 B1 | 2/2001 | Ferrari et al. |
| 6,217,565 B1 | 4/2001 | Cohen |
| 6,296,644 B1 | 10/2001 | Surat et al. |
| 6,309,346 B1 | 10/2001 | Farhadi |
| 6,352,503 B1 | 3/2002 | Matsu et al. |
| 6,364,878 B1 | 4/2002 | Hall |
| 6,368,315 B1 | 4/2002 | Gillis et al. |
| 6,468,203 B2 | 10/2002 | Belson |
| 6,485,409 B1 | 11/2002 | Voloshin et al. |
| 6,503,225 B1 | 1/2003 | Kirsch et al. |
| 6,517,477 B1 | 2/2003 | Wendlandt |
| 6,547,724 B1 | 4/2003 | Soble et al. |
| 6,572,538 B2 | 6/2003 | Takase |
| 6,572,590 B1 | 6/2003 | Stevens et al. |
| 6,579,277 B1 | 6/2003 | Rabiner et al. |
| 6,610,007 B2 | 8/2003 | Belson et al. |
| 6,612,982 B1 | 9/2003 | Ouchi |
| 6,616,628 B2 | 9/2003 | Hayzelden |
| 6,620,126 B2 | 9/2003 | Unsworth et al. |
| 6,623,424 B2 | 9/2003 | Hayakawa et al. |
| 6,712,832 B2 | 3/2004 | Shah |
| 6,726,677 B1 | 4/2004 | Flaherty et al. |
| 6,730,020 B2 | 5/2004 | Peng et al. |
| 6,780,151 B2 | 8/2004 | Grabover et al. |
| 6,783,491 B2 | 8/2004 | Saadat et al. |
| 6,790,173 B2 | 9/2004 | Saadat et al. |
| 6,793,621 B2 | 9/2004 | Butler et al. |
| 6,793,661 B2 | 9/2004 | Hamilton et al. |
| 6,800,056 B2 | 10/2004 | Tartaglia et al. |
| 6,869,393 B2 | 3/2005 | Butler |
| 6,899,673 B2 | 5/2005 | Ogura et al. |
| 6,911,004 B2 | 6/2005 | Kim et al. |
| 6,923,754 B2 | 8/2005 | Lubock |
| 6,960,162 B2 | 11/2005 | Saadat et al. |
| 6,974,411 B2 | 12/2005 | Belson |
| 6,984,203 B2 | 1/2006 | Tartaglia et al. |
| 7,060,199 B2 | 6/2006 | Woydt et al. |
| 7,172,552 B2 | 2/2007 | Wendlandt |
| 7,214,230 B2 | 5/2007 | Brock et al. |
| 7,273,469 B1 | 9/2007 | Chan et al. |
| 7,288,101 B2 | 10/2007 | Deem et al. |
| 7,291,127 B2 | 11/2007 | Eldenschink |
| 7,354,427 B2 | 4/2008 | Fangrow |
| 7,365,509 B2 | 4/2008 | Park et al. |
| 7,438,712 B2 | 10/2008 | Chouinard |
| 7,511,733 B2 | 3/2009 | Takizawa et al. |
| 7,537,562 B2 | 5/2009 | Takano |
| 7,559,916 B2 | 7/2009 | Smith et al. |
| 7,591,782 B2 | 9/2009 | Fujikura |
| 7,598,652 B2 | 10/2009 | Kornbluh et al. |
| 7,658,738 B2 | 2/2010 | Nobis et al. |
| 7,695,428 B2 | 4/2010 | Machida |
| 7,736,323 B2 | 6/2010 | Von Weymarn-Scharli |
| 7,749,196 B2 | 7/2010 | Osborne et al. |
| 7,837,615 B2 | 11/2010 | Le et al. |
| 7,850,725 B2 | 12/2010 | Vardi et al. |
| 7,901,347 B2 | 3/2011 | Sekiguchi et al. |
| 7,909,755 B2 | 3/2011 | Itoi |
| 7,918,819 B2 | 4/2011 | Karmarkar et al. |
| 7,918,845 B2 | 4/2011 | Saadat et al. |
| 7,931,661 B2 | 4/2011 | Saadat et al. |
| 7,935,047 B2 | 5/2011 | Yoshida et al. |
| 7,947,000 B2 | 5/2011 | Vargas et al. |
| 7,957,790 B2 | 6/2011 | Kleen |
| 7,970,455 B2 | 6/2011 | Zilberstein et al. |
| 7,988,621 B2 | 8/2011 | Smith et al. |
| 8,047,236 B2 | 11/2011 | Perry |
| 8,075,476 B2 | 12/2011 | Vargas |
| 8,092,374 B2 | 1/2012 | Smith et al. |
| 8,109,953 B1 | 2/2012 | King, III et al. |
| 8,123,739 B2 | 2/2012 | McQueen et al. |
| 8,125,755 B2 | 2/2012 | Garcia et al. |
| 8,192,422 B2 | 6/2012 | Zubiate et al. |
| 8,206,287 B2 | 6/2012 | Matsuo |
| 8,226,548 B2 | 7/2012 | Kucklick |
| 8,241,299 B2 | 8/2012 | Hibner |
| 8,246,575 B2 | 8/2012 | Viola |
| 8,257,257 B2 | 9/2012 | Takizawa et al. |
| 8,262,677 B2 | 9/2012 | Goto |
| 8,298,161 B2 | 10/2012 | Vargas |
| 8,313,014 B2 | 11/2012 | Bettuchi |
| 8,361,090 B2 | 1/2013 | Belson |
| 8,366,606 B2 | 2/2013 | Watanabe et al. |
| 8,388,519 B2 | 3/2013 | Garcia et al. |

(56) References Cited

U.S. PATENT DOCUMENTS

| | | | |
|---|---|---|---|
| 8,439,825 B2 | 5/2013 | Sekiguchi | |
| 8,460,179 B2 | 6/2013 | Ikeda et al. | |
| 8,485,968 B2 | 7/2013 | Welmer et al. | |
| 8,496,648 B2 | 7/2013 | Rogers | |
| 8,506,479 B2 | 8/2013 | Piskun et al. | |
| 8,517,923 B2 | 8/2013 | Belson et al. | |
| 8,545,491 B2 | 10/2013 | Abboud et al. | |
| 8,550,989 B2 | 10/2013 | Dohi et al. | |
| 8,556,804 B2 * | 10/2013 | Smith | A61B 1/00135 600/184 |
| 8,663,096 B2 | 3/2014 | Viola | |
| 8,663,196 B2 | 3/2014 | Kassab et al. | |
| 8,708,894 B2 | 4/2014 | Smith et al. | |
| 8,721,530 B2 | 5/2014 | Ohline et al. | |
| 8,753,312 B2 | 6/2014 | Bowe et al. | |
| 8,777,844 B1 | 7/2014 | Sadanand | |
| 8,920,369 B2 | 12/2014 | Salahieh et al. | |
| 8,969,639 B2 | 3/2015 | Xu et al. | |
| 8,992,420 B2 | 3/2015 | Maahs et al. | |
| 9,011,318 B2 | 4/2015 | Choset et al. | |
| 9,066,655 B2 | 6/2015 | Stefanchik et al. | |
| 9,114,228 B2 | 8/2015 | Zook et al. | |
| 9,125,653 B2 | 9/2015 | Kovach | |
| 9,155,451 B2 | 10/2015 | Smith et al. | |
| 9,192,284 B2 | 11/2015 | Hirsch et al. | |
| 9,192,288 B2 | 11/2015 | Okaniwa | |
| 9,211,140 B2 | 12/2015 | Lauryssen et al. | |
| 9,220,398 B2 | 12/2015 | Woodley et al. | |
| 9,226,825 B2 | 1/2016 | Starksen et al. | |
| 9,241,611 B2 | 1/2016 | Konno | |
| 9,254,123 B2 | 2/2016 | Alvarez et al. | |
| 9,282,993 B1 * | 3/2016 | Cohen | A61B 17/3421 |
| 9,295,511 B2 | 3/2016 | Smith et al. | |
| 9,333,287 B2 | 5/2016 | Nitsan et al. | |
| 9,358,073 B2 | 6/2016 | Piligian et al. | |
| 9,364,955 B2 | 6/2016 | Oyola et al. | |
| 9,386,910 B2 | 7/2016 | West | |
| 9,498,108 B1 | 11/2016 | Lombardi | |
| 9,498,198 B2 | 11/2016 | Hu et al. | |
| 9,505,125 B2 | 11/2016 | Zubiate et al. | |
| 9,585,546 B2 | 3/2017 | Surti et al. | |
| 9,610,068 B2 | 4/2017 | Kappel et al. | |
| 9,649,473 B2 | 5/2017 | Gregorich et al. | |
| 9,730,755 B2 * | 8/2017 | Wittenberger | A61B 18/1492 |
| 9,763,562 B2 | 9/2017 | Avitsian et al. | |
| 9,814,372 B2 | 11/2017 | Smith et al. | |
| 9,913,570 B2 | 3/2018 | Kucharski et al. | |
| 9,937,324 B2 | 4/2018 | Kim et al. | |
| 9,993,142 B2 | 6/2018 | Salman et al. | |
| 10,092,291 B2 | 10/2018 | Voegele et al. | |
| 10,307,042 B2 | 6/2019 | Lombardi | |
| 10,463,495 B2 | 11/2019 | Rogers et al. | |
| 10,625,413 B1 * | 4/2020 | McPherson | B25J 15/0213 |
| 11,006,975 B1 * | 5/2021 | Cohen | A61B 17/3421 |
| 11,020,214 B2 | 6/2021 | Gupta et al. | |
| 11,122,971 B2 | 9/2021 | Tilson et al. | |
| 11,135,398 B2 | 10/2021 | Tilson et al. | |
| 11,219,351 B2 | 1/2022 | Tilson et al. | |
| 11,478,608 B2 | 10/2022 | Tilson et al. | |
| 11,554,248 B1 | 1/2023 | Tilson et al. | |
| 11,724,065 B2 | 8/2023 | Tilson et al. | |
| 11,744,443 B2 | 9/2023 | Lopez et al. | |
| 11,793,392 B2 | 10/2023 | Tilson et al. | |
| 2001/0041881 A1 | 11/2001 | Sarge et al. | |
| 2002/0049423 A1 | 4/2002 | Howell et al. | |
| 2002/0107478 A1 | 8/2002 | Wendlandt | |
| 2002/0161355 A1 | 10/2002 | Wollschlager | |
| 2003/0023259 A1 | 1/2003 | Dubrul et al. | |
| 2003/0035048 A1 | 2/2003 | Shipp | |
| 2003/0036748 A1 | 2/2003 | Cooper et al. | |
| 2003/0083546 A1 | 5/2003 | Butler et al. | |
| 2003/0122374 A1 | 7/2003 | Ouchi et al. | |
| 2003/0153866 A1 | 8/2003 | Long et al. | |
| 2003/0208220 A1 | 11/2003 | Worley et al. | |
| 2003/0216681 A1 | 11/2003 | Zhang et al. | |
| 2003/0216691 A1 | 11/2003 | Jacobson | |
| 2003/0225379 A1 | 12/2003 | Schaffer et al. | |
| 2004/0019252 A1 | 1/2004 | Hirata | |
| 2004/0044350 A1 | 3/2004 | Martin et al. | |
| 2004/0092960 A1 | 5/2004 | Abrams et al. | |
| 2004/0186349 A1 | 9/2004 | Ewers et al. | |
| 2004/0186350 A1 | 9/2004 | Brenneman et al. | |
| 2004/0242958 A1 | 12/2004 | Fujikawa et al. | |
| 2004/0243227 A1 | 12/2004 | Starksen et al. | |
| 2004/0260236 A1 | 12/2004 | Manning et al. | |
| 2005/0004523 A1 | 1/2005 | Osborne et al. | |
| 2005/0005363 A1 | 1/2005 | Giori et al. | |
| 2005/0010237 A1 | 1/2005 | Niazi | |
| 2005/0085829 A1 | 4/2005 | Kraemer et al. | |
| 2005/0154258 A1 | 7/2005 | Tartaglia et al. | |
| 2005/0165275 A1 | 7/2005 | Von Felten et al. | |
| 2005/0165366 A1 | 7/2005 | Brustad et al. | |
| 2005/0203340 A1 | 9/2005 | Butler et al. | |
| 2005/0261581 A1 | 11/2005 | Hughes et al. | |
| 2005/0272974 A1 | 12/2005 | Iddan | |
| 2005/0277966 A1 | 12/2005 | Ewers et al. | |
| 2006/0041188 A1 | 2/2006 | Dirusso et al. | |
| 2006/0047183 A1 | 3/2006 | Park | |
| 2006/0058582 A1 | 3/2006 | Maahs et al. | |
| 2006/0063973 A1 | 3/2006 | Makower et al. | |
| 2006/0106285 A1 | 5/2006 | Boulais et al. | |
| 2006/0129130 A1 | 6/2006 | Tal et al. | |
| 2006/0178560 A1 | 8/2006 | Saadat et al. | |
| 2006/0192465 A1 | 8/2006 | Kornbluh et al. | |
| 2006/0199999 A1 | 9/2006 | Ikeda et al. | |
| 2006/0235457 A1 | 10/2006 | Belson | |
| 2006/0235458 A1 | 10/2006 | Belson | |
| 2006/0258906 A1 | 11/2006 | Binmoeller | |
| 2006/0264707 A1 | 11/2006 | Kinney | |
| 2006/0264821 A1 | 11/2006 | Vo et al. | |
| 2006/0287666 A1 | 12/2006 | Saadat et al. | |
| 2007/0015965 A1 | 1/2007 | Cox et al. | |
| 2007/0038025 A1 | 2/2007 | Yoshida | |
| 2007/0045504 A1 | 3/2007 | Wollschlager | |
| 2007/0088367 A1 | 4/2007 | Von Weymarn-Scharli | |
| 2007/0100414 A1 | 5/2007 | Licata et al. | |
| 2007/0106302 A1 | 5/2007 | Ortiz | |
| 2007/0118015 A1 | 5/2007 | Wendlandt | |
| 2007/0135803 A1 | 6/2007 | Belson | |
| 2007/0156018 A1 | 7/2007 | Krauter et al. | |
| 2007/0219411 A1 | 9/2007 | Dejima et al. | |
| 2007/0239252 A1 | 10/2007 | Hopkins et al. | |
| 2007/0250113 A1 | 10/2007 | Hegeman et al. | |
| 2007/0250149 A1 | 10/2007 | Depen et al. | |
| 2007/0255101 A1 | 11/2007 | Bar Or | |
| 2007/0260121 A1 | 11/2007 | Bakos et al. | |
| 2007/0282358 A1 | 12/2007 | Remiszewski et al. | |
| 2008/0051635 A1 | 2/2008 | Tanaka et al. | |
| 2008/0058722 A1 | 3/2008 | Oepen et al. | |
| 2008/0091073 A1 | 4/2008 | Park | |
| 2008/0103440 A1 | 5/2008 | Ferren et al. | |
| 2008/0139877 A1 | 6/2008 | Fitzpatrick | |
| 2008/0172037 A1 | 7/2008 | Huang et al. | |
| 2008/0188928 A1 | 8/2008 | Salahieh et al. | |
| 2008/0200762 A1 | 8/2008 | Stokes et al. | |
| 2008/0214893 A1 | 9/2008 | Tartaglia et al. | |
| 2008/0234546 A1 | 9/2008 | Kawano et al. | |
| 2008/0242928 A1 | 10/2008 | Kawano et al. | |
| 2008/0249362 A1 | 10/2008 | Jiang et al. | |
| 2008/0262300 A1 | 10/2008 | Ewers et al. | |
| 2008/0275299 A1 | 11/2008 | Park | |
| 2009/0023983 A1 | 1/2009 | Stefanchik | |
| 2009/0048483 A1 | 2/2009 | Yamamoto | |
| 2009/0062611 A1 | 3/2009 | Toyama | |
| 2009/0062837 A1 | 3/2009 | Gasche et al. | |
| 2009/0062872 A1 | 3/2009 | Chin et al. | |
| 2009/0104250 A1 | 4/2009 | Boyden et al. | |
| 2009/0112063 A1 | 4/2009 | Bakos et al. | |
| 2009/0112064 A1 | 4/2009 | Levey et al. | |
| 2009/0131752 A1 | 5/2009 | Park | |
| 2009/0157068 A1 | 6/2009 | Kallel et al. | |
| 2009/0187163 A1 | 7/2009 | Uihlein | |
| 2009/0240202 A1 | 9/2009 | Drasler et al. | |
| 2009/0248041 A1 | 10/2009 | Williams et al. | |

(56) References Cited

U.S. PATENT DOCUMENTS

| | | |
|---|---|---|
| 2009/0259200 A1 | 10/2009 | Lampropoulos et al. |
| 2009/0264704 A1 | 10/2009 | Shtul |
| 2010/0010308 A1 | 1/2010 | Braun et al. |
| 2010/0010437 A1 | 1/2010 | Miles et al. |
| 2010/0010504 A1 | 1/2010 | Simaan et al. |
| 2010/0016663 A1 | 1/2010 | Maisch et al. |
| 2010/0036363 A1 | 2/2010 | Watanabe et al. |
| 2010/0069712 A1 | 3/2010 | Yamaya |
| 2010/0069716 A1 | 3/2010 | Chin et al. |
| 2010/0076451 A1 | 3/2010 | Zwolinski et al. |
| 2010/0087711 A1 | 4/2010 | Edwards |
| 2010/0137686 A1 | 6/2010 | Meron et al. |
| 2010/0145151 A1 | 6/2010 | Fukunaga et al. |
| 2010/0160735 A1 | 6/2010 | Bakos |
| 2010/0185172 A1 | 7/2010 | Fabro |
| 2010/0204546 A1 | 8/2010 | Hassidov et al. |
| 2010/0268025 A1 | 10/2010 | Belson |
| 2010/0331625 A1 | 12/2010 | Rosemurgy et al. |
| 2010/0331820 A1 | 12/2010 | Prisco et al. |
| 2011/0015729 A1 | 1/2011 | Jimenez et al. |
| 2011/0023888 A1 | 2/2011 | Vazales et al. |
| 2011/0040282 A1 | 2/2011 | Uihlein |
| 2011/0046442 A1 | 2/2011 | Matsushita |
| 2011/0049282 A1 | 3/2011 | Danielsson |
| 2011/0054253 A1 | 3/2011 | Jordá Albiñana et al. |
| 2011/0087070 A1 | 4/2011 | Tilson et al. |
| 2011/0237888 A1 | 9/2011 | Matsushita |
| 2011/0245611 A1 | 10/2011 | Yeh et al. |
| 2011/0282149 A1 | 11/2011 | Vargas et al. |
| 2011/0288553 A1 | 11/2011 | Jansen et al. |
| 2011/0301414 A1 | 12/2011 | Hotto et al. |
| 2011/0306950 A1 | 12/2011 | Cucin |
| 2011/0319714 A1 | 12/2011 | Roelle et al. |
| 2012/0004676 A1 | 1/2012 | Vargas |
| 2012/0022329 A1 | 1/2012 | Wagh et al. |
| 2012/0041291 A1 | 2/2012 | Ferren et al. |
| 2012/0095448 A1 | 4/2012 | Kaji |
| 2012/0095548 A1 | 4/2012 | Gregorich et al. |
| 2012/0108902 A1 | 5/2012 | Frassica et al. |
| 2012/0130173 A1 | 5/2012 | Lutze et al. |
| 2012/0143005 A1 | 6/2012 | Yeh et al. |
| 2012/0165607 A1 | 6/2012 | Ashida et al. |
| 2012/0165792 A1 | 6/2012 | Ortiz et al. |
| 2012/0172651 A1 | 7/2012 | Cutrer |
| 2012/0209062 A1 | 8/2012 | Qiao |
| 2012/0209292 A1 | 8/2012 | Devengenzo et al. |
| 2012/0277528 A1 | 11/2012 | Qiao |
| 2012/0277729 A1 | 11/2012 | Melsheimer |
| 2013/0131641 A1 | 5/2013 | Jimenez et al. |
| 2013/0190565 A1 | 7/2013 | Gora et al. |
| 2013/0274553 A1 | 10/2013 | Piskun |
| 2013/0304179 A1* | 11/2013 | Bialas ............ A61M 25/10184 |
| | | 623/1.11 |
| 2013/0333472 A1* | 12/2013 | Georgeson ......... G01N 29/2418 |
| | | 73/584 |
| 2013/0338440 A1 | 12/2013 | Sinal et al. |
| 2014/0005683 A1 | 1/2014 | Stand et al. |
| 2014/0073853 A1 | 3/2014 | Swisher et al. |
| 2014/0081169 A1 | 3/2014 | Gerding et al. |
| 2014/0088459 A1 | 3/2014 | Roush et al. |
| 2014/0142393 A1 | 5/2014 | Piskun et al. |
| 2014/0155702 A1 | 6/2014 | Tilson et al. |
| 2014/0155783 A1 | 6/2014 | Starksen et al. |
| 2014/0188054 A1 | 7/2014 | Ijima et al. |
| 2014/0228642 A1* | 8/2014 | Vargas ............... A61M 25/0158 |
| | | 600/143 |
| 2014/0243796 A1 | 8/2014 | Tegg et al. |
| 2014/0243873 A1 | 8/2014 | Franklin |
| 2014/0275860 A1 | 9/2014 | Rottenberg et al. |
| 2014/0276601 A1 | 9/2014 | Edward |
| 2014/0276642 A1 | 9/2014 | Cully et al. |
| 2014/0309587 A1* | 10/2014 | Kim .................. B23K 26/361 |
| | | 219/121.72 |
| 2014/0343358 A1 | 11/2014 | Hameed et al. |
| 2014/0371718 A1 | 12/2014 | Alvarez et al. |
| 2014/0371764 A1 | 12/2014 | Oyola et al. |
| 2015/0018616 A1 | 1/2015 | Kumoyama |
| 2015/0038919 A1 | 2/2015 | Bramwell et al. |
| 2015/0073216 A1 | 3/2015 | Papay |
| 2015/0073342 A1 | 3/2015 | Pacheco et al. |
| 2015/0073409 A1 | 3/2015 | Watson et al. |
| 2015/0094656 A1 | 4/2015 | Salahieh et al. |
| 2015/0119640 A1 | 4/2015 | Reydel |
| 2015/0126814 A1 | 5/2015 | Mesallum et al. |
| 2015/0133729 A1 | 5/2015 | Reydel |
| 2015/0142013 A1 | 5/2015 | Tanner et al. |
| 2015/0148602 A1 | 5/2015 | Hill et al. |
| 2015/0148606 A1 | 5/2015 | Rottenberg et al. |
| 2015/0164314 A1 | 6/2015 | Peterson |
| 2015/0216589 A1 | 8/2015 | Wittenberger et al. |
| 2015/0276097 A1 | 10/2015 | Carlson et al. |
| 2015/0335387 A1 | 11/2015 | Atzinger et al. |
| 2015/0342608 A1 | 12/2015 | Hernandez |
| 2015/0369325 A1 | 12/2015 | Bureau et al. |
| 2016/0007832 A1 | 1/2016 | Shimada |
| 2016/0015259 A1 | 1/2016 | Mody et al. |
| 2016/0038002 A1 | 2/2016 | Peters et al. |
| 2016/0058268 A1* | 3/2016 | Salman ................ A61B 1/12 |
| | | 600/149 |
| 2016/0066773 A1 | 3/2016 | Cooper et al. |
| 2016/0096004 A1 | 4/2016 | Gerrans et al. |
| 2016/0129547 A1 | 5/2016 | Duescher et al. |
| 2016/0136393 A1 | 5/2016 | Tsai et al. |
| 2016/0174829 A1 | 6/2016 | Reydel |
| 2016/0198935 A1 | 7/2016 | Choi et al. |
| 2016/0206425 A1 | 7/2016 | Madrid et al. |
| 2016/0270870 A1 | 9/2016 | Kowshik |
| 2016/0279388 A1 | 9/2016 | Barrish et al. |
| 2016/0287059 A1 | 10/2016 | Ha et al. |
| 2016/0324412 A1 | 11/2016 | Hassidov et al. |
| 2017/0023154 A1 | 1/2017 | Jaeker et al. |
| 2017/0156567 A1 | 6/2017 | Kaneko |
| 2017/0157363 A1 | 6/2017 | Barrish et al. |
| 2017/0312920 A1* | 11/2017 | Yip ..................... B25J 18/06 |
| 2017/0333681 A1 | 11/2017 | Di Caprio et al. |
| 2017/0340862 A1 | 11/2017 | Calabrese et al. |
| 2017/0360281 A1 | 12/2017 | Ponsky |
| 2018/0015257 A1 | 1/2018 | Krolik et al. |
| 2018/0043134 A1 | 2/2018 | Alvarez et al. |
| 2018/0064366 A1 | 3/2018 | Sweeney et al. |
| 2018/0085559 A1 | 3/2018 | Laby et al. |
| 2018/0132705 A1 | 5/2018 | Higuchi |
| 2018/0184885 A1 | 7/2018 | St. George |
| 2018/0249893 A1 | 9/2018 | Yeung et al. |
| 2018/0256876 A1 | 9/2018 | Furnish et al. |
| 2018/0263469 A1 | 9/2018 | Okaniwa et al. |
| 2018/0264239 A1 | 9/2018 | Piskun |
| 2018/0289925 A1 | 10/2018 | Palmer et al. |
| 2018/0326197 A1 | 11/2018 | McArthur et al. |
| 2018/0361116 A1 | 12/2018 | Quick et al. |
| 2018/0374603 A1 | 12/2018 | Greenwood |
| 2019/0046012 A1 | 2/2019 | Ikeda |
| 2019/0226447 A1 | 7/2019 | Stecher et al. |
| 2020/0022712 A1 | 1/2020 | Deville et al. |
| 2020/0030575 A1 | 1/2020 | Bogusky et al. |
| 2020/0100653 A1 | 4/2020 | Nakamura |
| 2020/0171276 A1 | 6/2020 | Onozuka |
| 2020/0178763 A1 | 6/2020 | Tilson et al. |
| 2020/0230808 A1* | 7/2020 | Simaan ................ B25J 18/06 |
| 2020/0237198 A1 | 7/2020 | Liu et al. |
| 2020/0315429 A1 | 10/2020 | Russo et al. |
| 2020/0315433 A1 | 10/2020 | Axon et al. |
| 2020/0383677 A1 | 12/2020 | Piligian et al. |
| 2020/0391002 A1 | 12/2020 | Hilton et al. |
| 2021/0000505 A1 | 1/2021 | Lenker et al. |
| 2021/0030260 A1 | 2/2021 | Julian et al. |
| 2021/0045626 A1 | 2/2021 | Hsu et al. |
| 2021/0114507 A1 | 4/2021 | Alexander et al. |
| 2021/0137366 A1 | 5/2021 | Tilson et al. |
| 2021/0197684 A1* | 7/2021 | Graham ............... B60L 53/305 |
| 2021/0228973 A1 | 7/2021 | Conte |
| 2021/0323767 A1 | 10/2021 | Liu et al. |
| 2021/0330938 A1 | 10/2021 | Kendrick et al. |
| 2022/0000355 A1 | 1/2022 | Tilson et al. |

(56) References Cited

U.S. PATENT DOCUMENTS

| | | |
|---|---|---|
| 2022/0104690 A1 | 4/2022 | Tilson et al. |
| 2022/0323166 A1 | 10/2022 | Tilson et al. |
| 2022/0347430 A1 | 11/2022 | Pedersen |
| 2023/0017488 A1 | 1/2023 | Somasundaram et al. |
| 2023/0034024 A1 | 2/2023 | Cope et al. |
| 2023/0070264 A1 | 3/2023 | Leuthardt et al. |
| 2023/0121021 A1 | 4/2023 | Sinay et al. |
| 2023/0138203 A1 | 5/2023 | Bazdanes et al. |
| 2023/0210351 A1 | 7/2023 | Scheeff et al. |
| 2023/0338702 A1 | 10/2023 | Tilson et al. |
| 2023/0346200 A1 | 11/2023 | Tilson et al. |
| 2023/0346204 A1 | 11/2023 | Tilson et al. |
| 2023/0346205 A1 | 11/2023 | Tilson et al. |
| 2023/0346399 A1 | 11/2023 | Schaller et al. |
| 2023/0353879 A1 | 11/2023 | Nishide et al. |
| 2023/0404486 A1 | 12/2023 | Carreel et al. |
| 2023/0404701 A1 | 12/2023 | Romo et al. |
| 2024/0188805 A1 | 6/2024 | Tilson et al. |
| 2025/0025023 A1 | 1/2025 | Tilson et al. |
| 2025/0090801 A1 | 3/2025 | Zayed et al. |
| 2025/0169678 A1 | 5/2025 | Tilson et al. |
| 2025/0262407 A1 | 8/2025 | Tilson et al. |

FOREIGN PATENT DOCUMENTS

| | | | |
|---|---|---|---|
| CN | 1706349 A | 12/2005 | |
| CN | 1732855 A | 2/2006 | |
| CN | 1764800 A | 4/2006 | |
| CN | 1806770 A | 7/2006 | |
| CN | 1861011 A | 11/2006 | |
| CN | 101119765 A | 2/2008 | |
| CN | 101129255 A | 2/2008 | |
| CN | 101888872 A | 11/2010 | |
| CN | 102137628 A | 7/2011 | |
| CN | 201899767 U | 7/2011 | |
| CN | 102711585 A | 10/2012 | |
| CN | 102872519 A | 1/2013 | |
| CN | 103384500 A | 11/2013 | |
| CN | 104168860 A | 11/2014 | |
| CN | 104287684 B | 3/2016 | |
| CN | 105759418 A | 7/2016 | |
| CN | 105813536 A | 7/2016 | |
| CN | 105832279 A | 8/2016 | |
| CN | 106137397 A | 11/2016 | |
| CN | 106455929 A | 2/2017 | |
| CN | 106488744 A | 3/2017 | |
| CN | 106659367 A | 5/2017 | |
| CN | 106823102 A | 6/2017 | |
| CN | 107296584 A | 10/2017 | |
| CN | 107697631 A | 2/2018 | |
| CN | 110077771 A | 8/2019 | |
| CN | 212558299 U | 2/2021 | |
| DE | 102005039601 A1 | 2/2007 | |
| EP | 401129 A1 | 12/1990 | |
| EP | 0941743 A2 | 9/1999 | |
| EP | 1662972 A2 | 6/2006 | |
| EP | 1695657 A1 | 8/2006 | |
| EP | 1487318 B1 | 3/2008 | |
| EP | 2016914 A2 | 1/2009 | |
| EP | 1499227 B1 | 10/2010 | |
| EP | 2258322 A2 | 12/2010 | |
| EP | 2364637 A1 | 9/2011 | |
| EP | 2368481 A1 | 9/2011 | |
| EP | 2368483 A1 | 9/2011 | |
| EP | 3256052 A1 | 12/2017 | |
| EP | 2604175 B1 | 11/2019 | |
| GB | 2482355 A | 10/2010 | |
| GB | 2497544 A | 6/2013 | |
| JP | S6289014 A | 4/1987 | |
| JP | H05220102 A | 8/1993 | |
| JP | H05293077 A | 11/1993 | |
| JP | H0644503 U | 6/1994 | |
| JP | H06335531 A | 12/1994 | |
| JP | 2002125921 A | 5/2002 | |
| JP | 2003501197 A | 1/2003 | |
| JP | 2003508133 A | 3/2003 | |
| JP | 2005152300 A | 6/2005 | |
| JP | 2005323778 A | 11/2005 | |
| JP | 2006068449 A | 3/2006 | |
| JP | 03965108 B2 | 8/2007 | |
| JP | 2009506839 A | 2/2009 | |
| JP | 2009507617 A | 2/2009 | |
| JP | 2009061173 A | 3/2009 | |
| JP | 2010000360 A | 1/2010 | |
| JP | 2011194126 A | 10/2011 | |
| JP | 2012183232 A | 9/2012 | |
| JP | 2013514150 A | 4/2013 | |
| JP | 2013176465 A | 9/2013 | |
| JP | 2014124475 A | 7/2014 | |
| JP | 2015525609 A | 9/2015 | |
| JP | 2018500054 A | 1/2018 | |
| JP | 2018514350 A | 6/2018 | |
| JP | 2018525197 A | 9/2018 | |
| JP | 2018537229 A | 12/2018 | |
| JP | 6829351 B1 | 2/2021 | |
| JP | 2021175686 A | 11/2021 | |
| KR | 10-2015-0131502 A | 11/2015 | |
| KR | 20180053852 A | 5/2018 | |
| KR | 101908933 B1 | 10/2018 | |
| WO | WO97/43941 A1 | 11/1997 | |
| WO | WO99/053827 A1 | 10/1999 | |
| WO | WO03/013348 A1 | 2/2003 | |
| WO | WO2005/110199 A1 | 11/2005 | |
| WO | WO2005/110200 A1 | 11/2005 | |
| WO | WO2007/035931 A2 | 3/2007 | |
| WO | WO2008/041809 A1 | 4/2008 | |
| WO | WO2008/122969 A1 | 10/2008 | |
| WO | WO2008/122997 A1 | 10/2008 | |
| WO | WO2009/154192 A1 | 12/2009 | |
| WO | WO2011/018147 A1 | 2/2011 | |
| WO | WO2011/018157 A1 | 2/2011 | |
| WO | WO2011/148172 A2 | 12/2011 | |
| WO | WO2012/054480 A2 | 4/2012 | |
| WO | WO2012/080947 A1 | 6/2012 | |
| WO | WO2012/122288 A2 | 9/2012 | |
| WO | WO2013/132992 A1 | 9/2013 | |
| WO | WO-2013184192 A2 * | 12/2013 | ......... A61B 1/00148 |
| WO | WO2016/034598 A1 | 3/2016 | |
| WO | WO2016/190324 A1 | 12/2016 | |
| WO | WO2017/041052 A1 | 3/2017 | |
| WO | WO2018/035452 A1 | 8/2017 | |
| WO | WO2019/054867 A1 | 3/2019 | |
| WO | WO2019/160865 A1 | 8/2019 | |
| WO | WO-2020018934 A1 * | 1/2020 | ........ A61M 25/0097 |
| WO | WO2020/214221 A1 | 10/2020 | |
| WO | WO2020/237426 A1 | 12/2020 | |
| WO | WO2021/202336 A1 | 10/2021 | |
| WO | WO2021/242884 A1 | 12/2021 | |
| WO | WO2022/051682 A1 | 3/2022 | |
| WO | WO2022/087093 A1 | 4/2022 | |
| WO | WO2022/146939 A1 | 7/2022 | |
| WO | WO2022/159861 A1 | 7/2022 | |
| WO | WO2023/122667 A1 | 6/2023 | |
| WO | WO2023/122767 A2 | 6/2023 | |
| WO | WO2023/133403 A1 | 7/2023 | |
| WO | WO2023/154743 A2 | 8/2023 | |

OTHER PUBLICATIONS

Entrada® colonic overtube product brochure downloaded from internet http://www.usendoscopy.com/~/media/Files/Documents/Spec-Sheet-International/760358c_entrada_intl_ss_web.pdf Accessed Date: Jun. 5, 2017 (the year of publication is sufficiently earlier than the effective U.S. filing date and any foreign priority date so that the particular month of publication is not in issue) 2009.

Filip et al.; Design, Implementation, and Testing of a miniature self-stabilizing capsule endoscope with wireless image transmission capabilities; Intl. Journal "Information Technologies & Knowledge": 5(1), downloaded from http://www.foibg.com/ijitk/ijitk-vol05/ijitk05-1-p01.pdf on Jul. 28, 2016; (the year of publication is sufficiently earlier than the effective U.S. filing date and any foreign priority date so that the particular month of publication is not in issue) 2011.

(56) References Cited

OTHER PUBLICATIONS

Loeve et al.; Endoscope Shaft-Rigidity Control Mechanism: "FORGUIDE"; IEEE Trans. on Biomed. Eng.; 59(2); pp. 542-551; Feb. 2012.
Loeve et al.; Vacuum packed particles as flexible endoscope guides with controllable rigidity; Granular Matter; 12(6); pp. 543-554; Jun. 24, 2010.
Shah et al.; Magnetic Imaging of Colonoscopy: An Audit of Looping, Accuracy and Ancillary maneuvers; Gastrointest. Endosc.; 52(1); pp. 1-8; Jul. 1, 2000.
Simi et al.; Design, Fabrication, and Testing of a Capsule With Hybrid Locomotion for Gastrointestinal Tract Exploration; IEEE/ASME Trans on Mechatronics; 15(2); pp. 170-x; Apr. 2010.
Valdastri et al.; Advanced Technologies for Gastrointestinal Endoscopy; Annu. Rev. Biomed. Eng.; 14; pp. 397-429; May 2012.
Zhao et al.; Development of a variable stiffness over tube based on low-melting-point-alloy for endoscopic surgery; J. Med. Devices; 10(2); 8 pages; May 12, 2016.
Gomes et al.; U.S. Appl. No. 18/044,027 entitled "Dynamically rigidizing guiderail and methods of use," filed Mar. 3, 2023.
Gomes et al.; U.S. Appl. No. 18/263,517 entitled "Devices and methods to prevent inadvertent motion of dynamically rigidizing apparatuses," filed Jul. 28, 2023.
Lopez et al.; U.S. Appl. No. 18/334,555 entitled "Layered walls for rididizing devices," filed Jun. 14, 2023.
Tilson et al.; U.S. Appl. No. 18/262,904 entitled "Large diameter hemostasis valves," filed Jul. 25, 2023.
Tilson et al.; U.S. Appl. No. 18/235,719 entitled "External working channels," filed Aug. 18, 2023.
Tilson et al.; U.S. Appl. No. 18/592,516 entitled "Device and method for enhanced visualization of the small intestine," filed Feb. 29, 2024.
Tilson et al.; U.S. Appl. No. 18/660,205 entitled "Device and method for enhanced visualiztion of the small intestine," filed May 9, 2024.
Bearing Works; PTFE Datasheet; 2 pages; Jan. 21, 2021 retrieved from the internet (https://www.bearingworks.com/uploaded-assets/pdfs/retainers/ptfe-datasheet.pdf) on Nov. 10, 2023.
Mayinger et al.; Disposable-sheath, flexible gastroscope system versus standard gastroscopes: a prospective, randomized trial; Gastrointestinal Endoscopy; 50(4); pp. 461-467; Oct. 1999.
Ofstead et al.; A systematic review of disposable sheath use during flexible endoscopy; AORN Journal; 109(6); pp. 757-771; Jun. 2019.
Rothstein et al.; Disposable, sheathed, flexible sigmoidoscopy: a prospective, multicenter, randomized trial; Gastrointestinal Endoscopy; 41(6); pp. 566-572; Jun. 1995.
Sardinha et al.; Efficiency and productivity of a sheathed fiberoptic sigmoidoscope compared with a conventional sigmoidoscope; Diseases of the Colon and Rectum; 40(10); pp. 1248-1253; Oct. 1997.
Mayinger et al.; Disposable protection for flexible gastroenterologic endoscopy: prospective comparative evaluation of a new gastroscopy system (Endosheath) compared to the standard fiberglass gastroscope; (English Abstract Only); Zeitschrift Fur Gastrenterologia; 36(6); pp. 501-507; Jun. 1998 (Eng Abs only).
Tilson et al.; U.S. Appl. No. 18/751,188 entitled "Rigidzing overtube," filed Jun. 21, 2024.
Lopez et al.; U.S. Appl. No. 18/723,414 entitled "Methods and apparatuses for reducing curvature of a colon," filed Jun. 21, 2024.
Gomes et al.; U.S. Appl. No. 18/723,413 entitled "Obturator with stiff distal cannula engagement region," filed Jun. 21, 2024.
Morris et al.; U.S. Appl. No. 18/727,032 entitled "Reconfigurable rigidizing structures," filed Jul. 5, 2024.
Tilson et al.; U.S. Appl. No. 18/780,429 entitled "Device for endoscopic advancement through the small intestine," filed Jul. 22, 2024.
Eisler et al.; U.S. Appl. No. 18/852,419 entitled "Rigidizing aspiration systems and methods," filed Sep. 27, 2024.
Tilson et al.; U.S. Appl. No. 18/809,322 entitled "Rigidizing overtube," filed Aug. 19, 2024.
Tilson et al.; U.S. Appl. No. 18/810,458 entitled "Rigidizing overtube," filed Aug. 20, 2024.
Gomes et al.; U.S. Appl. No. 18/837, 186 entitled "Dynamically rigidizing composite medical structure," filed Aug. 8, 2024.
Tilson et al.; U.S. Appl. No. U.S. Appl. No. 18/858,743 entitled "Managing and manipulating a long length robotic endoscope," filed Oct. 21, 2024.
Witte et al.; U.S. Appl. No. 18/829,229 entitled "Pressure rigidization apparatuses and methods," filed Sep. 9, 2024.
Gomes et al.; U.S. Appl. No. 18/806,692 entitled "Devices and methods to prevent inadvertent motion of dynamically rigidizing apparatuses," filed Aug. 15, 2024.
Devengenzo et al.; U.S. Appl. No. 18/902,906 entitled "Telescoping robot," filed Sep. 30, 2024.
Ferrante et al.; U.S. Appl. No. 18/851,053 entitled "Methods and apparatuses for navigating using a pair of rigidizing devices," filed Sep. 25, 2024.
Tilson et al.; U.S. Appl. No. 18/908,776 entitled ; "Methods of attaching a rigidizing sheath to an endoscope," filed Oct. 7, 2024.
Tilson et al.; U.S. Appl. No. 19/100,929 entitled "Dynamic rigidization methods and apparatuses," filed Feb. 3, 2025.
Devengenzo et al.; U.S. Appl. No. 19/210,595 entitled "Telescoping robot," filed May 16, 2025.
Tilson et al.; U.S. Appl. No. 19/210,485 entitled "Methods of attaching a rigidizing sheath to an endoscope," filed May 16, 2025.
Tilson et al.; U.S. Appl. No. 18/867,004 entitled "External working channels for endoscopic devices," filed Nov. 18, 2024.
Tilson et al.; U.S. Appl. No. 19/011,512 entitled "External working channels," filed Jan. 6, 2025.

\* cited by examiner

NESTED DYNAMICALLY RIGIDIZING ROBOTIC SYSTEMS

CLAIM OF PRIORITY

This application is the U.S. National Stage Entry of International Patent Application No. PCT/US2022/019711, titled "CONTROL OF ROBOTIC DYNAMICALLY RIGIDIZING COMPOSITE MEDICAL STRUCTURES," filed on Mar. 10, 2022, now Publication No. WO 2022/192515 A9, which claims priority to U.S. provisional application No. 63/159,196, titled "CONTROL OF ROBOTIC DYNAMICALLY RIGIDIZING COMPOSITE MEDICAL STRUCTURES," filed on Mar. 10, 2021, each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Inserting medical instruments through the body, including through natural body cavities may be useful for a variety of medical procedures, but can be challenging. During medical procedures, the interventional medical instrument can curve or loop through the anatomy, making advancement of the medical device difficult.

For example, gastrointestinal looping, caused when the endoscope can no longer advance due to excessive curving or looping of the gastrointestinal tract, is a particularly well-known clinical challenge for endoscopy. Indeed, one study found that looping occurred in 91 of 100 patients undergoing colonoscopy (Shah et al, "Magnetic Imaging of Colonoscopy: An Audit of Looping, Accuracy and Ancillary maneuvers." *Gastrointest Endosc* 2000; 52: 1-8). Gastrointestinal looping prolongs the procedure and can cause pain to the patient because it can stretch the vessel wall and the mesentery. Furthermore, gastrointestinal looping leads to an increased incidence of perforations. In severe cases of gastrointestinal looping, complete colonoscopies are impossible since looping stretches the length of the colon and the colonoscope is not long enough to reach the end. Gastrointestinal looping is an impediment to precise tip control, denying the user the coveted one-to-one motion relationship between the handle and the endoscope tip. Such problems commonly occur across a wide range of endoscopic procedures, including colonoscopy, esophagogastroduodenoscopy (EGD), enteroscopy, endoscopic retrograde cholangiopancreatography (ERCP), interventional endoscopy procedures (including ESD (Endoscopic Submucosal Dissection) and EMR (Endoscopic Mucosal Resection)), robotic flexible endoscopy, trans-oral robotic surgery (TORS), altered anatomy cases (including Roux-en-Y), and during NOTES (Natural Orifice Transluminal Endoscopic Surgery) procedures. Accordingly, there is a need for device that helps prevent gastrointestinal looping to provide more successful access to the gastrointestinal tract.

Similar difficulties in advancing medical instruments can arise, for example, during interventional procedures in the lungs, kidneys, brain, cardiac space, and other anatomical locations. Accordingly, there is a need for a device that can provide safe, efficient, and precise access to otherwise difficult to reach anatomical locations.

SUMMARY OF THE DISCLOSURE

Described herein are apparatuses (e.g., system, devices, etc., including nested systems) and method for performing an procedure within a body, such as a medical procedure. For example, described herein are robotically controlled access systems for visualizing and providing access within a body region, and methods of using them. Any of these apparatuses and methods may include nested rigidizing devices that may be alternatively rigidized by the application of pressure (positive and/or negative pressure). For example the apparatus may include a first (e.g., inner) rigidizing member that is nested within the second (e.g., outer) rigidizing member) so that the two may axially slide relative to each other. These apparatuses may generally include a user-activated control (e.g., a user input) including one or more inputs for guiding movement of apparatus, including advancing and/or retracing the apparatus, and in particular, advancing and/or retracting the first (e.g., inner) rigidizing member and the second (e.g., outer) rigidizing member. The user-activated control may also include on or more controls for steering either or both the first and second rigidizing members.

In general, the nested rigidizing members may be rigidized by the application of pressure (e.g., by the application of positive pressure or by the application of negative pressure).

In general, these apparatuses may be configured to coordinate the movement of the nested first (e.g., inner) and second (e.g., outer) rigidizing members. For example, any of these apparatuses may include a controller that may coordinate input from the user-activated controller and may automatically toggle the first rigidizing member and the second rigidizing members between the rigid state and the unrigid (e.g., flexible) states. The controller may include one or more processors and control circuitry and may receive input from one or more sensors. The sensors may provide input to the controller on the absolute or relative positions of the first and/or second rigidizing member, and/or the rigidity (e.g., pressure) of the first and/or second rigidizing member.

In examples in which the rigidity of the first rigidizing member and the second rigidizing member are controlled by pressure, the apparatus may include one or more pressure regulators to regulate the application of pressure to the first rigidizing device and the second rigidizing device. The pressure regulator may be integrated with the controller or separate and coupled to the controller. The pressure regulator may include or may be configured to couple to a source of positive and/or negative pressure. The pressure regulator and/or controller may include one or more switches and/or valves for switching pressure between the first rigidizing member and the second rigidizing member. The pressure regulator may maintain the pressure (and therefore the rigidity) of the first and/or second rigidizing member. The pressure regulator may be configured to rapidly switch the first and/or second rigidizing member between an unrigidized (e.g., flexible) and one or more rigid (rigidized) states. In general, the controller may include executable instructions for switching the pressure applied between the first and second rigidizing members to control the rigidity of the first and second rigidizing members. The controller may be configured to automatically or semi-automatically control the rigidity of the first and second rigidizing member so that the user may input controls from the user-activated control for steering, advancing and/or retracting the apparatus without having to manually switch between the rigidized or unrigidized states.

For example, described herein are nested robotic systems, comprising: a first rigidizing device; a second rigidizing device positioned radially within the first rigidizing device, the second rigidizing device axially slideable relative to the first rigidizing device; and a user-activated control, the control comprising: at least one actuator configured to enable axial movement or steering of the second rigidizing device; and at least one actuator configured, upon activation, to sequentially: rigidize the second rigidizing device; unrigidize the first rigidizing device; move the unrigidized first rigidizing device over the rigidized second rigidizing device; rigidize the first rigidizing device; and unrigidize the second rigidizing device.

The at least one actuator may be configured to move the unrigidized first rigidizing device over the rigidized second rigidizing device to a preset or sensor-determined position relative to the second rigidizing device.

In any of these apparatuses (e.g., nested robotic systems), the first and second rigidizing devices may be configured to be rigidized by the application of pressure or vacuum.

For example, a nested robotic system may include: a first rigidizing device; a second rigidizing device positioned radially within the first rigidizing device, the second rigidizing device axially slideable relative to the first rigidizing device; and a user-activated control, the control comprising: at least one actuator configured to enable axial movement or steering of the second rigidizing device; and at least one actuator configured, upon activation, to sequentially: rigidize the second rigidizing device; unrigidize the first rigidizing device; move the unrigidized first rigidizing device over the rigidized second rigidizing device until a user deactivates the actuator; rigidize the first rigidizing device; and unrigidize the second rigidizing device.

Any of these apparatuses (e.g., nested robotic systems) may include a controller configured to automatically terminate movement of the unrigidized first rigidizing device over the rigidized second rigidizing device if a preset or sensor-determined position relative to the second rigidizing device is reached.

In some examples a nested robotic system includes: a first rigidizing device; a second rigidizing device positioned radially within the first rigidizing device, the second rigidizing device axially slideable relative to the first rigidizing device; and a user-activated control, the control comprising: at least one first actuator configured to enable axial movement of the first rigidizing device or the second rigidizing device; and at least one second actuator configured to toggle the at least one first actuator between modes such that, in a first mode, the at least one first actuator enables axial movement of the first rigidizing device and, in a second mode, the at least one first actuator enables axial movement of the second rigidizing device; further wherein a user activates the second actuator to toggle from the first mode to the second mode, the first rigidizing device is automatically rigidized and the second rigidizing device is automatically unrigidized, and wherein the user activates the second actuator to toggle from the second mode to the first mode, the second rigidizing is automatically rigidized and the first rigidizing device is automatically unrigidized.

Any of these nested robotic systems may include: a first rigidizing device; a second rigidizing device positioned radially within the first rigidizing device and including a plurality of cables configured to steer a distal end of the second rigidizing device, wherein the second rigidizing device is axially slideable relative to the first rigidizing device; and a controller configured to alternately translate the first rigidizing device and the second rigidizing device and to alternately rigidize the first rigidizing device and the second rigidizing device, wherein the controller is further configured to adjust a tension on the cables to compensate for unintended deflection of the distal end caused by the first rigidizing device sliding thereover.

The system may further comprise a tension sensor configured to detect a tension in one or more of the plurality of cables, wherein the controller is configured to adjust the tension based upon an output from the tension sensor. The nested robotic system of claim 8, wherein the second rigidizing device comprises a camera at a distal end thereof, and wherein the controller is configured to adjust the tension based upon an image from the camera.

Any of these nested robotic systems may include: a first rigidizing device; a second rigidizing device positioned radially within the first rigidizing device and including a plurality of cables configured to steer a distal end of the second rigidizing device, wherein the second rigidizing device is axially slideable relative to the first rigidizing device; and a controller configured to alternately translate the first rigidizing device and the second rigidizing device and to alternately rigidize the first rigidizing device and the second rigidizing device, wherein the controller is further configured to limit a tension on the cables to less than a threshold amount to reduce unintended deflection of the first rigidizing device as the second rigidizing device is slid therethrough.

For example, a nested robotic system may include: a first rigidizing device; a second rigidizing device positioned radially within the first rigidizing device and, wherein the second rigidizing device is axially slideable relative to the first rigidizing device; and a controller configured to alternately translate the first rigidizing device and the second rigidizing device and to alternately rigidize the first rigidizing device and the second rigidizing device to induce a shape copying sequence within an anatomical lumen, wherein the controller is further configured to relax a curvature of the system within the anatomical lumen after the shape copying sequence.

In some examples the nested robotic system includes: a first rigidizing device; and a second rigidizing device positioned radially within the first rigidizing device, the second rigidizing device axially slideable relative to the first rigidizing device; wherein the first and second rigidizing devices are configured to alternately translate and to alternately rigidize by vacuum or pressure; further wherein a diameter of the first rigidizing device is tapered from a larger diameter at a proximal end of the first rigidizing device to a smaller diameter at a distal end of the first rigidizing device.

Any of these nested robotic systems may include: a first rigidizing device comprising an annular wall comprising inner layer and an outer layer; and a second rigidizing device positioned radially within the first rigidizing device, the second rigidizing device comprising an annular wall comprising inner layer and an outer layer, wherein the second rigidizing device is configured to axially slideable relative to the first rigidizing device; wherein the first and second rigidizing devices are configured to alternately translate and to alternately rigidize by an application of vacuum or pressure; further wherein an annular gap between the inner layer and the outer layer of the first rigidizing device or the second rigidizing device is tapered from a larger diameter at a proximal end of the system to a smaller diameter at a distal end of the system.

In some examples the nested robotic system comprises: a first rigidizing device; and a second rigidizing device positioned radially within the first rigidizing device, the second rigidizing device axially slideable relative to the first rigidizing device; wherein the first and second rigidizing devices are configured to alternately translate and to alternately rigidize by vacuum or pressure; and a set of tensioning elements configured to maintain tension on the first and second rigidizing devices as the first and second rigidizing devices are withdrawn.

In any of these apparatuses the tensioning elements are drive wheels.

For example, a nested robotic system may include: a first rigidizing device; a second rigidizing device positioned radially within the first rigidizing device, the second rigidizing device axially slideable relative to the first rigidizing device, wherein the first and second rigidizing devices are configured to be rigidized by the application of pressure or vacuum; and a user-activated control, the control comprising: at least one first actuator configured to control pitch and roll of a distal end of the second rigidizing device; and at least one second actuator configured to toggle the at least one actuator between modes such that, in a first mode, the at least one first actuator controls the pitch and roll of the distal end of the second rigidizing device and, in a second mode, the at least one first actuator controls axial twisting of the device.

For example, a nested robotic system may include: a first rigidizing device configured to be rigidized by the application of pressure or vacuum; a second rigidizing device positioned coaxially within the first rigidizing device, the second rigidizing device axially slideable relative to the first rigidizing device and configured to be rigidized by the application of pressure or vacuum; at least one actuator configured to enable axial movement or steering of the second rigidizing device; and a controller, the controller comprising: a pressure regulator configured to regulate the application of pressure to the first rigidizing device and the second rigidizing device; wherein the controller is configured to control the application of pressure between the first and second rigidizing devices to sequentially: rigidize the second rigidizing device; unrigidize the first rigidizing device; move or permit movement of the unrigidized first rigidizing device over the rigidized second rigidizing device; rigidize the first rigidizing device; and unrigidize the second rigidizing device.

The controller may be configured to automatically coordinate the application of pressure between the first and second rigidizing devices. In some examples the controller is configured to couple the pressure regulator to a source of pressure. The controller may include one or more processors and a memory coupled to the one or more processors, the memory configured to store computer-program instructions, that, when executed by the one or more processors, perform a computer-implemented method comprising: rigidizing the second rigidizing device; unrigidizing the first rigidizing device; move or permit movement of the unrigidized first rigidizing device over the rigidized second rigidizing device; rigidizing the first rigidizing device; and unrigidizing the second rigidizing device.

In some examples the controller is configured to move the unrigidized first rigidizing device over the rigidized second rigidizing device to a preset or sensor-determined position relative to the second rigidizing device. The controller may be configured to terminate movement of the unrigidized first rigidizing device over the rigidized second rigidizing device if a preset or sensor-determined position relative to the second rigidizing device is reached. The controller may be configured to unrigidize the first rigidizing device by fully unrigidizing the first rigidizing device. The controller may be configured to articulate the at least one actuator to move and/or steer the second rigidizing device.

In some examples the first and second rigidizing devices may be configured to be rigidized by the application of pressure.

The at least one actuator may comprise at least one cable (or tendon), and the controller may be further configured to adjust a tension on the at least one cable to compensate for unintended deflection of a distal end caused by the first rigidizing device sliding thereover. Any of these apparatuses may include a tension sensor configured to detect a tension in the at least one cable, wherein the controller is configured to adjust the tension based upon an output from the tension sensor. In some examples the second rigidizing device comprises a camera at a distal end thereof, and wherein the controller is configured to adjust the tension based upon an image from the camera.

The controller may be further configured to limit a tension on the at least one cable to less than a threshold amount to reduce unintended deflection of the first rigidizing device as the second rigidizing device is slid therethrough. In some examples a diameter of the first rigidizing device is tapered from a larger diameter at a proximal end of the first rigidizing device to a smaller diameter at a distal end of the first rigidizing device.

For example, a nested robotic system may include: a first rigidizing device configured to be rigidized by the application of pressure or vacuum; a second rigidizing device positioned coaxially within the first rigidizing device, the second rigidizing device axially slideable relative to the first rigidizing device and configured to be rigidized by the application of pressure or vacuum; at least one actuator configured to enable axial movement or steering of the second rigidizing device; a user-activated control configured to received a first user input to advance or retract the first rigidizing device and a second user input to advance or retract the second rigidizing device; a controller, the controller comprising: a pressure regulator configured to regulate the application of pressure to the first rigidizing device and the second rigidizing device; wherein the controller is configured to control the application of pressure between the first and second rigidizing devices to unrigidize the first rigidizing device and to rigidize the second rigidizing device when the first user input is selected, and to rigidize the first rigidizing device and to unrigidize the second rigidizing device when the second user input is selected.

Also described herein are methods of advancing through a body lumen using any of these apparatuses. For example, a method may include: inserting a first rigidizing device into the body lumen while the first rigidizing device is in a flexible configuration; supplying vacuum or pressure to the first rigidizing device to transition the first rigidizing device into a rigid configuration; inserting a second rigidizing device in a flexible configuration through the first rigidizing device while the first rigidizing device is in the rigid configuration such that the second rigidizing device takes on a shape of the first rigidizing device in the rigid configuration; supplying vacuum or pressure to the second rigidizing device to transition the second rigidizing device from the flexible configuration to a rigid configuration; fixing a distal end of the first or second rigidizing devices relative to the body lumen; transitioning both the first and second rigidizing devices to the flexible configuration; and pulling proximally on the first and second rigidizing devices to straighten the body lumen.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which.

DETAILED DESCRIPTION

In general, described herein are apparatuses including one or more rigidizing devices (including, but not limited to overtubes) and combinations of rigidizing devices, including nested rigidizing devices, that are configured to aid in transporting a scope, e.g., endoscope, or other medical instrument through a curved or looped portion of the body (e.g., a vessel). In particular, described herein are apparatuses (systems, methods, etc., including robotic systems) having nested rigidizing devices that may be advanced into a region of a body in a controlled manner by alternating between rigidized and unrigidized configurations. The apparatuses described herein may be configured to automate and coordinate the rigidization state of both of the nested rigidizable devices in a manner that provides for easier, more accurate and/or more intuitive operation of these apparatuses while permitting navigation of even highly tortious body regions.

The rigidizing devices can be long, thin, and hollow and can transition quickly from a flexible configuration (i.e., one that is relaxed, limp, or floppy) to a rigid configuration (i.e., one that is stiff and/or holds the shape it is in when it is rigidized). These rigidizing devices may be referred to herein as rigidizing members. A plurality of layers (e.g., coiled or reinforced layers, slip layers, braided layers, bladder layers and/or sealing sheaths) can together form the wall of the rigidizing devices. The rigidizing devices can transition from the flexible configuration to the rigid configuration, for example, by applying a vacuum or pressure to the wall of the rigidizing device or within the wall of the rigidizing device. With the vacuum or pressure removed, the layers can easily shear or move relative to each other. With the vacuum or pressure applied, the layers can transition to a condition in which they exhibit substantially enhanced ability to resist shear, movement, bending, torque and buckling, thereby providing system rigidization.

The rigidizing devices described herein can provide rigidization for a variety of medical applications, including catheters, sheaths, scopes (e.g., endoscopes), wires, overtubes, trocars or laparoscopic instruments. The rigidizing devices can function as a separate add-on device or can be integrated into the body of catheters, sheaths, scopes, wires, or laparoscopic instruments. The devices described herein can also provide rigidization for non-medical structures.

Figure 1:
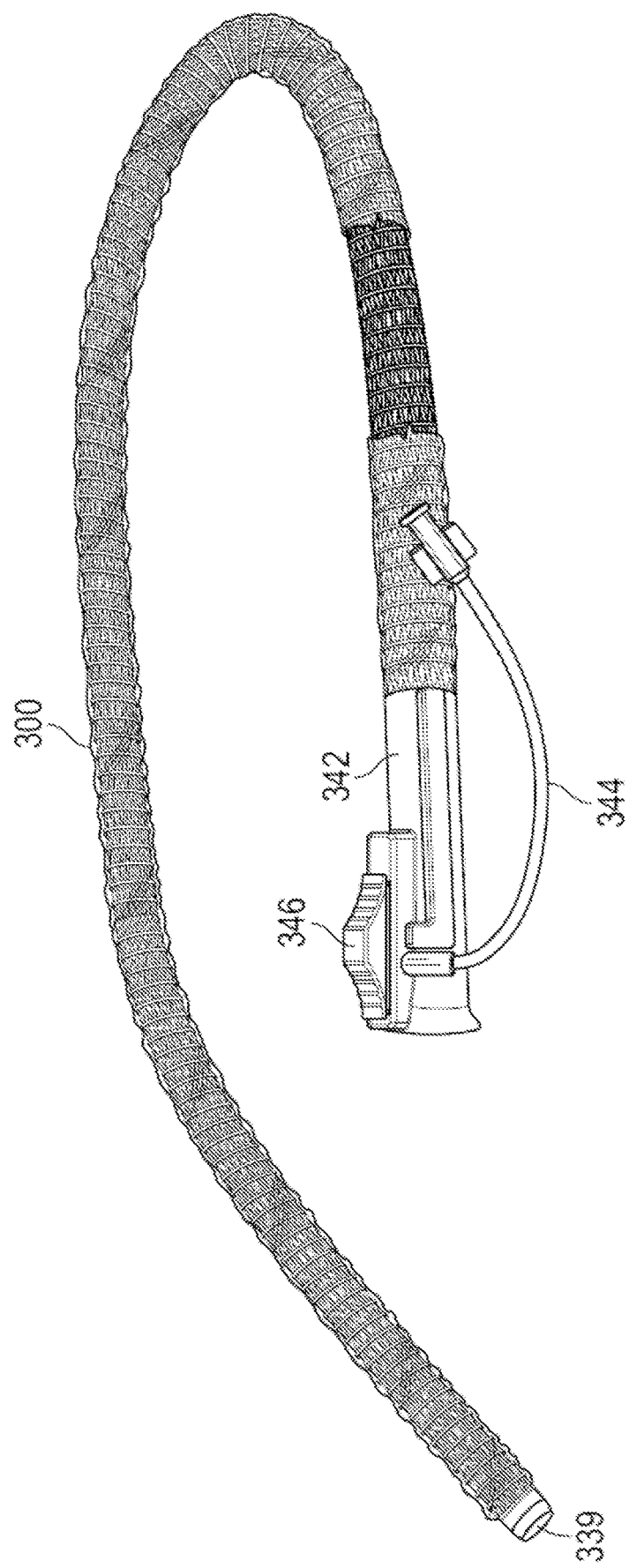
FIG. 1 shows a rigidizing device.

An exemplary rigidizing device system is shown in FIG. 1. The system includes a rigidizing device 300 having a wall with a plurality of layers including a braid layer, an outer layer (part of which is cut away to show the braid thereunder), and an inner layer. The system further includes a handle 342 having a vacuum or pressure inlet 344 to supply vacuum or pressure to the rigidizing device 300. An actuation element 346 can be used to turn the vacuum or pressure on and off to thereby transition the rigidizing device 300 between flexible and rigid configurations. The distal tip 339 of the rigidizing device 300 can be smooth, flexible, and atraumatic to facilitate distal movement of the rigidizing device 300 through the body. Further, the tip 339 can taper from the distal end to the proximal end to further facilitate distal movement of the rigidizing device 300 through the body.

Figure 2A:
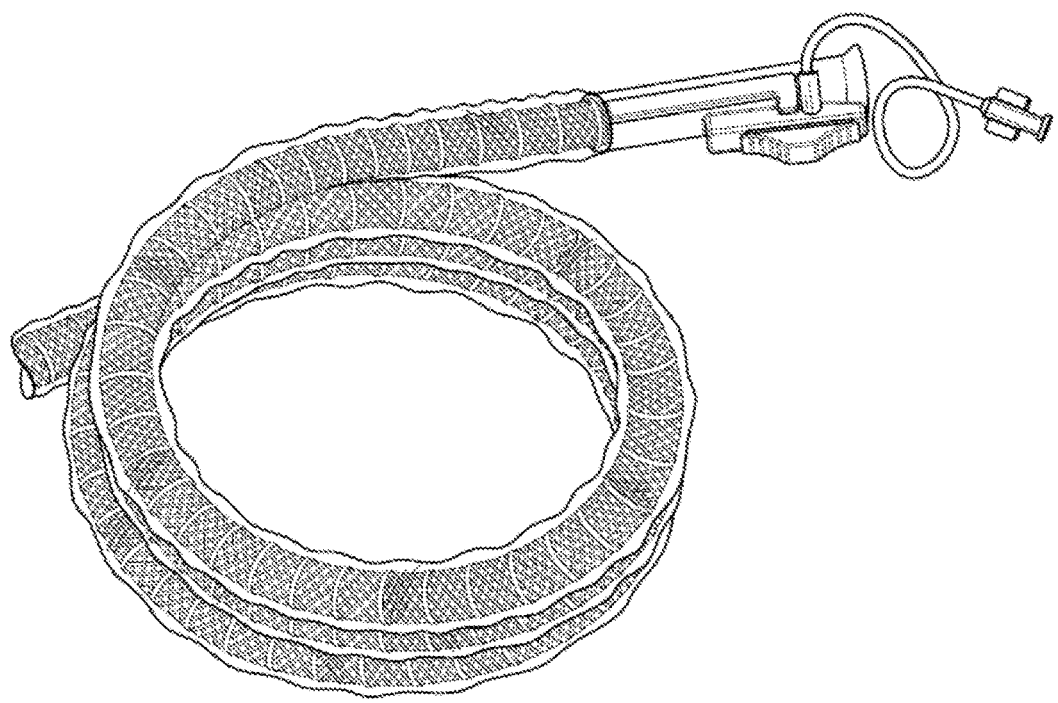
FIGS. 2A-2B show exemplary rigidized shapes of a rigidizing device.
Figure 2B:
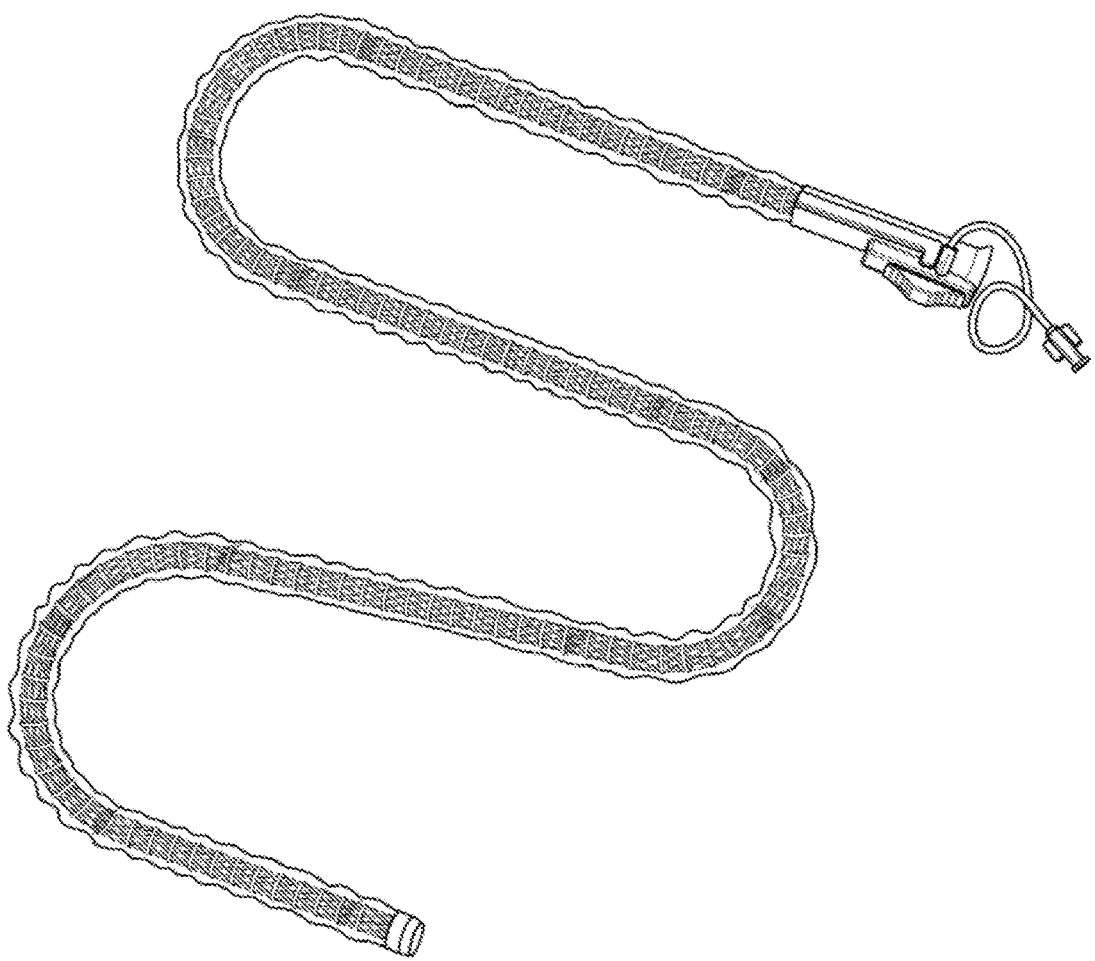

Exemplary rigidizing devices in the rigidized configuration are shown in FIGS. 2A and 2B. As the rigidizing device is rigidized, it does so in the shape it was in before vacuum or pressure was applied, i.e., it does not straighten, bend, or otherwise substantially modify its shape (e.g., it may stiffen in a looped configuration as shown in FIG. 2A or in a serpentine shape as shown in FIG. 2B). This can be because the air stiffening effect on the inner or outer layers (e.g., made of coil-wound tube) can be a small percentage (e.g., 5%) of the maximum load capability of the rigidizing device in bending, thereby allowing the rigidizing device to resist straightening. Upon release of the vacuum or pressure, braids or strands can unlock relative to one another and again move so as to allow bending of the rigidizing device. Again, as the rigidizing device is made more flexible through the release of vacuum or pressure, it does so in the shape it was in before the vacuum or pressure was released, i.e., it does not straighten, bend, or otherwise substantially modify its shape. Thus, the rigidizing devices described herein can transition from a flexible, less-stiff configuration to a rigid configuration of higher stiffness by restricting the motion between the strands of braid (e.g., by applying vacuum or pressure).

The rigidizing devices described herein can toggle between the rigid and flexible configurations quickly, and in some examples with an indefinite number of transition cycles. As interventional medical devices are made longer and inserted deeper into the human body, and as they are expected to do more exacting therapeutic procedures, there is an increased need for precision and control. Selectively rigidizing devices (e.g., overtubes) as described herein can advantageously provide both the benefits of flexibility (when needed) and the benefits of stiffness (when needed). Further, the rigidizing devices described herein can be used, for example, with classic endoscopes, colonoscopes, robotic systems, and/or navigation systems, such as those described in International Patent Application No. PCT/US2016/050290, filed Sep. 2, 2016, titled "DEVICE FOR ENDOSCOPIC ADVANCEMENT THROUGH THE SMALL INTESTINE," the entirety of which is incorporated by referenced herein.

The rigidizing devices described herein can additionally or alternatively include any of the features described with respect to International Patent Application No. PCT/US2016/050290, filed on Sep. 2, 2016, titled "DEVICE FOR ENDOSCOPIC ADVANCEMENT THROUGH THE SMALL INTESTINE," published as WO 2017/041052, International Patent Application No. PCT/US2018/042946, filed on Jul. 19, 2018, titled "DYNAMICALLY RIGIDIZING OVERTUBE," published as WO 2019/018682, International Patent Application No. PCT/US2019/042650, filed on Jul. 19, 2019, titled "DYNAMICALLY RIGIDIZING COMPOSITE MEDICAL STRUCTURES," published as WO 2020/018934, and International Patent Application No. PCT/US2020/013937 filed on Jan. 16, 2020, titled "DYNAMICALLY RIGIDIZING COMPOSITE MEDICAL STRUCTURES," the entireties of which are incorporated by reference herein.

The rigidizing devices described herein can be provided in multiple configurations, including different lengths and diameters. In some examples, the rigidizing devices can include working channels (for instance, for allowing the passage of typical endoscopic tools within the body of the rigidizing device), balloons, nested elements, and/or side-loading features.

Referring to FIGS. 3A-3D, in one example, a tubular rigidizing device 100 can include a wall having a plurality of layers positioned around the lumen 120 (e.g., for placement of an instrument or endoscope therethrough). A vacuum can be supplied between the layers to rigidize the rigidizing device 100.

The innermost layer 115 can be configured to provide an inner surface against which the remaining layers can be consolidated, for example, when a vacuum is applied within the walls of the rigidizing device 100. The structure can be configured to minimize bend force/maximize flexibility in the non-vacuum condition. In some examples, the innermost layer 115 can include a reinforcement element 150z or coil within a matrix, as described above.

The layer 113 over (i.e., radially outwards of) the innermost layer 115 can be a slip layer.

The layer 111 can be a radial gap (i.e., a space). The gap layer 111 can provide space for the braided layer(s) thereover to move within (when no vacuum is applied) as well as space within which the braided or woven layers can move radially inward (upon application of vacuum).

The layer 109 can be a first braid layer including braided strands 133 similar to as described elsewhere herein. The braid layer can be, for example, 0.001" to 0.040" thick. For example, a braid layer can be 0.001", 0.003", 0.005", 0.010", 0.015", 0.020", 0.025" or 0.030" thick.

Figure 3A:
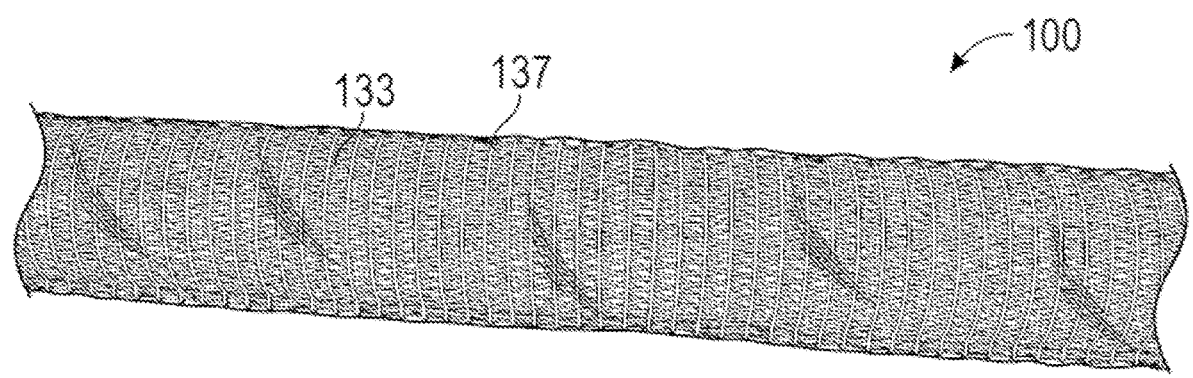
FIGS. 3A-3D show an exemplary vacuum rigidizing device.
Figure 3B:
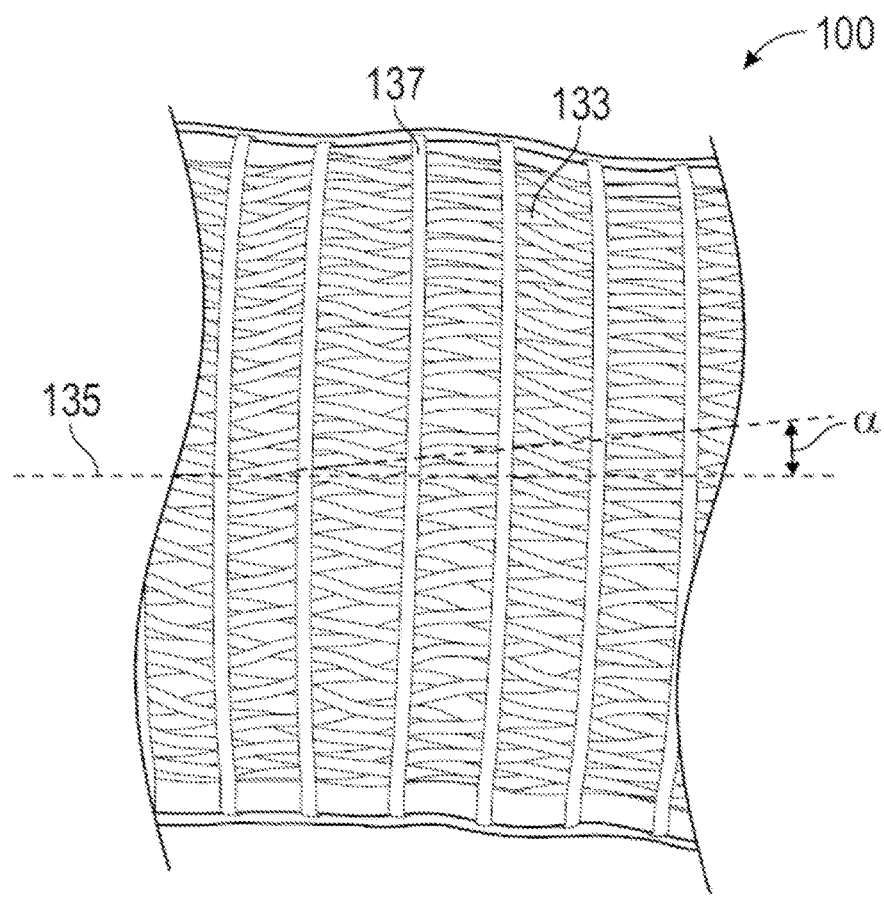

In some examples, as shown in FIG. 3B, the braid can have tensile or hoop fibers 137. Hoop fibers 137 can be spiraled and/or woven into a braid layer. Further, the hoop fibers 137 can be positioned at 2-50, e.g., 20-40 hoops per inch. The hoop fibers 137 can advantageously deliver high compression stiffness (to resist buckling or bowing out) in the radial direction, but can remain compliant in the direction of the longitudinal axis 135 of the rigidizing device 100. That is, if compression is applied to the rigidizing device 100, the braid layer 109 will try to expand in diameter as it compresses. The hoop fibers 137 can resist this diametrical expansion and thus resist compression. Accordingly, the hoop fiber 137 can provide a system that is flexible in bending but still resists both tension and compression.

The layer 107 can be another radial gap layer similar to layer 111.

Figure 3C:
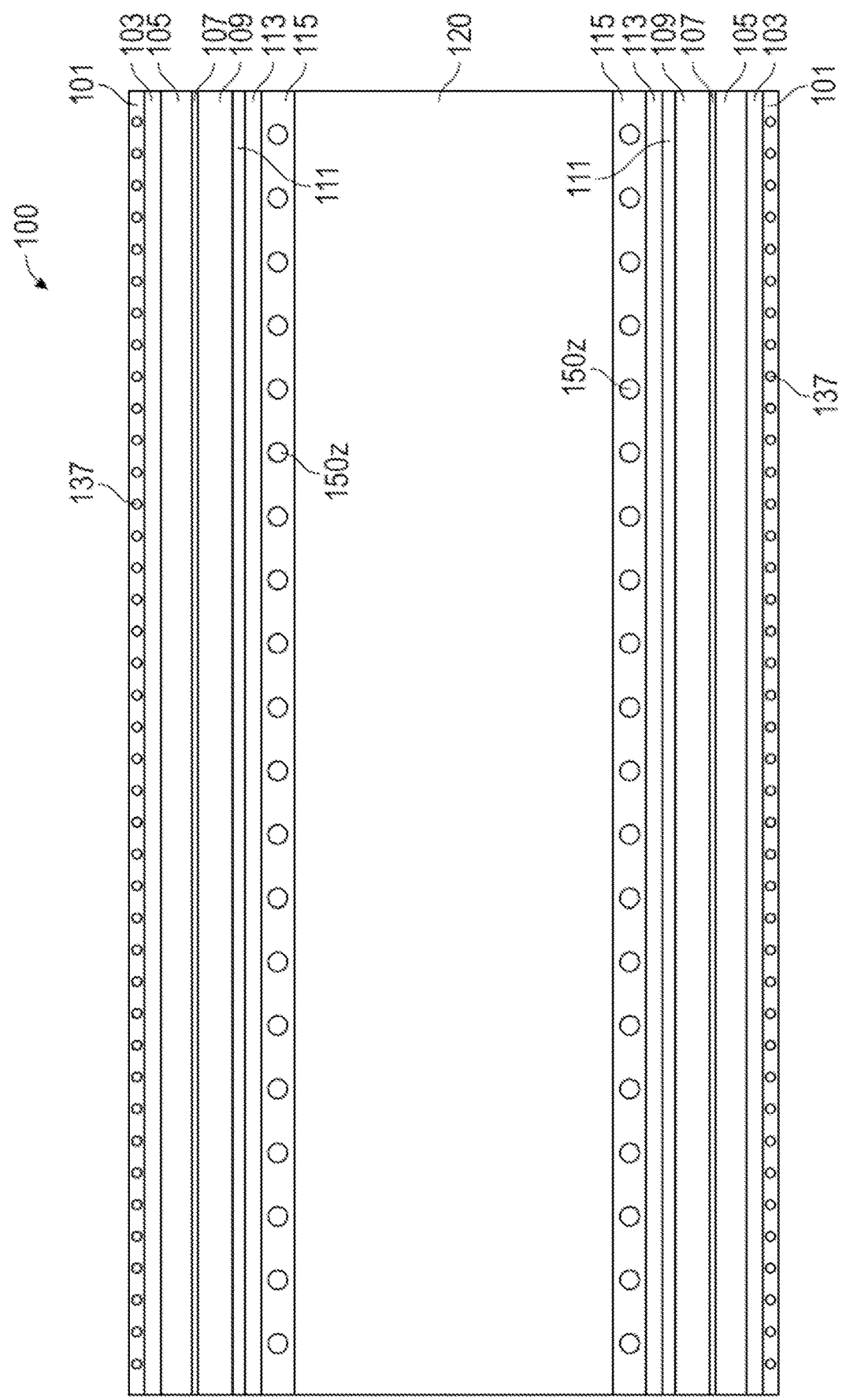
Figure 3D:
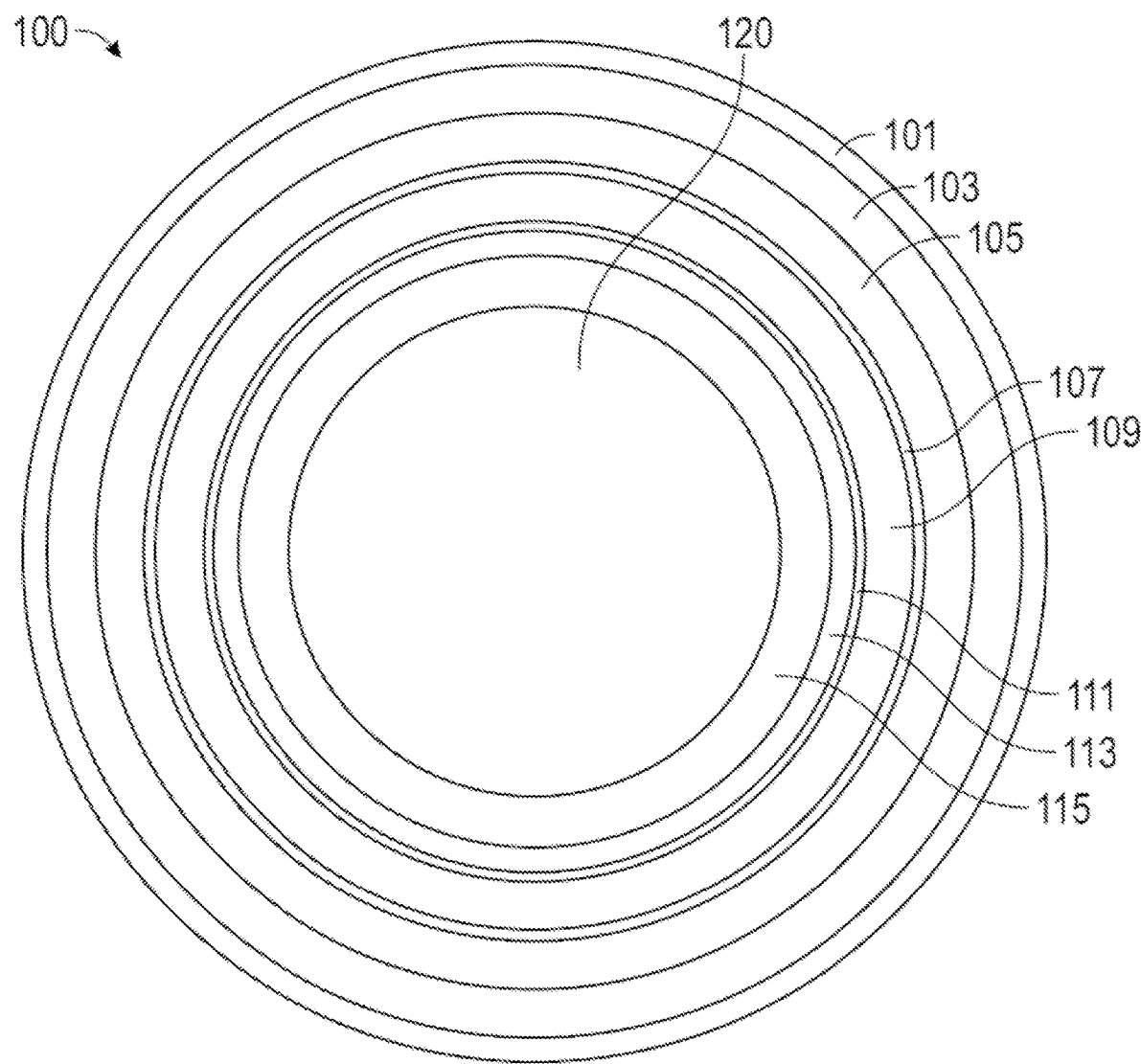

In some examples, the rigidizing devices described herein can have more than one braid layer. For example, the rigidizing devices can include two, three, or four braid layers. Referring to FIG. 3C, the layer 105 can be a second braid layer 105. The second braid layer 105 can have any of the characteristics described with respect to the first braid layer 109. In some examples, the braid of second braid layer 105 can be identical to the braid of first braid layer 109. In other examples, the braid of second braid layer 105 can be different than the braid of the first braid layer 109. For example, the braid of the second braid layer 105 can include fewer strands and have a larger braid angle $\alpha$ than the braid of the first braid layer 109. Having fewer strands can help increase the flexibility of the rigidizing device 100 (relative to having a second strand with equivalent or greater number of strands), and a larger braid angle $\alpha$ can help constrict the diameter of the of the first braid layer 109 (for instance, if the first braid layer is compressed) while increasing/maintaining the flexibility of the rigidizing device 100. As another example, the braid of the second braid layer 105 can include more strands and have a larger braid angle $\alpha$ than the braid of the first braid layer 109. Having more strands can result in a relatively tough and smooth layer while having a larger braid angle $\alpha$ can help constrict the diameter of the first braid layer 109.

The layer 103 can be another radial gap layer similar to layer 111. The gap layer 103 can have a thickness of 0.0002-0.04", such as approximately 0.03". A thickness within this range can ensure that the strands 133 of the braid layer(s) can easily slip and/or bulge relative to one another to ensure flexibility during bending of the rigidizing device 100.

The outermost layer 101 can be configured to move radially inward when a vacuum is applied to pull down against the braid layers 105, 109 and conform onto the surface(s) thereof. The outermost layer 101 can be soft and atraumatic and can be sealed at both ends to create a vacuum-tight chamber with layer 115. The outermost layer 101 can be elastomeric, e.g., made of urethane. The hardness of the outermost layer 101 can be, for example, 30 A to 80 A. Further, the outermost layer 101 can be have a thickness of 0.0001-0.01", such as approximately 0.001", 0.002, 0.003" or 0.004". Alternatively, the outermost layer can be plastic, including, for example, LDPE, nylon, or PEEK.

In some examples, the outermost layer 101 can, for example, have tensile or hoop fibers 137 extending therethrough. The hoop fibers 137 can be made, for example, of aramids (e.g., Technora, nylon, Kevlar), Vectran, Dyneema, carbon fiber, fiber glass or plastic. Further, the hoop fibers 137 can be positioned at 2-50, e.g., 20-40 hoops per inch. In some examples, the hoop fibers 137 can be laminated within an elastomeric sheath. The hoop fibers can advantageously deliver higher stiffness in one direction compared to another (e.g., can be very stiff in the hoop direction, but very compliant in the direction of the longitudinal axis of the rigidizing device). Additionally, the hoop fibers can advantageously provide low hoop stiffness until the fibers are placed under a tensile load, at which point the hoop fibers can suddenly exhibit high hoop stiffness.

In some examples, the outermost layer 101 can include a lubrication, coating and/or powder (e.g., talcum powder) on the outer surface thereof to improve sliding of the rigidizing device through the anatomy. The coating can be hydrophilic (e.g., a Hydromer® coating or a Surmodics® coating) or hydrophobic (e.g., a fluoropolymer). The coating can be applied, for example, by dipping, painting, or spraying the coating thereon.

The innermost layer 115 can similarly include a lubrication, coating (e.g., hydrophilic or hydrophobic coating), and/or powder (e.g., talcum powder) on the inner surface thereof configured to allow the bordering layers to more easily shear relative to each other, particularly when no vacuum is applied to the rigidizing device 100, to maximize flexibility.

In some examples, the outermost layer 101 can be loose over the radially inward layers. For instance, the inside diameter of layer 101 (assuming it constitutes a tube) may have a diametrical gap of 0"-0.200" with the next layer radially inwards (e.g., with a braid layer). This may give the vacuum rigidized system more flexibility when not under vacuum while still preserving a high rigidization multiple. In other examples, the outermost layer 101 may be stretched some over the next layer radially inwards (e.g., the braid layer). For instance, the zero-strain diameter of a tube constituting layer 101 may be from 0-0.200" smaller in diameter than the next layer radially inwards and then stretched thereover. When not under vacuum, this system may have less flexibility than one wherein the outer layer 101 is looser. However, it may also have a smoother outer appearance and be less likely to tear during use.

In some examples, the outermost layer 101 can be loose over the radially inward layers. A small positive pressure may be applied underneath the layer 101 in order to gently expand layer 101 and allow the rigidizing device to bend more freely in the flexible configuration. In this example, the outermost layer 101 can be elastomeric and can maintain a compressive force over the braid, thereby imparting stiffness. Once positive pressure is supplied (enough to nominally expand the sheath off of the braid, for example, 2 psi), the outermost layer 101 is no longer is a contributor to stiffness, which can enhance baseline flexibility. Once rigidization is desired, positive pressure can be replaced by negative pressure (vacuum) to deliver stiffness.

A vacuum can be carried within rigidizing device 100 from minimal to full atmospheric vacuum (e.g., approximately 14.7 psi). In some examples, there can be a bleed valve, regulator, or pump control such that vacuum is bled down to any intermediate level to provide a variable stiffness capability. The vacuum pressure can advantageously be used to rigidize the rigidizing device structure by compressing the layer(s) of braided sleeve against neighboring layers. Braid is naturally flexible in bending (i.e. when bent normal to its longitudinal axis), and the lattice structure formed by the interlaced strands distort as the sleeve is bent in order for the braid to conform to the bent shape while resting on the inner layers. This results in lattice geometries where the corner angles of each lattice element change as the braided sleeve bends. When compressed between conformal materials, such as the layers described herein, the lattice elements become locked at their current angles and have enhanced capability to resist deformation upon application of vacuum, thereby rigidizing the entire structure in bending when vacuum is applied. Further, in some examples, the hoop fibers through or over the braid can carry tensile loads that help to prevent local buckling of the braid at high applied bending load.

The stiffness of the rigidizing device 100 can increase from 2-fold to over 30-fold, for instance 10-fold, 15-fold, or 20-fold, when transitioned from the flexible configuration to the rigid configuration. In one specific example, the stiffness of a rigidizing device similar to rigidizing device 100 was tested. The wall thickness of the test rigidizing device was 1.0 mm, the outer diameter was 17 mm, and a force was applied at the end of a 9.5 cm long cantilevered portion of the rigidizing device until the rigidizing device deflected 10 degrees. The forced required to do so when in flexible mode was only 30 grams while the forced required to do so in rigid (vacuum) mode was 350 grams.

In some examples of a vacuum rigidizing device 100, there can be only one braid layer. In other examples of a vacuum rigidizing device 100, there can be two, three, or more braid layers. In some examples, one or more of the radial gap layers or slip layers of rigidizing device 100 can be removed. In some examples, some or all of the slip layers of the rigidizing device 100 can be removed.

The braid layers described herein can act as a variable stiffness layer. The variable stiffness layer can include one or more variable stiffness elements or structures that, when activated (e.g., when vacuum is applied), the bending stiffness and/or shear resistance is increased, resulting in higher rigidity. Other variable stiffness elements can be used in addition to or in place of the braid layer. In some examples, engagers can be used as a variable stiffness element, as described in International Patent Application No. PCT/US2018/042946, filed Jul. 19, 2018, titled "DYNAMICALLY RIGIDIZING OVERTUBE," the entirety of which is incorporated by reference herein. Alternatively or additionally, the variable stiffness element can include particles or granules, jamming layers, scales, rigidizing axial members, rigidizers, longitudinal members or substantially longitudinal members.

Figure 4A:
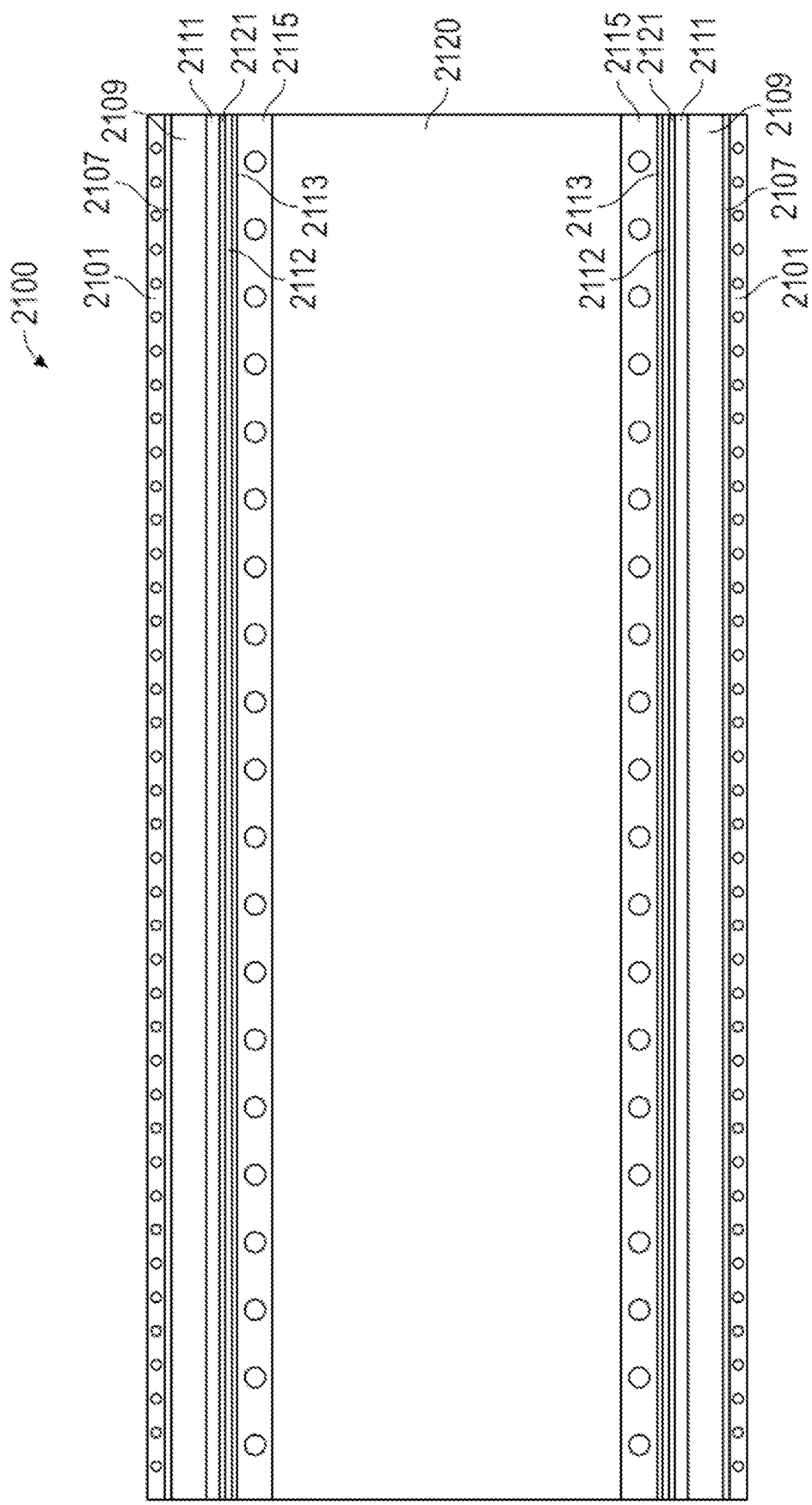
FIGS. 4A-4B show an exemplary pressure rigidizing device.
Figure 4B:
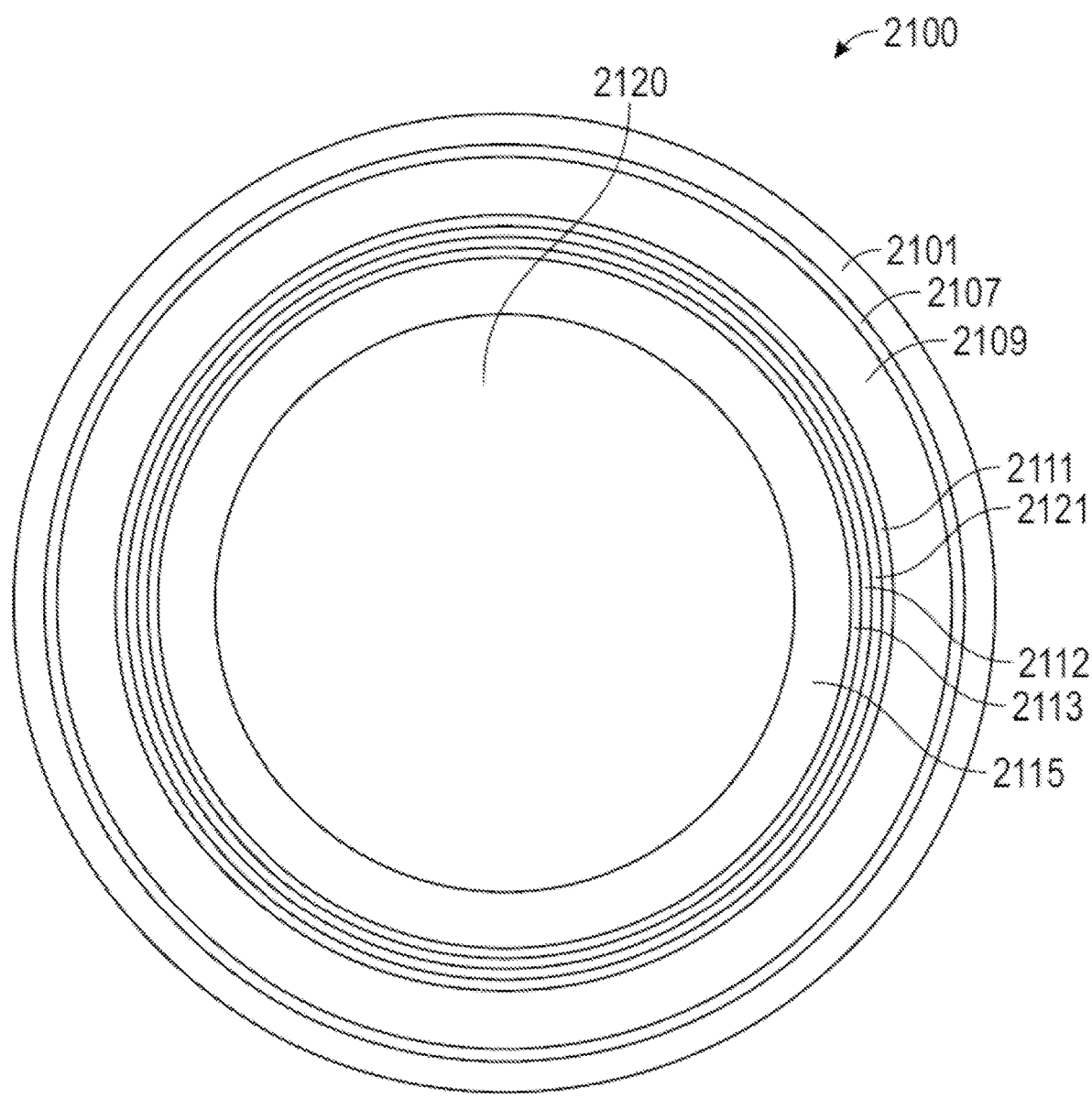

In some examples, the rigidizing devices described herein can rigidize through the application of pressure rather than vacuum. For example, referring to FIGS. 4A-4B, the rigidizing device 2100 can be similar to rigidizing device 100 except that it can be configured to hold pressure (e.g., of greater than 1 atm) therein for rigidization rather than vacuum. The rigidizing device 2100 can thus include a plurality of layers positioned around the lumen 2120 (e.g., for placement of an instrument or endoscope therethrough). The rigidizing device 2100 can include an innermost layer 2115 (similar to innermost layer 115), a slip layer 2113 (similar to slip layer 113), a pressure gap 2112, a bladder layer 2121, a gap layer 2111 (similar to gap layer 111), a braid layer 2109 (similar to braid layer 109) or other variable stiffness layer as described herein, a gap layer 2107 (similar to layer 107), and an outermost containment layer 2101.

The pressure gap 2112 can be a sealed chamber that provides a gap for the application of pressure to layers of rigidizing device 2100. The pressure can be supplied to the pressure gap 2112 using a fluid or gas inflation/pressure media. The inflation/pressure media can be water or saline or, for example, a lubricating fluid such as soil or glycerin. The lubricating fluid can, for example, help the layers of the rigidizing device 2100 flow over one another in the flexible configuration. The inflation/pressure media can be supplied to the gap 2112 during rigidization of the rigidizing device 2100 and can be partially or fully evacuated therefrom to transform the rigidizing device 2100 back to the flexible configuration. In some examples, the pressure gap 2112 of the rigidizing device 2100 can be connected to a pre-filled pressure source, such as a pre-filled syringe or a pre-filled insufflator, thereby reducing the physician's required set-up time.

The bladder layer 2121 can be made, for example, of a low durometer elastomer (e.g., of shore 20 A to 70 A) or a thin plastic sheet. The bladder layer 2121 can be formed out of a thin sheet of plastic or rubber that has been sealed lengthwise to form a tube. The lengthwise seal can be, for instance, a butt or lap joint. For instance, a lap joint can be formed in a lengthwise fashion in a sheet of rubber by melting the rubber at the lap joint or by using an adhesive. In some examples, the bladder layer 2121 can be 0.0002-0.020" thick, such as approximately 0.005" thick. The bladder layer 2121 can be soft, high-friction, stretchy, and/or able to wrinkle easily. In some examples, the bladder layer 2121 is a polyolefin or a PET. The bladder 2121 can be formed, for example, by using methods used to form heat shrink tubing, such as extrusion of a base material and then wall thinning with heat, pressure and/or radiation. When pressure is supplied through the pressure gap 2112, the bladder layer 2121 can expand through the gap layer 2111 to push the braid layer 2109 against the outermost containment layer 2101 such that the relative motion of the braid strands is reduced.

The outermost containment layer 2101 can be a tube, such as an extruded tube. Alternatively, the outermost containment layer 2101 can be a tube in which a reinforcing member (for example, metal wire, including round or rectangular cross-sections) is encapsulated within an elastomeric matrix, similar to as described with respect to the innermost layer for other examples described herein. In some examples, the outermost containment layer 2101 can include a helical spring (e.g., made of circular or flat wire), and/or a tubular braid (such as one made from round or flat metal wire) and a thin elastomeric sheet that is not bonded to the other elements in the layer. The outermost containment layer 2101 can be a tubular structure with a continuous and smooth surface. This can facilitate an outer member that slides against it in close proximity and with locally high contact loads (e.g., a nested configuration as described further herein). Further, the outer layer 2101 can be configured to support compressive loads, such as pinching. Additionally, the outer layer 2101 (e.g., with a reinforcement element therein) can be configured to prevent the rigidizing device 2100 from changing diameter even when pressure is applied.

Because both the outer layer 2101 and the inner layer 2115 include reinforcement elements therein, the braid layer 2109 can be reasonably constrained from both shrinking diameter (under tensile loads) and growing in diameter (under compression loads).

By using pressure rather than vacuum to transition from the flexible state to the rigid state, the rigidity of the rigidizing device 2100 can be increased. For example, in some examples, the pressure supplied to the pressure gap 2112 can be between 1 and 40 atmospheres, such as between 2 and 40 atmospheres, such as between 4 and 20 atmospheres, such as between 5 and 10 atmospheres. In some examples, the pressure supplied is approximate 2 atm, approximately 4 atmospheres, approximately 5 atmospheres, approximately 10 atmospheres, approximately 20 atmospheres. In some examples, the rigidizing device 2100 can exhibit change in relative bending stiffness (as measured in a simple cantilevered configuration) from the flexible configuration to the rigid configuration of 2-100 times, such as 10-80 times, such as 20-50 times. For example, the rigidizing device 2100 can have a change in relative bending stiffness from the flexible configuration to the rigid configuration of approximately 10, 15, 20, or 25, 30, 40, 50, or over 100 times.

Figure 5:
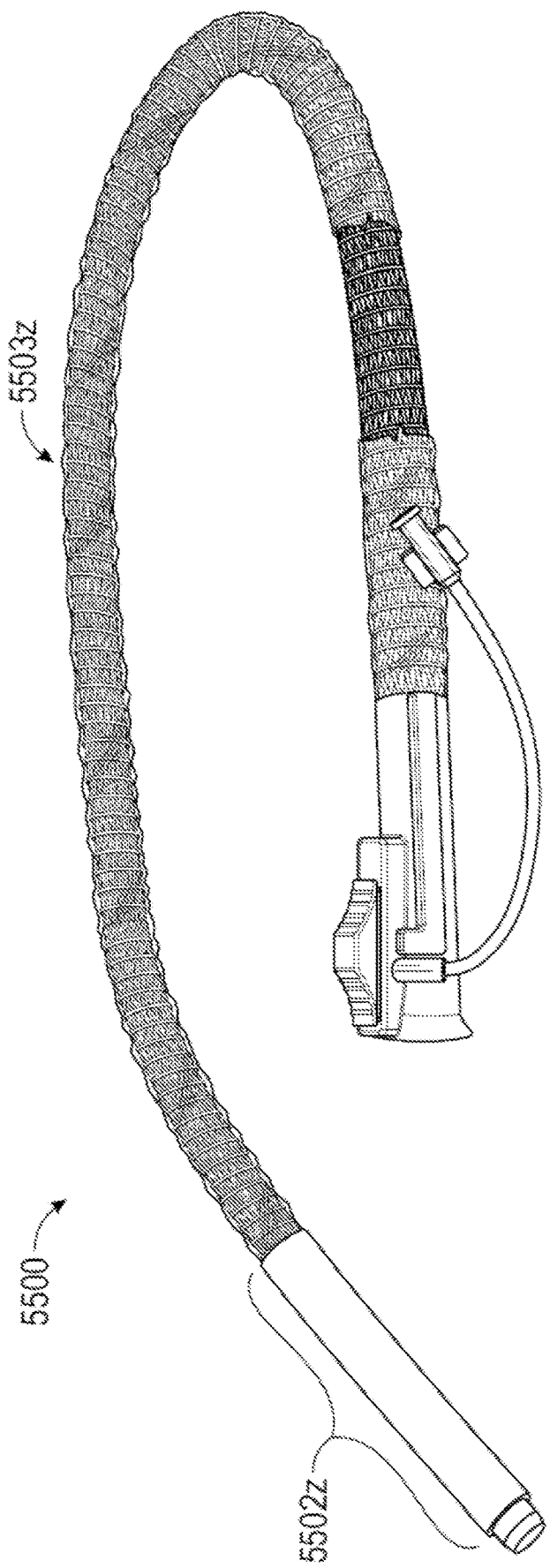
FIG. 5 shows a rigidizing device with a distal end section.

Any of the rigidizing devices described herein can have a distal end section or sections with a different design that the main elongate body of the rigidizing device. As shown in FIG. 5, for example, rigidizing device 5500 can have a main elongate body 5503z and a distal end section 5502z. Only the distal end section 5502z, only the main elongate body 5503z, or both the distal end section 5502z and the main elongate body 5503z can be rigidizing as described herein (e.g., by vacuum and/or pressure). In some examples, one section 5502z, 55032 is activated by pressure and the other section 5502z, 5503z is activated by vacuum. In other examples, both sections 5502z, 5503z are activated by pressure or vacuum, respectively.

Figure 6:
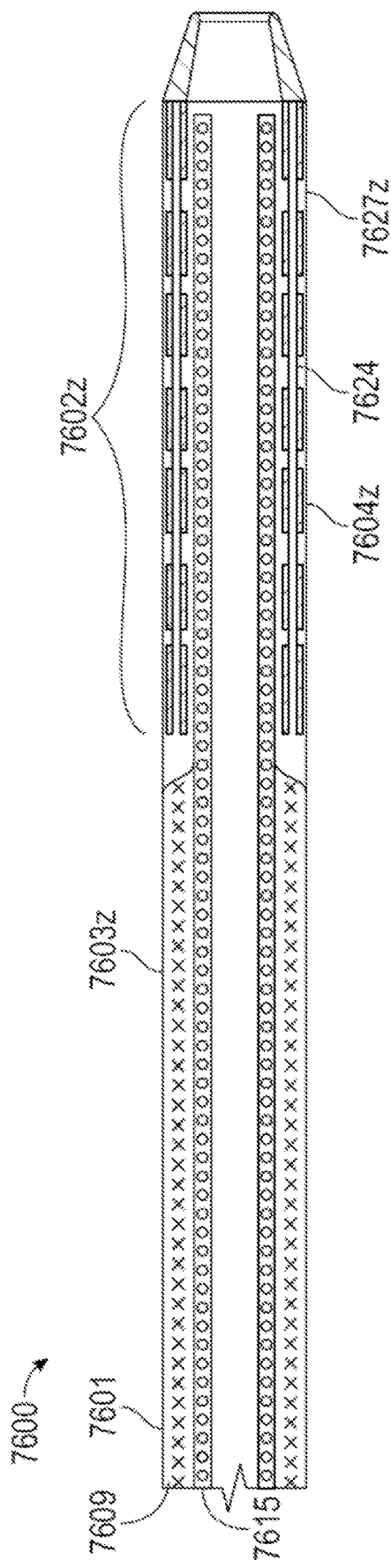
FIG. 6 shows a rigidizing device with a distal end section having a plurality of actively controlled linkages.

Referring to FIG. 6, in other examples, the distal end section 7602z can include a plurality of linkages 7604z that are actively controlled, such as via cables 7624, for steering of the rigidizing device 7600. The device 7600 is similar to device 5800 except that it includes cables 7624 configured to control movement of the device. While the passage of the cables 7624 through the rigidizing elongate body 7603z (i.e., with outer wall 7601, braid layer 7609, and inner layer 7615) is not shown in FIG. 26, the cables 7624 can extend therethrough in any manner as described elsewhere herein. In some examples, one or more layers of the rigidizing elongate body 7603z can continue into the distal end section 7602z. For example, and as shown in FIG. 26, the inner layer 7615 can continue into the distal end section 7602z, e.g., can be located radially inwards of the linkages 7604z. Similarly, any of the additional layers from the rigidizing proximal section (e.g., the braid layer 7609 or the outer layer 7601 may be continued into the distal section 7602z and/or be positioned radially inwards of the linkages 7604z). In other examples, none of the layers of the rigidizing elongate body 7603z continue into the distal section 7602z. The linkages 7604z (and any linkages described herein) can include a covering 7627z thereover. The covering 7627z can advantageously make the distal section 7602 atraumatic and/or smooth. The covering 7627z can be a film, such as expanded PTFE. Expanded PTFE can advantageously provide a smooth, low friction surface with low resistance to bending but high resistance to buckling.

In some examples, the rigidizing devices described herein can be used in conjunction with one or more other rigidizing devices described herein. For example, an endoscope can include the rigidizing mechanisms described herein, and a rigidizing device can include the rigidizing mechanisms described herein. Used together, they can create a nested system that can advance, one after the other, allowing one of the elements to always remain stiffened, such that looping is reduced or eliminated (i.e., they can create a sequentially advancing nested system).

Figure 7:
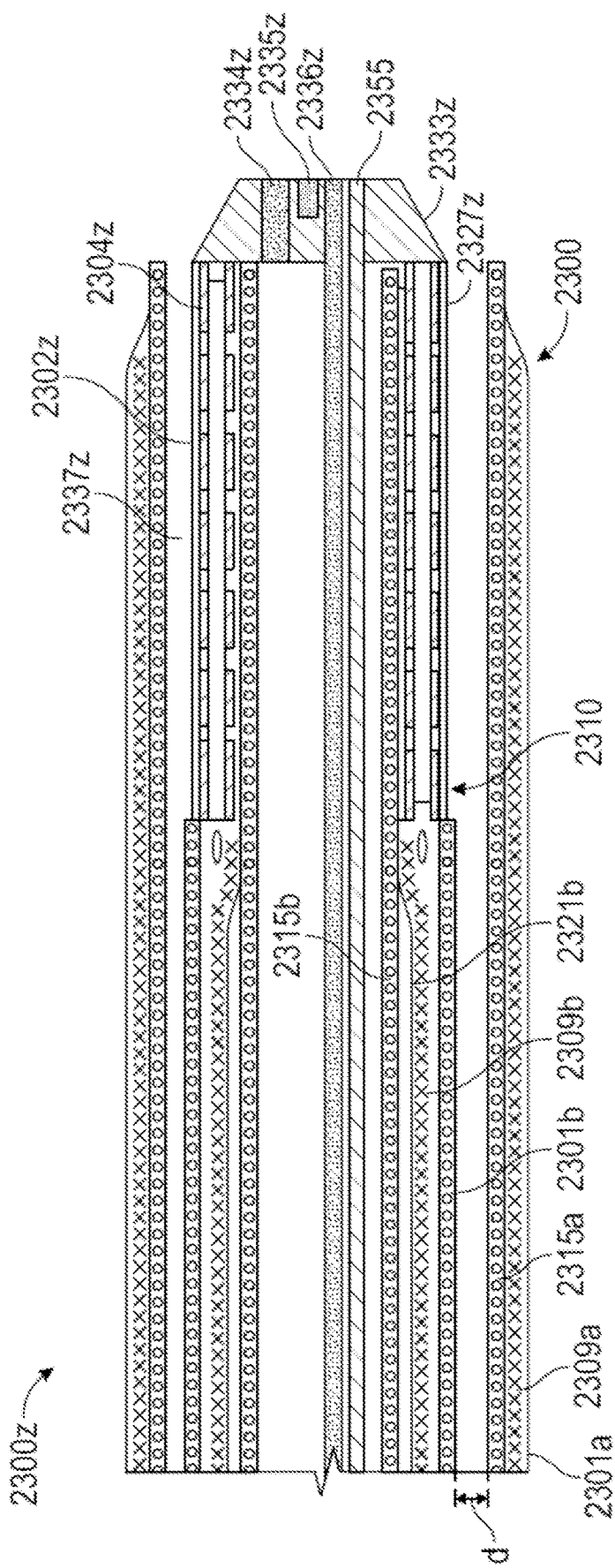
FIG. 7 shows a nested rigidizing system.

An exemplary nested system 2300z is shown in FIG. 7. The system 2300z can include an outer rigidizing device 2300 and an inner rigidizing device 2310 (here, configured as a rigidizing scope) that are axially movable with respect to one another either concentrically or non-concentrically. The outer rigidizing device 2300 and the inner rigidizing device 2310 can include any of the rigidizing features as described herein. For example, the outer rigidizing device 2300 can include an outermost layer 2301a, a braided layer 2309a, and an inner layer 2315a including a coil wound therethrough. The outer rigidizing device 2300 can be, for example, configured to receive vacuum between the outermost layer 2301a and the inner layer 2315a to provide rigidization. Similarly, the inner scope 2310 can include an outer layer 2301b (e.g., with a coil wound therethrough), a braid layer 2309b, a bladder layer 2321b, and an inner layer 2315b (e.g., with a coil wound therethrough). The inner scope 2310 can be, for example, configured to receive pressure between the bladder 2321b and the inner layer 2315b to provide rigidization. Further, an air/water channel 2336z and a working channel 2355 can extend through the inner rigidizing device 2310. Additionally, the inner rigidizing scope 2310 can include a distal section 2302z with a camera 2334z, lights 2335z, and steerable linkages 2304z. A cover 2327z can extend over the distal section 2302z. In another example, the camera and/or lighting can be delivered in a separate assembly (e.g., the camera and lighting can be bundled together in a catheter and delivered down the working channel 2355 and/or an additional working channel to the distalmost end 2333z).

An interface 2337z can be positioned between the inner rigidizing device 2310 and the outer rigidizing device 2300. The interface 2337z can be a gap, for example, having a dimension d (see FIG. 5) of 0.001"-0.050", such as 0.0020", 0.005", or 0.020" thick. In some examples, the interface 2337z can be low friction and include, for example, powder, coatings, or laminations to reduce the friction. In some examples, there can be seals between the inner rigidizing device 2310 and outer rigidizing device 2300, and the intervening space can be pressurized, for example, with fluid or water, to create a hydrostatic bearing. In other examples, there can be seals between the inner rigidizing device 2310 and outer rigidizing device 2300, and the intervening space can be filled with small spheres to reduce friction.

The inner rigidizing device 2310 and outer rigidizing device 2300 can move relative to one another and alternately rigidize so as to transfer a bend or shape down the length of the nested system 2300z. For example, the inner device 2310 can be inserted into a lumen and bent or steered into the desired shape. Pressure can be applied to the inner rigidizing device 2310 to cause the braid elements to engage and lock the inner rigidizing device 2310 in the configuration. The rigidizing device (for instance, in a flexible state) 2300 can then be advanced over the rigid inner device 2310. When the outer rigidizing device 2300 reaches the tip of the inner device 2310, vacuum can be applied to the rigidizing device 2300 to cause the layers to engage and lock to fix the shape of the rigidizing device. The inner device 2310 can be transitioned to a flexible state, advanced, and the process repeated. Although the system 2300z is described as including a rigidizing device and an inner device configured as a scope, it should be understood that other configurations are possible. For example, the system might include two overtubes, two catheters, or a combination of overtube, catheter, and scope.

Figure 8:
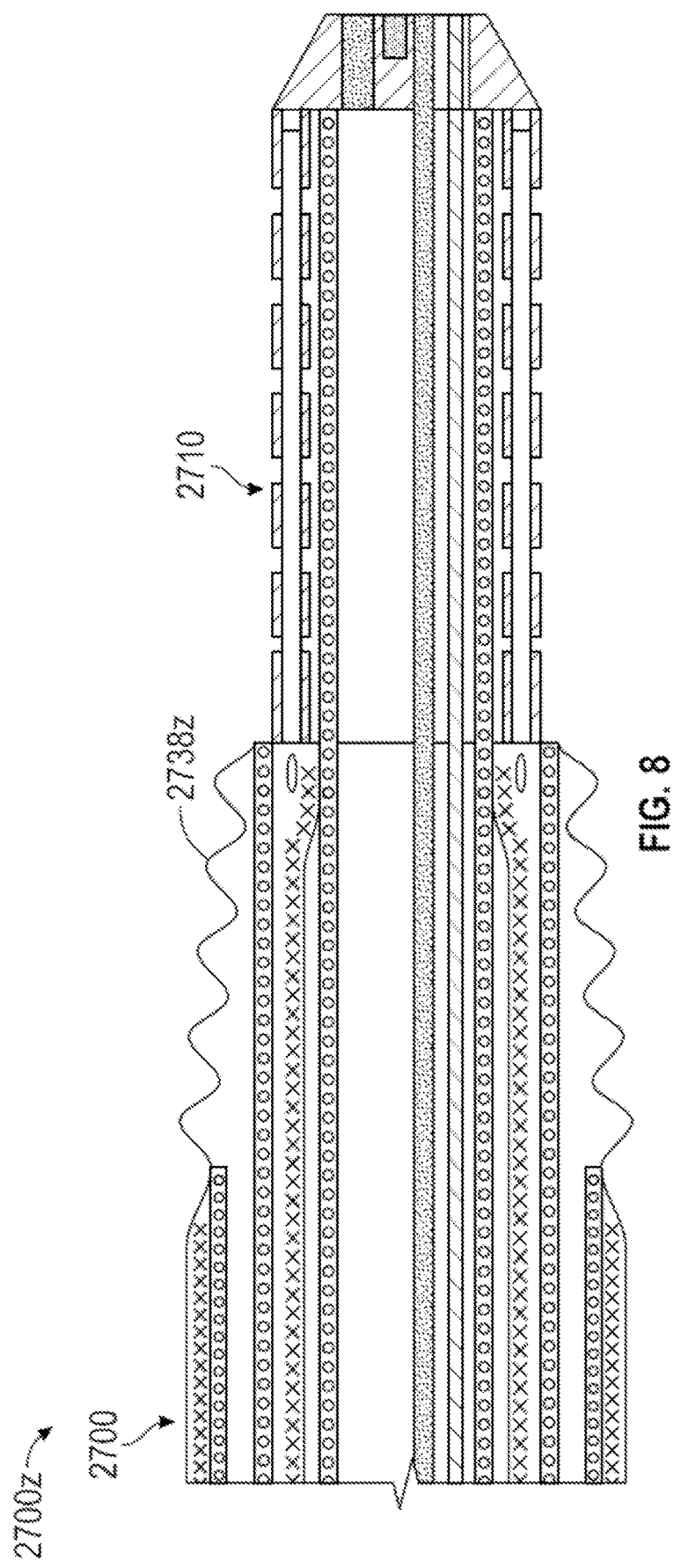
FIG. 8 shows a nested rigidizing system with a cover between the inner and outer rigidizing devices.

FIG. 8 shows another exemplary nested system 2700z. System 2700z is similar to system 2300z except that it includes a cover 2738z attached to both the inner and outer rigidizing device 2710, 2700. The cover 2738z may be, for example, low-durometer and thin-walled to allow elasticity and stretching. The cover 2738z may be a rubber, such as urethane, latex, or silicone. The cover 2738z may protect the interface/radial gap between the inner and outer devices 2710, 2700. The cover 2738z may prevent contamination from entering the space between the inner and outer tubes. The cover 2738z may further prevent tissue and other substances from becoming trapped in the space between the inner and outer tubes. The cover 2738z may stretch to allow the inner device 2710 and outer device 2700 to travel independently of one another within the elastic limits of the material. The cover 2738z may be bonded or attached to the rigidizing devices 2710, 2700 in such a way that the cover 2738z is always at a minimum slightly stretched. This example may be wiped down externally for cleaning. In some examples, the cover 2738z can be configured as a "rolling" seal, such as disclosed in U.S. Pat. No. 6,447,491, the entire disclosure of which is incorporated by reference herein.

Figure 9A:
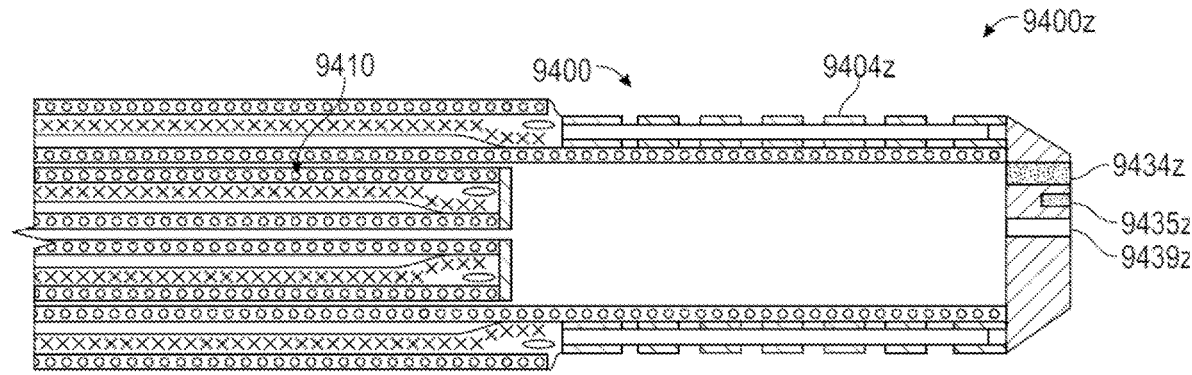
FIGS. 9A-9B show a nested rigidizing system where the outer rigidizing device includes steering and imaging.
Figure 9B:
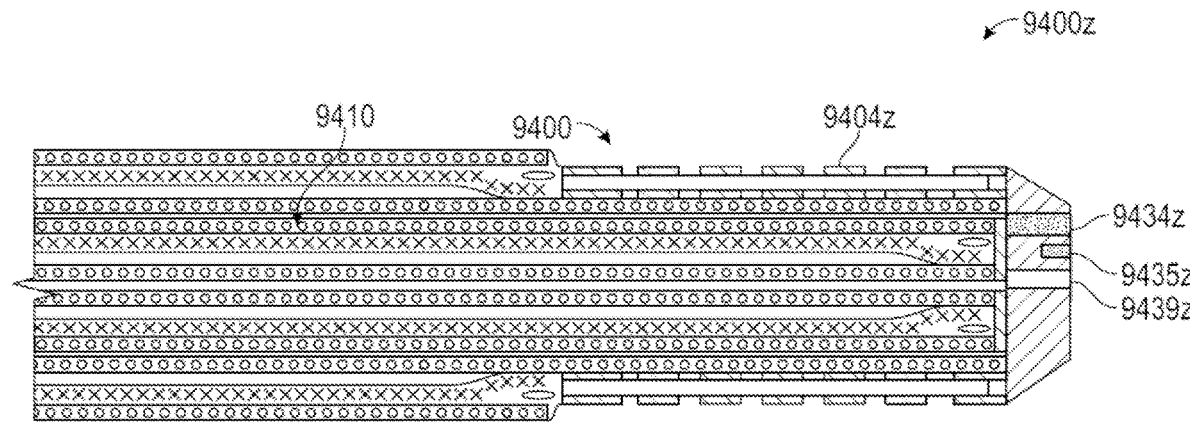

FIGS. 9 A-9B show another exemplary nested system 9400z. In this system 9400z, the outer rigidizing device 9400 includes steering and imaging (e.g., similar to a scope) while the inner device includes only rigidization (though it could include additional steering elements as described elsewhere herein). Thus, outer device 9400 includes linkages or other steering means disclosed herein 9404z, camera 9434z, and lighting 9435z. The outer device 9400 can further include a central passageway 9439z for access to the inner device 9410 (e.g., lumens such as working channels therein). In some examples, bellows or a loop of tubing can connect the passageway 9439z to lumens of the inner device 9410. Similar to the other nested systems, at least one of the devices 9410, 9400 can be rigidized at a time while the other can conform to the rigidization and/or move through the anatomy. Here, the outer device 9400 can lead the inner device 9410 (the inner device 9410 is shown retracted relative to the outer device 9400 in FIG. 9 A and extended substantially even with the outer device 9400 in FIG. 7B). Advantageously, system 9400z can provide a smooth exterior surface to avoid pinching the anatomy and/or entrance of fluid between the inner and outer devices 9410, 9400. Having the steering on the outer device 9400 can also provide additional leverage for steering the tip. Also, the outer device can facilitate better imaging capabilities due to the larger diameter of the outer device 9400 and its ability to accommodate a larger camera.

Figure 10A:
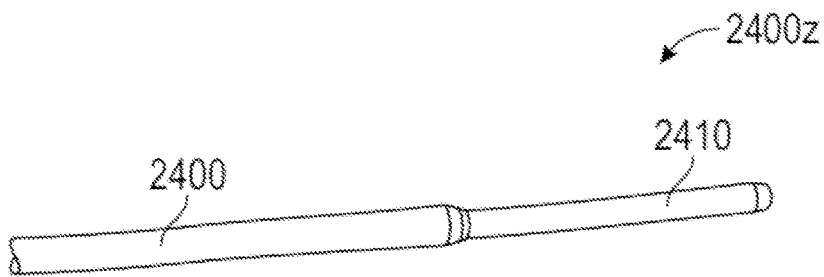
FIGS. 10A-10H show exemplary use of a nested rigidizing system.
Figure 10B:
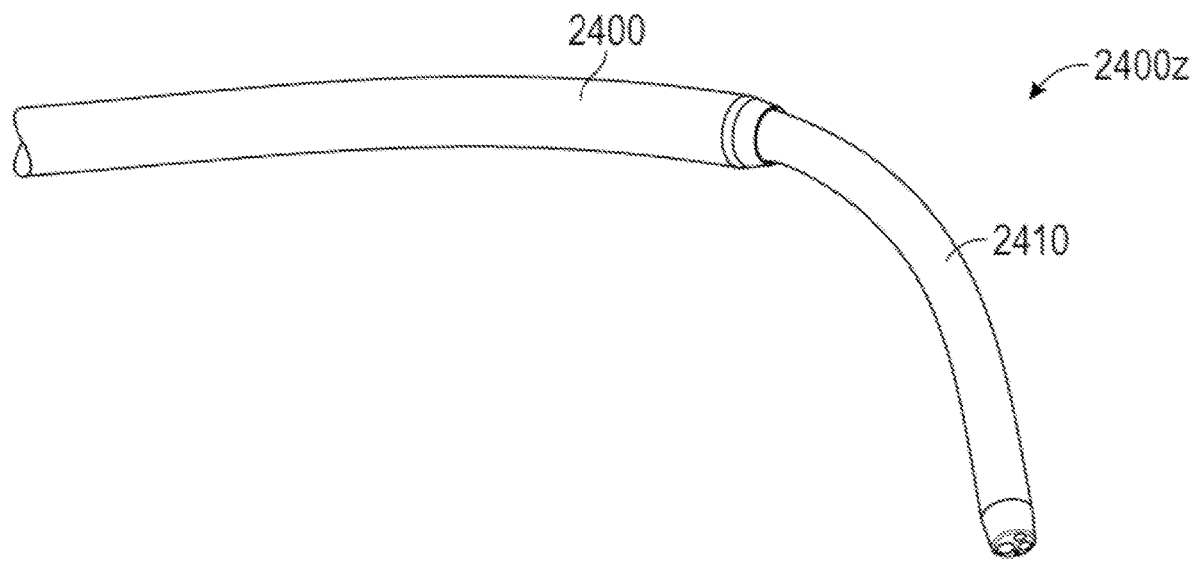
Figure 10C:
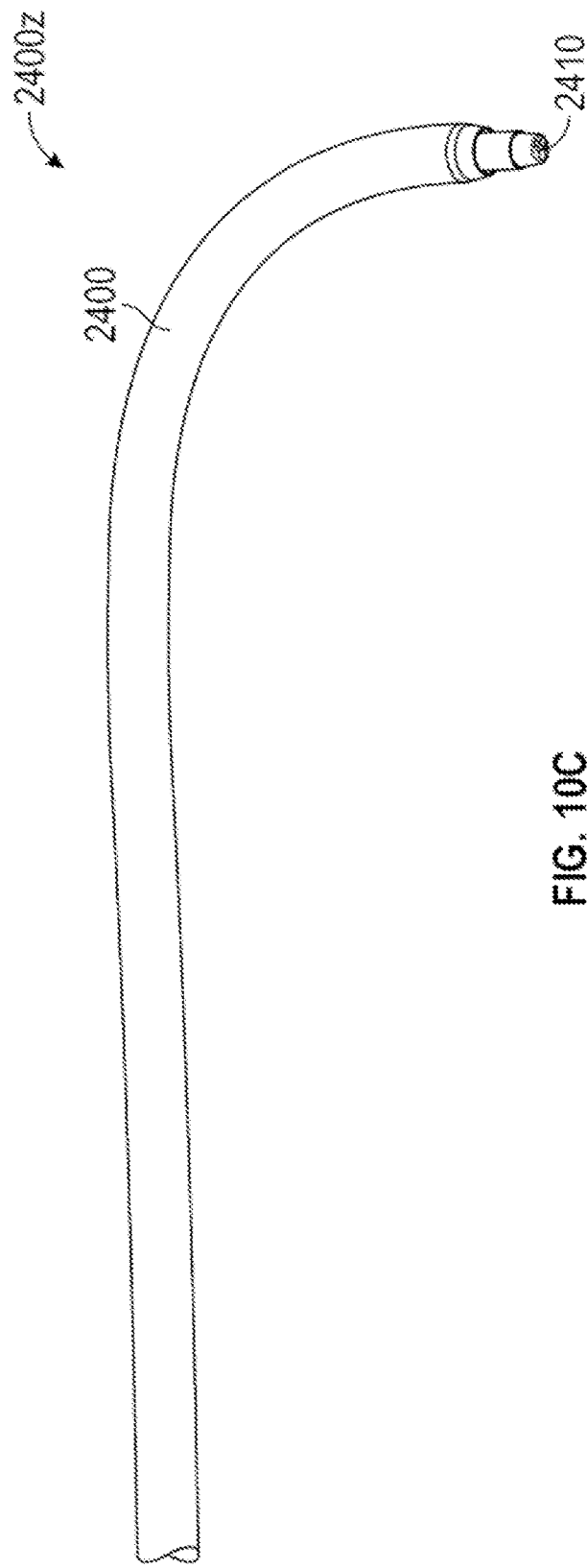
Figure 10D:
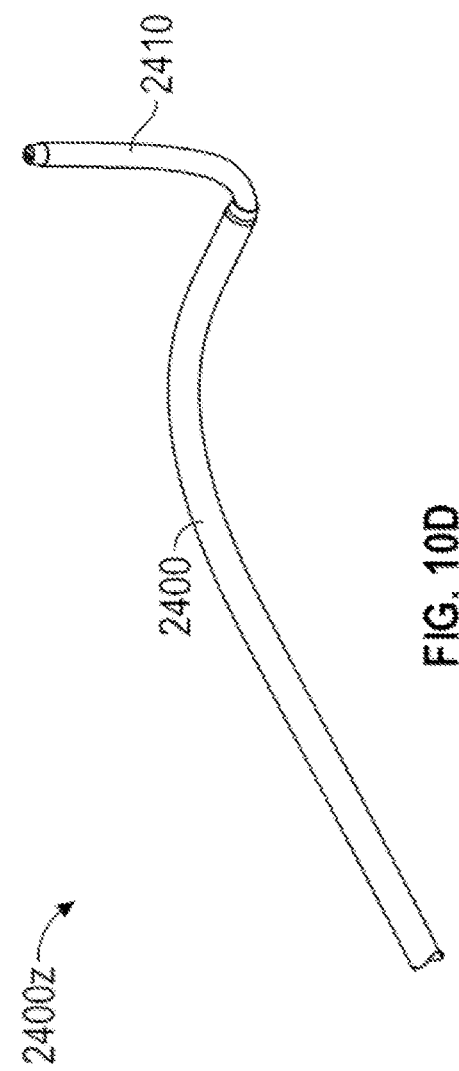
Figure 10E:
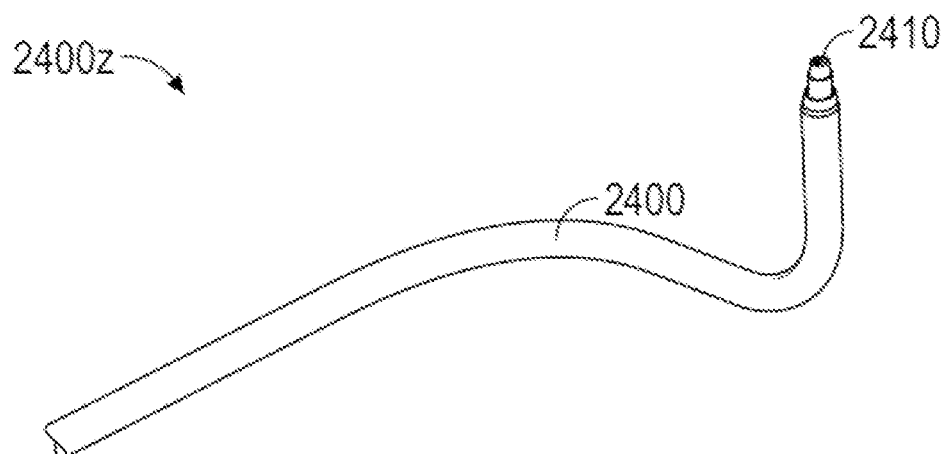
Figure 10F:
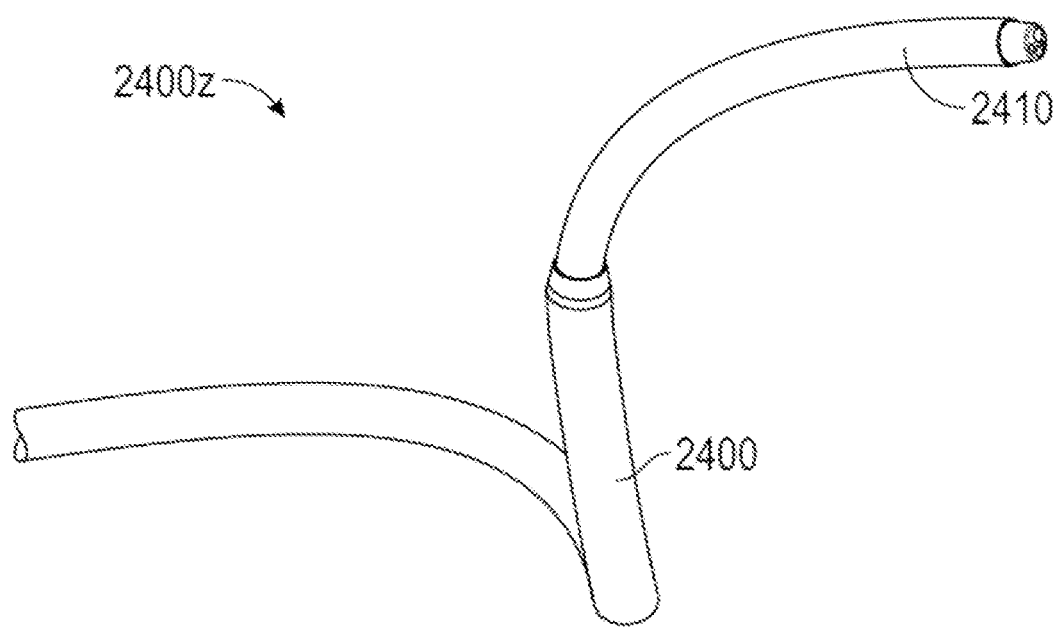
Figure 10G:
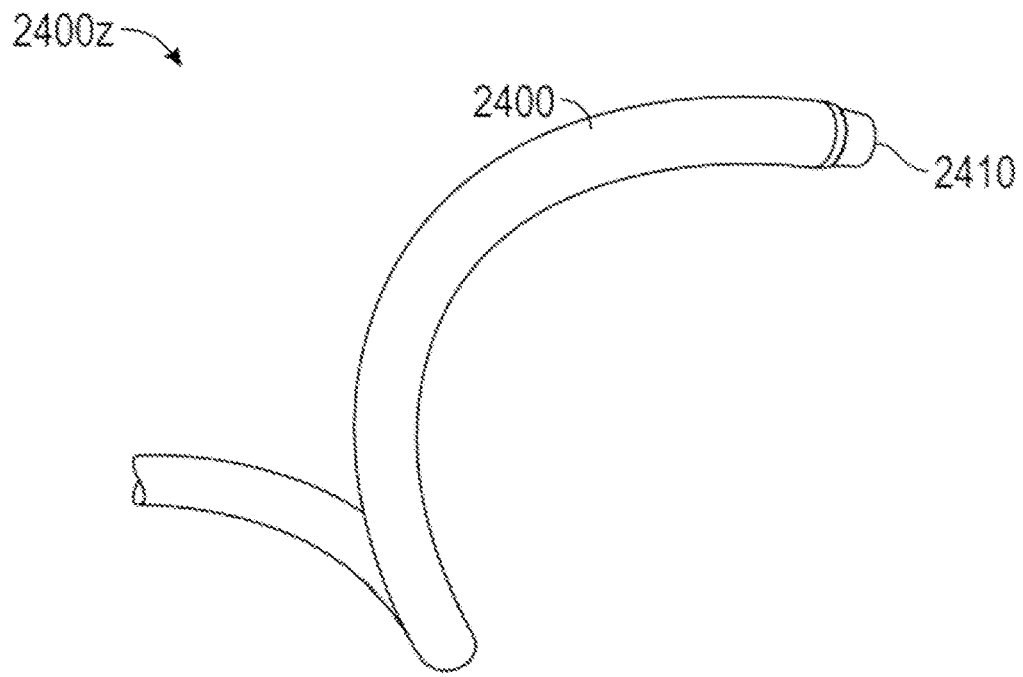
Figure 10H:
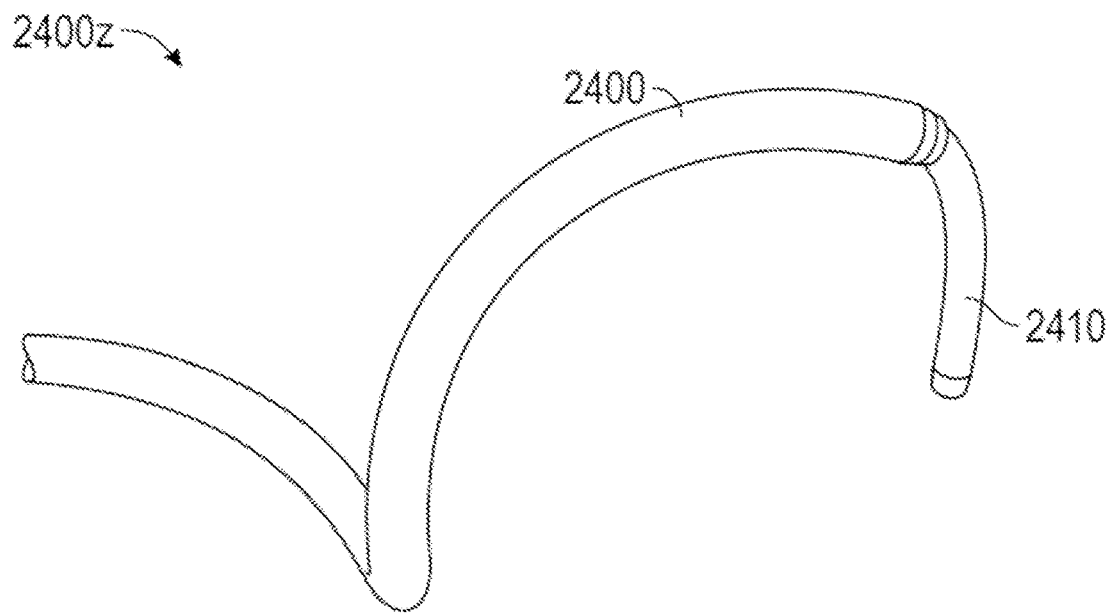

FIGS. 10A-10H show the exemplary use of a nested system 2400z as described herein. At FIG. 10A, a steerable inner rigidizing device 2410 is positioned within the outer rigidizing device 2400 such that the distal end of the inner rigidizing device 2410 extends outside of the outer rigidizing device 2400. At FIG. 10B, the distal end of the inner rigidizing device 2410 is bent in the desired direction/orientation (e.g., via steering cables, such as cables 7624) and then rigidized (e.g., using vacuum or pressure as described herein). At FIG. 10C, the outer rigidizing device 2400 (in the flexible configuration) is advanced over the rigidized inner rigidizing device 2410 (including over the bending distal section). Once the distal end of the outer rigidizing device 2400 is sufficiently advanced over the distal end of the inner rigidizing device 2410, then the outer rigidizing device 2400 can be rigidized (e.g., using vacuum or pressure as described herein). At FIG. 10D, the inner rigidizing device 2410 can then be transitioned to the flexible state (e.g., by removing the vacuum or pressure as described herein and by allowing the steering cables to go slack such that tip can move easily) and can be advanced and directed/oriented/steered as desired. Alternately, in FIG. 10D, the inner rigidizing device 2410 can be actively steered (either manually or via computational control) as it emerges such that is minimizes the load on the rigidized outer tube. Minimizing the load on the outer rigidizing device 2400 makes it easier for this tube to hold the rigidized shape. Once the inner rigidizing device 2410 is rigidized, the outer rigidizing device 2400 can be transitioned to the flexible state and advanced thereover (as shown in FIG. 10E). The process can then be repeated as shown in FIGS. 10F-H. The repeated process can result in "shape copying," whereby the inner and outer rigidizing devices 2410, 2400 in the flexible configuration continuously conform to (or copy) the shape of whichever device 2410, 2400 is in the rigid configuration.

In some examples, at the completion of the sequence shown in FIGS. 10A-H, a third rigidizing device can be slid over the first two rigidizing devices (2400, 2410) and rigidized. Rigidizing devices 2400 and 2410 can then be withdrawn. Finally, a fourth rigidizing device can be inserted through the inner lumen of the third tube. This fourth rigidizing device may have a larger diameter and more features than rigidizing device 2410. For instance, it may have a larger working channel, more working channels, a better camera, or combinations thereof. This technique can allow two smaller tubes, which tend to be more flexible and maneuverable, to reach deep into the body while still ultimately deliver a larger tube for therapeutic purposes. Alternately, in the example above, the fourth rigidizing device can be a regular endoscope as is known in the art.

In some examples, at the completion of the sequence shown in FIGS. 10A-H, outer rigidizing device 2400 may be rigidized and then the inner rigidizing device 2410 may be removed. For example, the rigidizing device 2410 may be a "navigation" device comprising a camera, lighting and a distal steering section. The "navigation" device 2410 may be well sealed such that it is easy to clean between procedures. A second inner device may then be placed inside the rigidized outer device 2400 and advanced past the distal end of the outer device 2400. The second inner device may be a "therapeutic" tube comprising such elements as a camera, lights, water, suction and various tools. The "therapeutic" device may not have a steering section or the ability to rigidize, thereby giving additional room in the body of the therapeutic tube for the inclusion of other features, for example, tools for performing therapies. Once in place, the tools on the "therapeutic" tube may be used to perform a therapy in the body, such as, for example, a mucosal resection or dissection in the human GI tract.

In another example, after or during the completion of the sequence shown in FIGS. 10A-H, a third device may be inserted inside inner tube 2410. The third device may be rigidizing and/or an endoscope.

In some examples, after completion of the sequence shown in FIGS. 10A-10H and the completion of any therapies conducted with the system 2400z in place, the entire system 2400z can be removed from the anatomy. In one exemplary method of withdrawing, the system 2400z can be transitioned to the flexible configuration (i.e., both the inner and outer devices 2410, 2400 can be transitioned to the flexible configuration), and the flexible system 2400z can be pulled proximally. In this method, the tension between the patient's body (e.g., the anus) and a robotic arm (e.g., arm 1023y described below) can prevent the system 2400z from falling out of the body as it is removed (e.g., as more of the flexible system 2400z is positioned outside of the body than inside of the body).

As another exemplary method of withdrawing, shape copying can be performed similar to as described with respect to FIGS. 10A-10H, but in reverse. In this example, for example, the inner rigidizing device 2410 can be rigidized and the outer rigidizing device 2400 can be withdrawn proximally (while in the flexible configuration) over the inner rigidizing device 2410. The outer rigidizing device 2400 can then be rigidized and the inner rigidizing device 2410 can be relaxed and moved proximally within the outer rigidizing device 2400 (e.g., until the distal end of the inner rigidizing device 2410 is flush with the distal end of the outer rigidizing device 2400). In this example, when the inner rigidizing device 2410 is withdrawn into the outer rigidizing device 2400, tension on the steering cables can be held constant (e.g., at a low value, such as ¼ lb or less) to ensure that the steerable distal end section will move into the shape of the outer rigidizing device 2400 without disturbing the fixed shape of the outer rigidizing device 2400. Alternatively or additionally, if the outer rigidizing device 2400 is rigidized in a straight shape, then the inner rigidizing device 2410 can be pulled into the outer rigidizing device 2400 and tension on each of the steering cables can be made equal (i.e., the same value, thus conforming the child shape to shape of the inside of the mother).

As another exemplary method of withdrawing, the steerable distal tip of the inner rigidizing device 2410 can be actively steered proximally into the known, assumed, or measured shape of the outer rigidizing device 2400 either as or after the distal tip is retracted into the outer rigidizing device 2410. That is, the distal tip of the inner rigidizing device 2410 can be steered to match the shape of the section of the outer rigidizing device 2400 that is immediately proximal to the distal tip of the inner rigidizing device 2410. In one specific example, the inner rigidizing device 2410 may project from the outer rigidizing device 2400 by 4 inches, and the last 4 inches of the outer rigidizing device 2400 may form a 90 degree curve around a 2.5 inch radius of curvature. In this example, the inner rigidizing device 2410 can be steered into a 90 degree curve around a 2.5 inch radius of curvature and then withdrawn (in that shape) into the outer rigidizing device 2400. This may advantageously ensure that the inner rigidizing device 2410 pulls easily into the outer rigidizing device 2400 (i.e., because their shapes are matched).

In some examples, the rigidizing devices (e.g., nested systems such as system 2400z) described herein can be robotically controlled. FIGS. 11A-11D show an exemplary use of a nested system 9300z, like that shown in FIGS. 10A-10H, that can be robotically controlled or manipulated (e.g., for rigidization, steering, movement, etc.). As shown in FIGS. 11A-11D, the outer rigidizing device 9300 and the inner rigidizing device 9310 may be terminated together into a common structure, such as a cassette 9357. The outer rigidizing device 9300 can be movable with respect to the inner rigidizing device 9310 by rotation of a disk 9389 that is mounted to the cassette 9357. For example, the disk 9389 can be a pinion, and the outer rigidizing device 9300 may have a rack 9382 including a plurality of small teeth on the outside thereof. Rotating the disk 9389 against teeth 9382 may cause outer rigidizing device 9300 to advance forward or backward relative to the inner rigidizing device 9310. In some examples, the possible movement or translation of the rigidizing devices 9300, 9310 is limited by the size or design of the cassette 9357.

The cassette 9357 can further include additional disks 9371a, 9371b that may connect to cables 9363a,b respectively, to steer (e.g., bend or deflect) the tip of the inner rigidizing device 9310 (and/or outer rigidizing device 9300). Other steering mechanisms (e.g., pneumatics, hydraulics, shape memory alloys, EAP (electro-active polymers), or motors) are also possible. Again, in examples with different steering mechanisms, one or more disks in the cassette 9357 (e.g., disks 9371a, 9371b) may be used to actuate the steering.

Figure 11A:
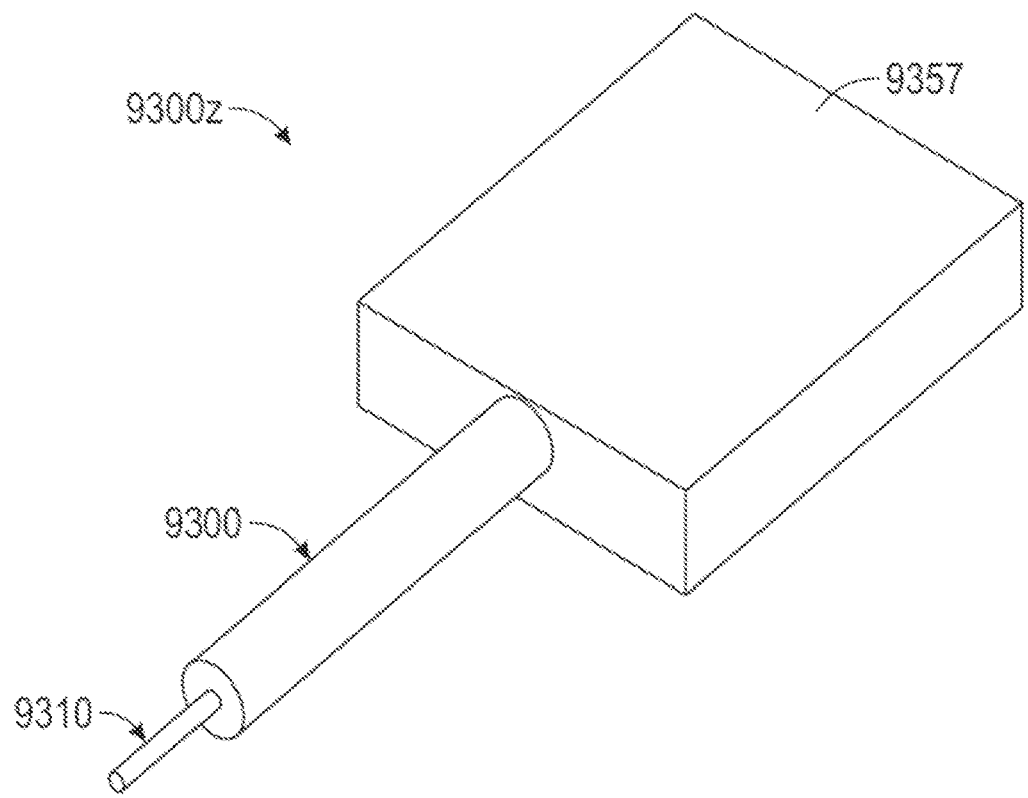
FIGS. 11A-11D show a robotically controlled rigidizing system.
Figure 11B:
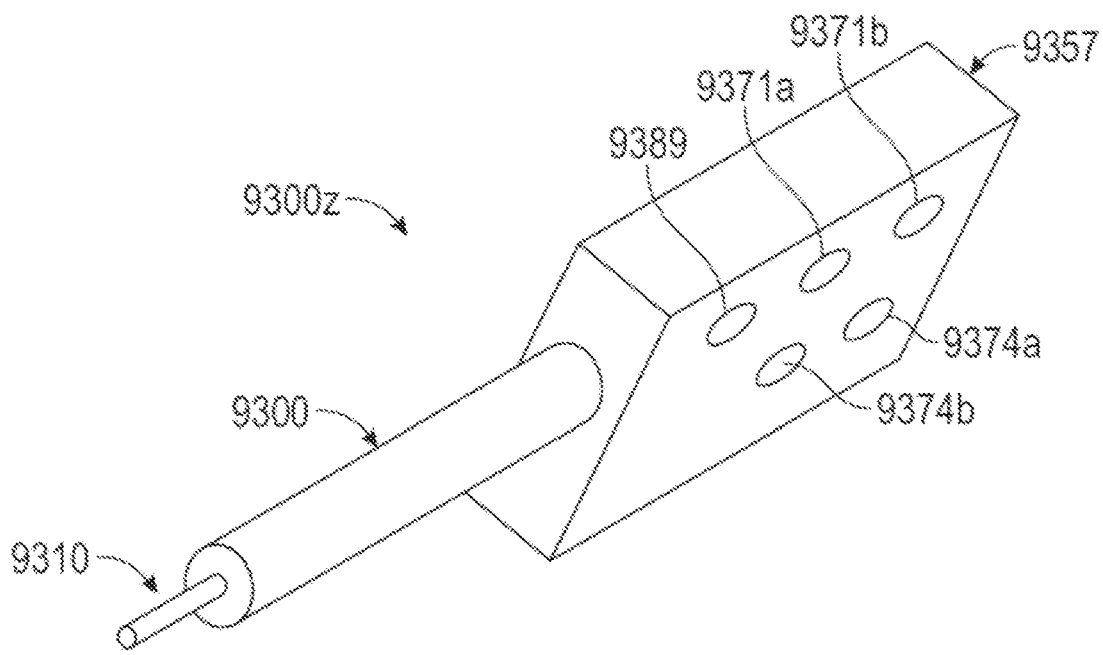
Figure 11C:
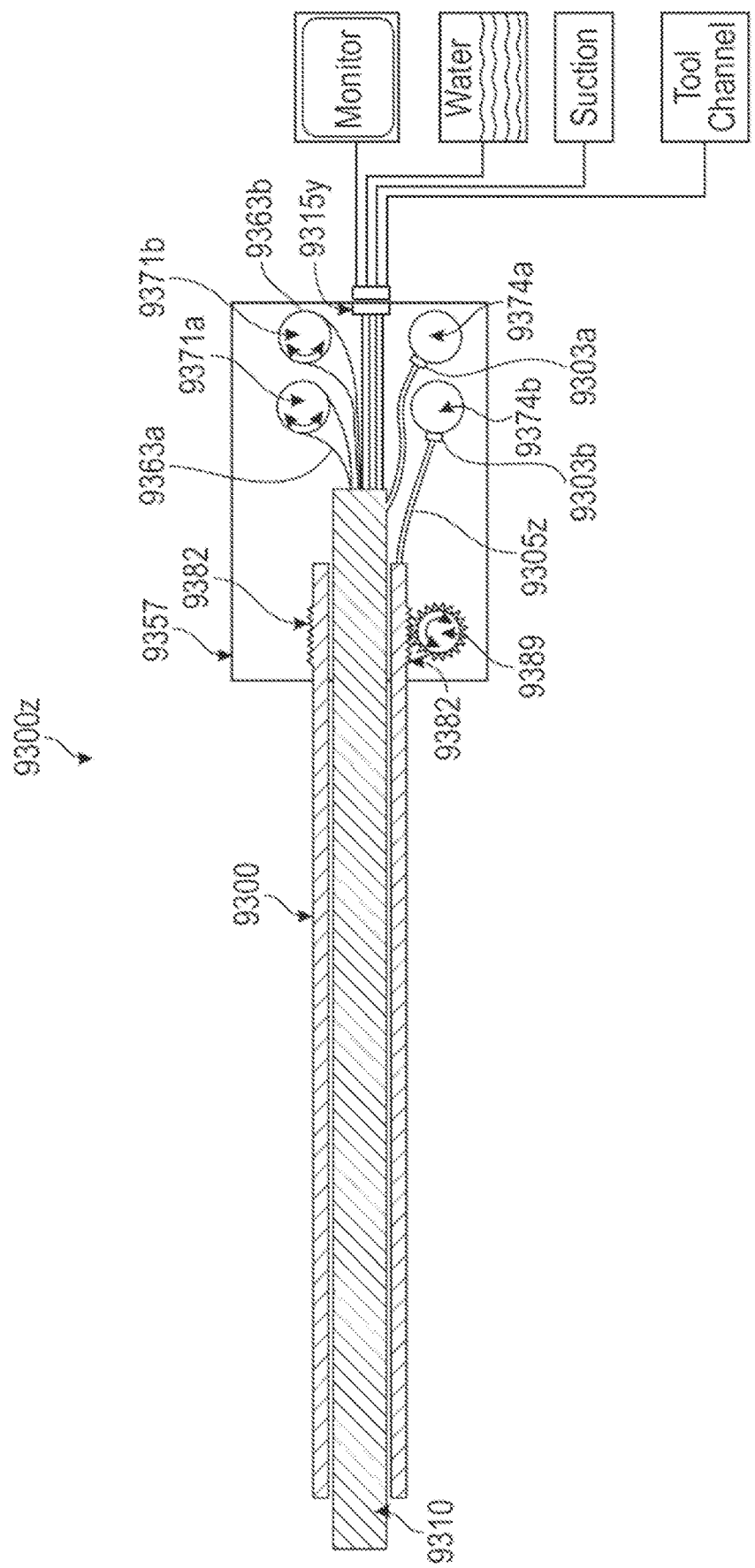
Figures 11D, 12A, 12B:
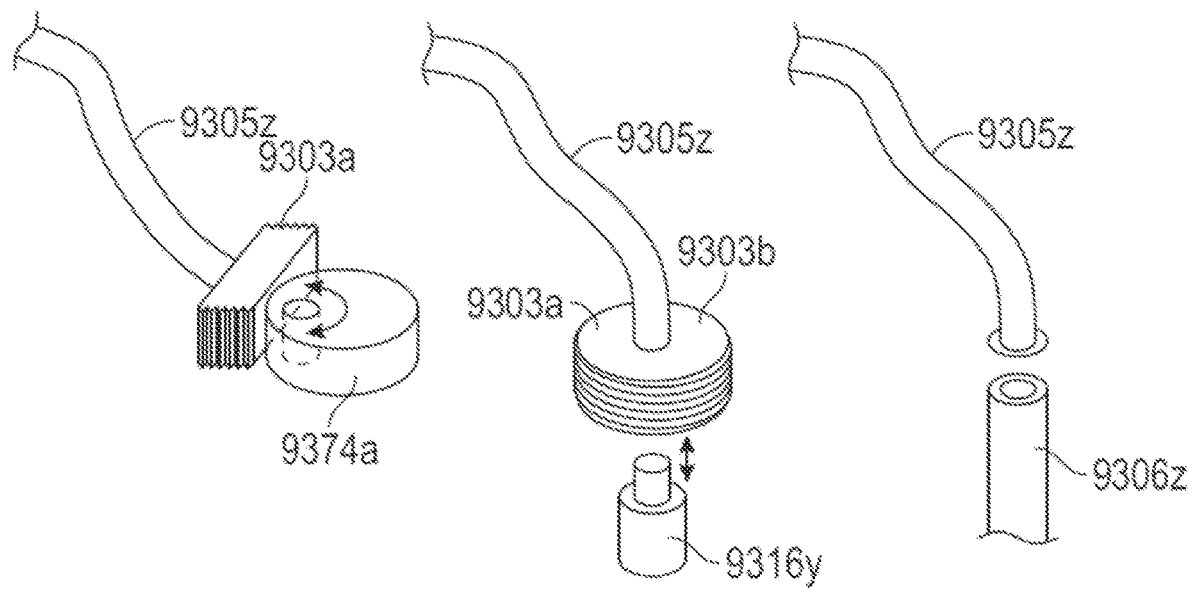
FIGS. 12A-12B show mechanisms of actuating a robotically controlled rigidizing system.

The cassette 9357 can further include bellows 9303a, 9303b that may connect to the pressure gap of the inner rigidizing device 9310 and the outer rigidizing device 9300, respectively. Compressing bellows 9303a, 9303b may drive fluid through pressure lines 9305z, causing the pressure in the pressure gap of the inner rigidizing devices 9310, 9300 to rise, causing the rigidizing devices 9310, 9300 to become rigid. Activation of the bellows 9303a, 9303b may be applied sequentially and/or simultaneously. As shown in FIGS. 9A-9D, the cassette 9357 can include eccentric cams 9374a,b to control bellows 9303a,b. Alternatively, as shown in FIG. 12A, one or more linear actuators 9316y (e.g., on cassette 9357 or on drive unit 9517y) can be configured to actuate the bellows 9303a,b. As another alternative, the devices 9300, 9310 can be rigidized and de-rigidized through one or more sumps (as described herein) or pressure sources 9306z (e.g., via pressure line 9305z), as shown in FIG. 12B. Other mechanisms causing rigidization of the inner and outer rigidizing devices 9310, 9300 are also possible. For example, in some examples, cassette 9357 can include a syringe or other container comprising a fluid that can be delivered to the inner and outer rigidizing devices 9310, 9300 to add pressure for rigidization. In some examples, a syringe or other container can be used to draw fluid within the cassette 9357, creating a vacuum that can be applied to the inner and outer rigidizing devices 9310, 9300.

Referring back to FIGS. 11A-11D, the cassette 9357 can include a connector 9315y for connecting to additional lumens and/or wiring in the inner rigidizing device 9310. The connector 9315y may include a connection for the delivery of both suction and water to the tip of the inner rigidizing device 9310. The connector 9315y may include electrical connector to connect to a camera mounted to the tip of inner rigidizing device 9310 to an external monitor and/or video processing unit. The connector 9315y may include a mechanical connector that connects to a hollow tube (e.g., working channel) leading all the way to the tip of the inner rigidizing device 9310. By including the connector 9315y, the control of all components of the system 9300z can be performed with the cassette 9357.

Disks 9389, 9371a, 9371b and cams 9374a, 9374b (or the corresponding bellows) may be accessible from the bottom of the cassette 9357, as best shown in the side perspective view of FIG. 93B. Disks 9389, 9371a, 9371b and/or cams 9374a, 9374b may have features, such as splines, pins or teeth, to transmit torque. These features can allow the disks 9389, 9371a, 9371b and/or cams 9374a, 9374b to be manipulated (e.g., by a drive unit).

Figure 13:
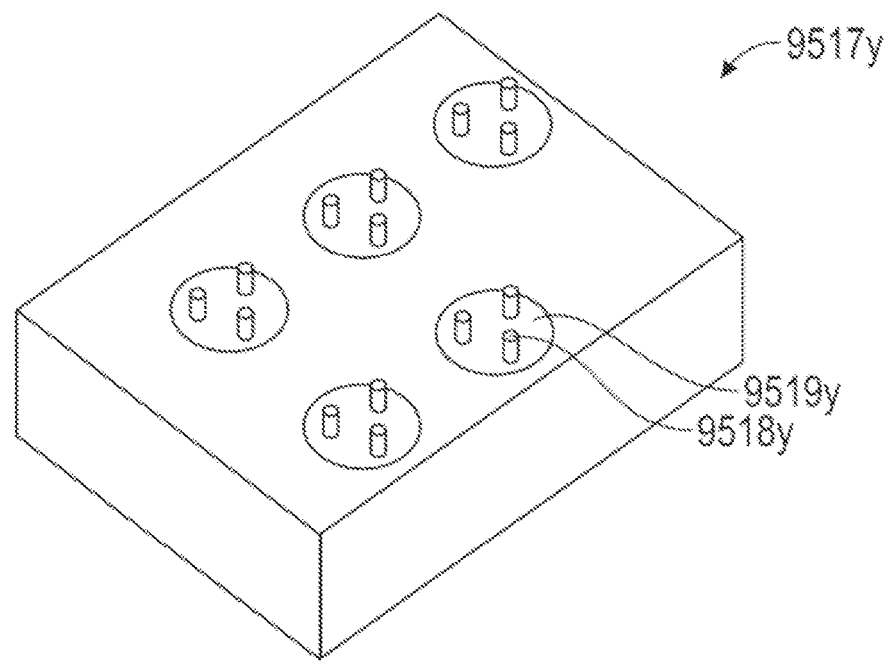
FIG. 13 shows a drive unit for a robotically controlled rigidizing system.

FIG. 13 shows an exemplary a drive unit 9517y that may be used to drive the disks 9389, 9371a, 9371b and/or cams 9374a, 9374b. For example, the drive unit 9517y can include drive paddles 9519y that may align with disks 9389, 9371a, 9371b and/or cams 9374a, 9374b of the cassette 9357. The drive paddles 9519y can be driven (i.e., rotated) by one or more motors of the drive unit 9517y so as to deliver torque to the disks 9389, 9371a, 9371b and/or cams 9374a. 9374b of the cassette 9357. The drive paddles 9519y can includes features 9518y (e.g., splines, pins, teeth, or the like) to transmit torque to the disks 9389, 9371a, 9371b and/or cams 9374a, 9374b of the cassette 9357. The drive unit 9517y may attach to the cassette 9357, for example, with clips, screws, or magnets.

Figure 14:
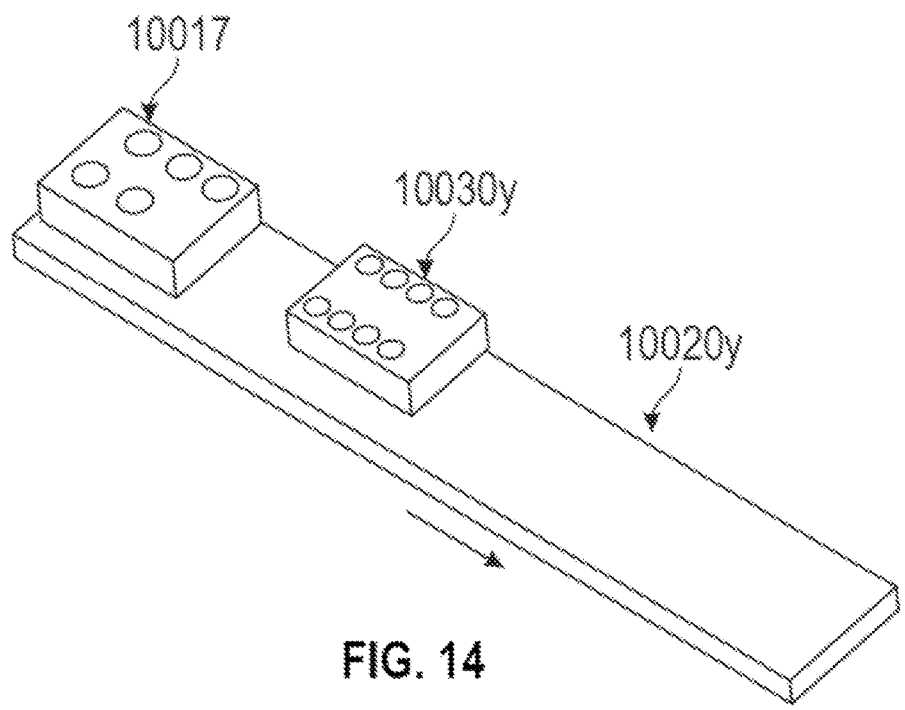
FIG. 14 shows a slide for use with a robotically controlled rigidizing system.

Referring to FIG. 14 and back to FIGS. 11A-11D, in some examples, the robotic system (e.g., system 9300z including the inner and outer rigidizing devices 9310, 9300 and cassette 9357) may be positioned on a linear slide 10020y. The linear slide 10020y can further include a drive unit 10017y (similar to drive unit 9517y) configured to control the inner and outer rigidizing devices 9310, 9300. The slide 10020y can allow the inner and outer rigidizing devices 9310, 9300 to be translated together (i.e., simultaneously). In some examples, in order to effect relative movement between of the inner rigidizing device 9310 with respect to the outer rigidizing device 9300, the system 9300z can be translated in a first direction (forwards or backwards along the slide 10020y) while simultaneously using the disk 9389 and rack 9382 on the outer rigidizing device 9300 to move the outer rigidizing device 9300 in a second direction, opposite to the first direction. That is, to advance the inner rigidizing device 9310 relative to the outer rigidizing device 9300, the system 9300z including both rigidizing devices 9300, 9310 is advanced along the slide 10020y while simultaneously retracting the outer rigidizing device 9300 using the disk 9389 and rack 9382. Conversely, to retract the inner rigidizing device 9310 relative to the outer rigidizing device 9300, the system 9300z including both rigidizing devices 9300, 9310 can be retracted along the slide 10020y while simultaneously advancing the outer rigidizing device 9300.

In some examples, the drive unit 1017y, rack 9382, and/or disk 9389 can include a force gauge thereon. The force gauge can be configured to measure the amount of force required to insert or withdraw the inner and/or outer rigidizing devices 9310, 9300. The force gauge can be used, for example, to trigger one or more alarms if the amount of force has exceeded a threshold (e.g., a threshold amount of force that may cause injury to the anatomy if exceeded). In some examples, the one or more alarms can be escalating alarms. For example, a first alarm can indicate caution, and a second alarm can indicate probable danger of injury. In some examples, the threshold for the alarm(s) can vary depending on the state or mode of the system 9300z. For instance, when inch-worming forward by alternating inner member 9310 and outer member 9300 rigidity, the alarm(s) can have a first set of threshold values. In contrast, when withdrawing and moving backwards (e.g., wherein both the inner and outer members 9310, 9300 are flexible), the alarm(s) can have a second set of threshold values. The alarm(s) can be represented, for example, by a change in an image on a screen (e.g., a virtual light or color change), a change in the light (e.g., brightness or color) from one or more physical lights, a vibration or rumble in a controller, and/or the blocking of certain motions or functions. Although described as being on the drive unit 1017y, rack 9382, and/or disk 9389, it should be understood that the force gauge can be placed elsewhere within the system 9300z while still enabling measurement of insertion and/or withdrawal force.

Referring to FIG. 14, the linear slide 10020y can further include a second drive unit 10030y configured to control a tool or tools (e.g., tool 9980) used with the inner and outer rigidizing devices. In some examples, the first drive unit 10017y and the second drive unit 10030y can independently translate along linear slide 10020y. One, two or more tools 9980 may attach to drive unit 10030Y. The linear slide 10020y can advantageously ensure that the tool(s) used with the nested rigidizing system stay in place at the distal end of the outer rigidizing device despite any translation by the outer rigidizing device. For example, the tool drive unit 10030y can be configured to translate the tool forward when the outer rigidizing device advances relative to the slide 10020y. Similarly, the tool drive unit 10030y can be configured to retract the tool when the outer rigidizing device retracts relative to the slide 10020y. This may ensure, for example, that the tool stays locked into the fitting (e.g., fitting 9823y).

Figure 15A:
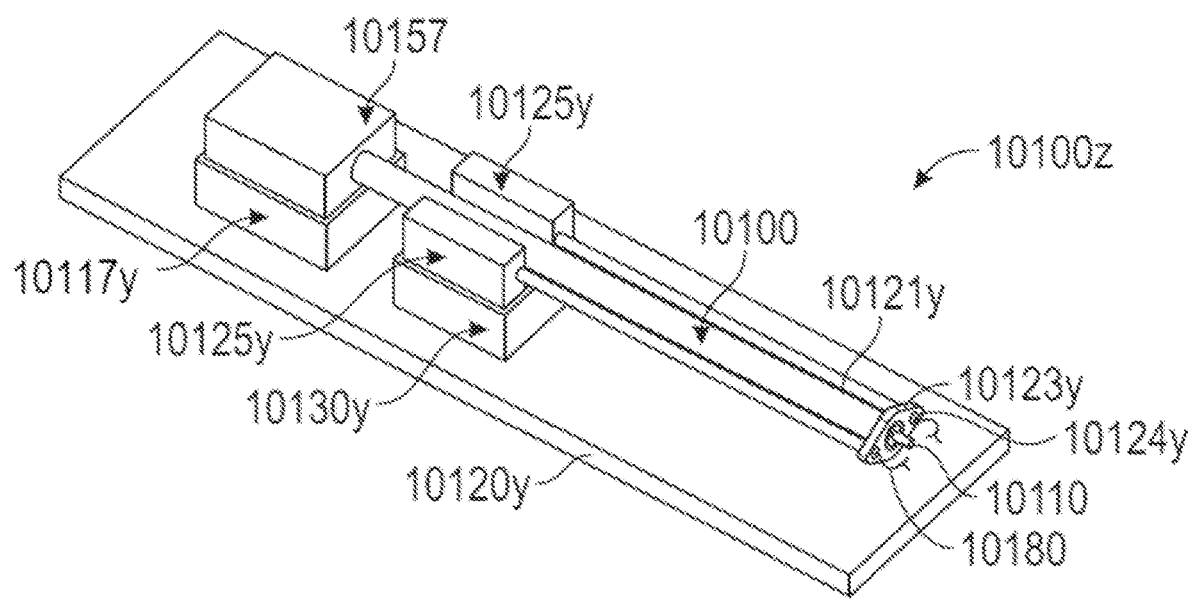
FIGS. 15A-15B show a robotically controlled rigidizing system.
Figure 15B:
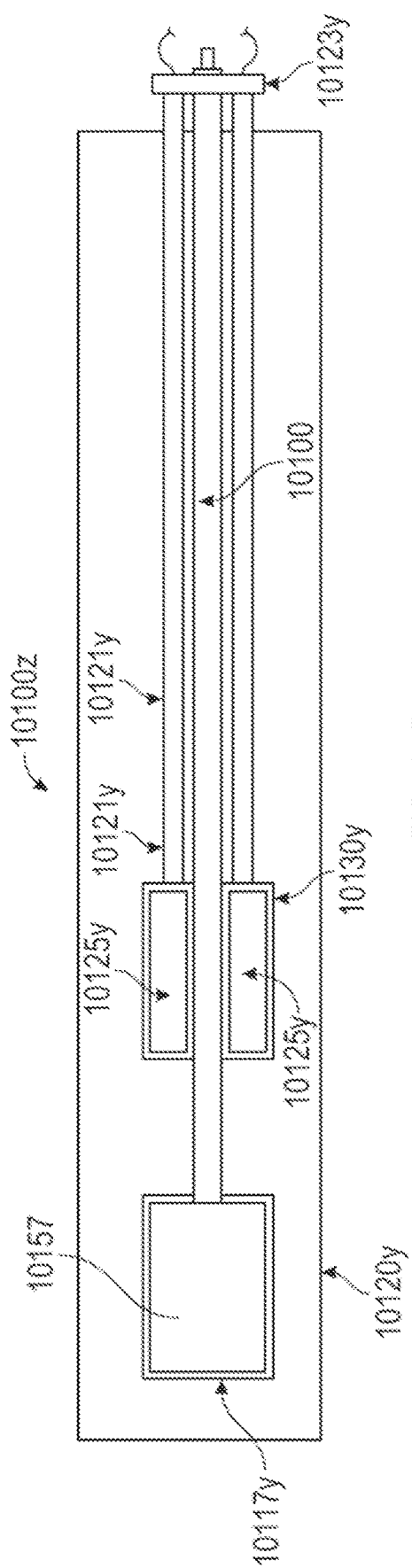

FIGS. 15A and 15B show top perspective and top views, respectively, of an exemplary robotic system 10100z positioned on a slide 10120y with cassette 10157 attached to a drive unit 10117y for control of the nested rigidizing devices 10100, 10110. Two cassettes 10125y for the control of two different tools 10180, are mounted to drive unit 10130y. The tools 10180 are inserted through guide 10121y and locked in fitting 10123y at ports 10124y.

Figure 16:
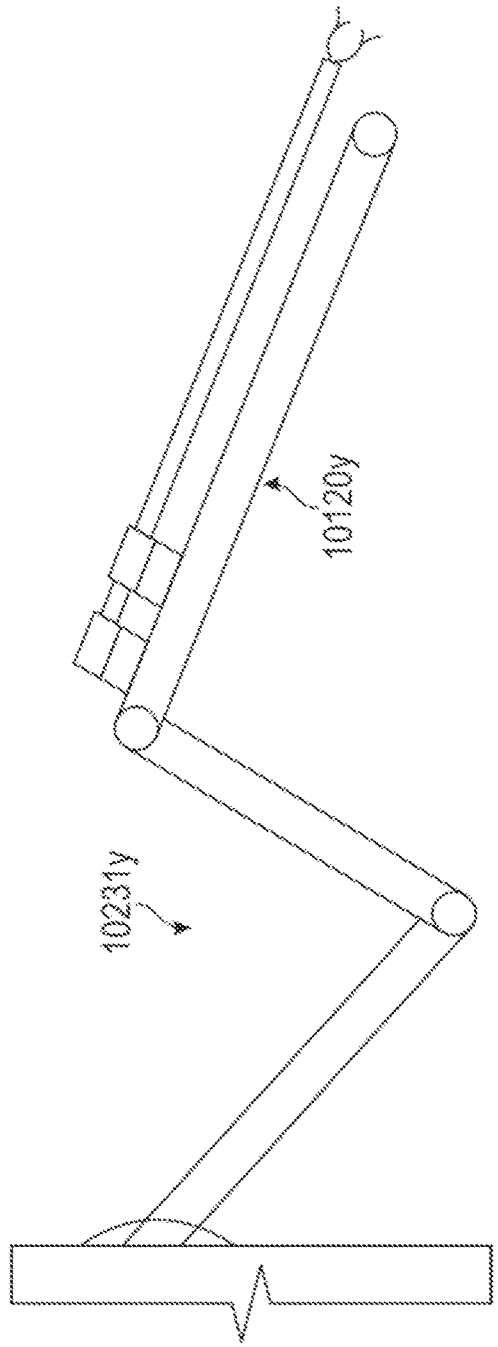
FIG. 16 shows a pivoting arm for a robotically controlled rigidizing system.

FIG. 16 shows an exemplary pivoting arm 10231y that can be connected to the linear slide 10120y so as to orient the slide 10120y and thus the rest of the robotic system (including nested rigidizing devices 10100, 10110 and/or tools 10180) relative to the patient. As such, the linear slide 10120y may be positioned vertically, horizontally or at an angle in between.

The system 10100z may be used in the following exemplary manner. Cassette 10157 is attached to the inner and outer rigidizing devices 10110, 10100, and the inner and outer rigidizing devices 10110, 10100 are advanced into the patient's body (e.g., as detailed in FIGS. 65 A-H). In some examples, the inner and outer rigidizing devices 10110, 10100 are advanced into the patient's colon or upper GI tract. Reciprocating motion of the inner rigidizing device 10110 and outer rigidizing device 10100 is provided by the motion of disk a disk within the cassette 10157 and the translation of the rigidizing devices 10110, 10100 along the slider 10120y. Rigidization is provided by compressing bellows in cassette 10157. Steering is provided by disks in cassette 10157. When a medical practitioner has reached the place in the body where the procedure is to be performed, a tool can be inserted through guide 10121y and locked to ports 10124y. The cassettes 10125y are then attached to drive unit 10130y for control of the tool.

The drive units described herein may be connected to a computer (e.g., computer, tablet, laptop, etc.) for control. The computer in communication with the drive units may comprise software providing a user interface for a clinician to interact with to control the system and any tools being used. Automation, such as via computer controls of the cassettes and/or drive units described herein, can be used to make repetitive tasks easier to perform. For instance, a program can be developed that automatically moves the distal end of the rigidizing device in an arc while emitting water. A second arc can then be made to suction water and material from the GI tract. This may be useful, for example, in cleaning the GI tract. A program can be developed to perform the rigidization steps outlined herein in sequence such that the operator needs only to provide input, with, for example, a joystick, to direct the distal end of the device.

Figure 17:
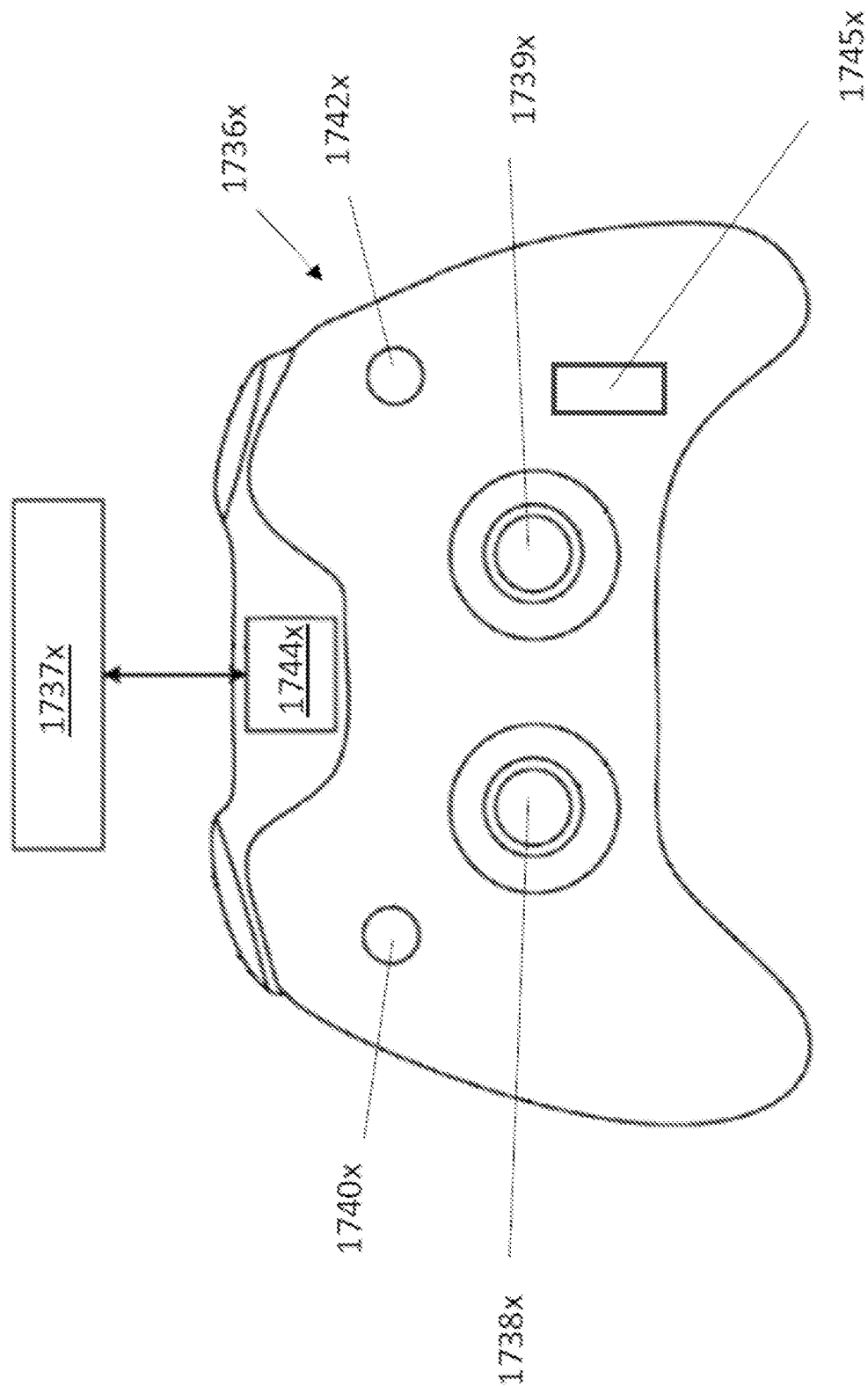
FIG. 17 shows an exemplary user-activated control for a robotically controlled rigidizing system.

Referring to FIG. 17, in some examples, the use of system 2400z or 9300z (e.g., the sequence described with respect to FIGS. 10A-10H) can be performed using a control 1736x connected (e.g., wirelessly via onboard electronics 1744x) to a computational device 1737x (i.e., a controller or computer). The control 1736x can be a hand-held control 1736x that include a steering actuator 1738x (e.g., toggle) configured to enable steering (e.g., up/down and left/right) of the inner rigidizing device 2410/9310. The control 1736x can further include a movement actuator 1739x (e.g., toggle) configured to enable forward/backward motion of the inner rigidizing device 2410/9310.

In some examples, the control 1736x can further include an actuator 1740x (e.g., button) configured to enable the outer rigidizing device 2400/9300 to automatically shape copy the inner rigidizing device 2410/9310. That is, upon activating the actuator 1740x (e.g., pushing the button), the inner rigidizing device 2410/9310 can transition from the flexible to the rigid configuration, then the outer rigidizing device 2400/9300 can transition from the rigid configuration to the flexible configuration, and the outer rigidizing device 2400/9300 can be advanced over the inner rigidizing device 2410/9310. In some examples, the advancement of the outer rigidizing device 2400/9300 can be terminated when the outer rigidizing device 2400/9300 reaches a preset position relative to the inner rigidizing device 9410/9310 (e.g., when the distal end of the outer rigidizing device 2400/9300 aligns with the distal end of the inner rigidizing device 2410/9310). In other examples, advancement of the outer rigidizing device 2400/9300 advancement can be terminated automatically by a sensor reading. For example, the sensor reading can be an output from a camera of the inner rigidizing device 2410/9310 (e.g., when the camera sees the outer rigidizing device 2400/9300 appear in the camera image). As another example, the sensor reading can be an amount of force that is required to advance the outer rigidizing device 2400/9300 (i.e., when the required force meets a pre-set threshold). When the outer rigidizing device 2400/9300 has completed its shape copying sequence, then the outer rigidizing device 2400/9300 can be automatically rigidized, and the inner rigidizing device 2410/9310 unrigidized to complete the automatic shape copying sequence. In some examples, the actuators 1738x, 1739x can be deactivated (i.e., to prevent movement of the inner rigidizing device 2410/9310) while the automatic shape copying sequence of the outer rigidizing device 2400/9300 (via activation of the actuator 1740x) is performed.

Although the steering and motion actuators 1738x, 1739x are shown in FIG. 17 as toggles and the automatic shape copying actuator 1740x as a button, it should be understood that any of the actuators could be replaced with alternative actuators (e.g., toggle, buttons, joysticks, slides, or track balls). Any of the actuators 1738x, 1739x, 1740x can include haptic feedback. For example, the activation of motion actuator 1739x can include a resistance to motion proportional to the amount of force required to move the inner rigidizing device 2410/9310 forward or backward.

In some examples, the control 1736x can include an actuator 1742x (e.g., button) in addition to or in lieu of the actuator 1740x. The actuator 1742x can be configured to enable the outer rigidizing device 2400/9300 to automatically shape copy the inner rigidizing device 2410/9310. The actuator 1742x can be similar to the button 1740x except that the button 1742x can be configured to be held down by the user until the desired advancement of the outer rigidizing device 2400/9300 has been reached. Upon release of the actuator 1742x, the outer rigidizing device 2400/9300 can be automatically rigidized and the inner rigidizing device 2410/9310 unrigidized. When the actuator 1742x is actuated, the shape copying sequence can automatically stop (e.g., as described with respect to button 1740x) if the user does not release the actuator 1742x before a signal to terminate advancement is detected by the system 2400z/9300z (e.g., the via alignment of the distal ends of inner and outer rigidizing devices 2410/9310, 2400, 9300, via a camera reading, or via a force sensor). The actuator 1742x can thus provide an automated shape copying sequence with more control by the user over the movement of the outer rigidizing device 2400/9300 than actuator 1740x.

In some examples, the control 1736x can include an actuator 1745x (e.g., lever) in addition to or in lieu of the actuators 1740x, 1742x. The actuator 1745x can be configured, when actuated, to switch modes of the actuator 1739x such that the actuator 1739x switches between enabling forward/backward motion of the inner rigidizing device 2410/9310 and forward/backward motion of the outer rigidizing device 2400/9300. In this example, when the user toggles between modes, the computational device 1737x and/or onboard electronics 1744x can automatically rigidize the former device (i.e., the device that is no longer controlled by the actuator 1739x) and unrigidize the current device (i.e., the device that is being controlled by the actuator 1739x).

In some examples, advancement of the outer rigidizing device 2400/9300 can be actuated automatically, such as when the inner rigidizing device 2410/9310 stops moving for longer than a set time interval or when the inner rigidizing device 2410/9310 cassette reaches a preset end of travel with respect to the outer rigidizing device 2400/9300.

In some examples, the system 2400z/9300z can include a mechanism designed to ensure that the outer rigidizing device 2400/9300 does not disturb the set shape (e.g., the shape of the steerable distal end section and/or the rigidized shape of the body) of the inner rigidizing device 2410/9310 as the outer rigidizing device 2400/9300 is advanced thereover. In one example, when the outer rigidizing device 2400/9300 is advanced, a tension sensor can be used by the computational device 1737x to enable adjustment to the position/orientation of the steerable distal end section of the inner rigidizing device 2410/9310. In an exemplary method of use, the tension on the steering cables (e.g., similar to cables 7624) can first be measured (i.e., after the inner rigidizing device 2410/9310 has been rigidized and before the outer rigidizing device 2400/9300 is advanced). The outer rigidizing device 2400/9300 can then be advanced over the inner rigidizing device 2410/9310, and the tension on the cables can be measured. The change in cable tension can be used (e.g., in conjunction with the stiffness of the cable) to determine the amount of unintended displacement of the steerable distal end section of the inner rigidizing device 2410/9310. After the unintended displacement has been determined, a counter displacement can be actuated by the cables to adjust the position of the distal end section of the inner rigidizing device 2410/9310 to another position. For instance, back to its starting position. In some examples, a sensor, such as a fiber optic sensor, may be used to sense the shape of the steerable distal end section of the inner rigidizing device 2410/9310 instead of or in addition to the tension sensor.

In another example, a camera on the distal tip of the inner rigidizing device 2410/9310 can be used in addition to or instead of the tension sensor to control movement (e.g., radial movement) of the inner rigidizing device 2410/9310 as the outer rigidizing device 2400/9300 is advanced thereover. That is, the camera on the inner rigidizing device 2410/9310 can be visually served in place to maintain a fixed position while the outer rigidizing device 2400/9300 is advanced thereover (i.e., the visual image from the camera of the inner rigidizing device 2410/9310 can be used as feedback to prevent the outer rigidizing device 2400/9300 from deforming the shape of the inner rigidizing device 2410/9310). In some examples, the computational device 1737x can prevent the outer rigidizing device 2400/9300 from advancing if the image displacement has reached a certain threshold, thereby preventing the outer rigidizing device 2400/9300 from having too much of an effect on the fixed shape of the inner rigidizing device 2410/9310. In other examples, the computational device 1373x can compute a vector based upon movement of the image and command the distal tip to move back to the original position (e.g., by adjusting the steering cables). Advantageously, using the camera to keep a fixed position of the distal tip of the inner rigidizing device 2410/9310 can also help ensure that the user is able to maintain a fixed visual position within the anatomy.

Similarly, in some examples, the system 2400z/9300z can include a mechanism designed to ensure that the inner rigidizing device 2410/9310 does not disturb the set shape (i.e., rigidized shape) of the outer rigidizing device 2400/9300 as the inner rigidizing device 2410/9310 advances therethrough. For example, the computational device 1737x can ensure that tension on the steering cables of the inner rigidizing device 2410/9310 is kept uniform at less than a threshold value (such as at a low value of less than ¼ lb) as the inner rigidizing device 2410/9310 advances, thereby ensuring that the inner rigidizing device 2410/9310 does not put too much force on the outer rigidizing device 2400/9300. In some examples, the tension in the cables can be limited to a certain (low) threshold value only until the steerable distal end section of the inner rigidizing device 2410/9310 is completely distal to the distal end of the outer rigidizing device 2400/9300. In some examples, the steering cables can be advanced while holding the tension they had immediately after the outer rigidizing device 2400/9300 was rigidized.

In some examples, shape copied curves may gradually straighten as they are propagated proximally along the system 2400z/9300z because a higher bending stiffness may lead to degraded shape copying fidelity. This gradual straightening (or "relaxation") may be advantageous to assist in navigating through the tortuous anatomy (e.g., to reduce capstan drag). In one example, to encourage this straightening at the proximal end, the system 2400z/9300z can include a gradual taper in the diameter of the outer device 2400/9300 such that the device 2400/9300 (and system 2400z/9300z) includes a larger diameter at the proximal end and a smaller diameter at the distal end. By increasing the diameter at the proximal end, the system 2400z/9300z may be stiffer at the proximal end than the distal end and thereby encourage relaxation. In another example, to encourage this straightening at the proximal end, one or both of the inner rigidizing device 2410/9310 or the outer rigidizing device 2400/9300 can include a tapered space or gap in the device wall between the innermost layer 115 and the outermost layer 101 (see the exemplary wall layout in FIG. 3C). The gap can be larger at the proximal end of the respective device(s) 2410/9310, 2400/9300 and smaller at the distal end of the device(s) 2410/9310, 2400/9300. The smaller gap at the proximal end may result in a proximal end that is less flexible and therefore more likely to straighten.

In some examples, the system 2400z/9300z can be configured to enable commanded relaxation of the curvature of the shape copied formation while the system 2400z/9300z is within the anatomy. For example, it may be desirable to relax the curvature, i.e., partially straighten the rigidized state of both devices 2410/9310, 2400/9300, in order to reduce capstan drag as the devices 2410/9310, 2400/9300 are slid relative to one another and/or as a third device is passed through the system 24002/9300z. Advantageously, the curvature relaxation can be configured so as to slightly pull or straighten the anatomy (e.g., the colon) within which the system 2400z/9300z is positioned without causing harm thereto.

In one example of commanded curvature relaxation, both the inner rigidizing device 2410/9310 and the outer rigidizing device 2400/9300 can be relaxed simultaneously, enabling the entire system 2400z/9300z to tend towards straightness (though constrained partially by the anatomy). In this example, the combined stiffnesses of the inner and outer rigidizing devices 2410/9310, 2400/9300 in the flexible configuration can be designed to be less than the stiffness of a device known to be safe in the anatomy. For example, for use in the colon, system 2400z/9300z can have a combined stiffness that is less than that, for example, of a standard adult colonoscope, thereby ensuring that the system 24002/9300z will exert no more force on the colon during curvature relaxation than a device known to be safe.

In another example of commanded curvature relaxation, the inner rigidizing device 2410/9310 and the outer rigidizing device 2400/9300 can be alternately rigidized and unrigidized without translating either device 2410/9310, 2400/9300, thus resulting in a gradual relaxation of the curves (as each copying cycle may inevitably allow the system 2400z/9300z to straighten slightly). For example, both devices 2410/9310, 2400/9300, can first be rigidized. A first of the inner or outer rigidizing devices 2410/9310, 2400/9300 can then be relaxed and subsequently rigidized. The second of the inner or outer rigidizing devices 2410/9310, 2400/9300 can then be relaxed and subsequently rigidized. The loop of rigidization/relaxation can be repeated until the shape of the system 2400z/9300z is smoothed (i.e., the curvature relaxed) to the desired shape.

In another example of commanded curvature relaxation, a combination of the above two mechanisms can be used to phase the transfer between the rigidized and unrigidized states. That is, the system 2400z/9300z can fluctuate between having both devices 2410/9310, 2400/9300 rigidized to having only one device 2410/9310, 2400/9300 rigidized to having neither device 2410/9310, 2400/9300 rigidized, to having only one device 2410/9310, 2400/9300 rigidized, to rigidizing both devices 2410/9310, 2400/9300, etc.

Any of the methods of commanded curvature relaxation described herein can be modified to adjust the amount of relaxation desired. For example, the number of cycles (of rigidizing and unrigidizing) can be varied to change the amount of relaxation. As another example, the frequency and/or duty cycles of the cycles can be varied (e.g., how long the unrigidized configuration is maintained). As another example, the pressure and/or vacuum applied during the rigidized and unrigidized phases can be modified (e.g., instead of releasing all of the vacuum/pressure in the unrigidized phase, a partial release can be performed to allow the braid to slip only in the highest curvature regions).

In some examples of commanded curvature relaxation, the relaxation can be applied up to a particular threshold. For example, the relaxation sequence can be performed until only bends tighter than a set radius (e.g., a radius of 2 inches) are relaxed.

In some examples of commanded curvature relaxation, the steerable distal end section of the inner rigidizing device 2410/9310 can be used to selectively modify the shape of the outer rigidizing device 2400/9300 (e.g., to relax the curvature in a specific location).

In some examples, commanded curvature relaxation can be used to assist in passing working tools through the system 2400z/9300z. For example, the system 9300z can be relaxed until the working tool passes through the system 2400z/9300z to reduce the tortuosity that the tool is exposed to.

In some examples, the system 24002/9300z can be used to perform a reduction maneuver within the anatomy (i.e., to straighten a tortuous path within the anatomy, such as within the colon). During the reduction maneuver, the distal end of the system 24002/9300z can be anchored (e.g., by angulating around a bend in the colon, such as the splenic flexure), and then the entire system 24002/9300z (i.e., both the inner and outer rigidizing devices 2410/9310, 2400/9300) can be pulled proximally while in the flexible configuration. Pulling proximally on the system 2400z/9300z while the distal end is anchored can straighten the lumen distal to the anchoring point, thereby straightening the tortuous path.

In some examples, the system 2400z/9300z can be used to unfurl or unloop the anatomy during insertion. For example, the system 2400z/9300z can be used to enter the patient's colon to the patient right and form an alpha loop to open up a folded sigmoid colon.

Figures 19A, 19B:
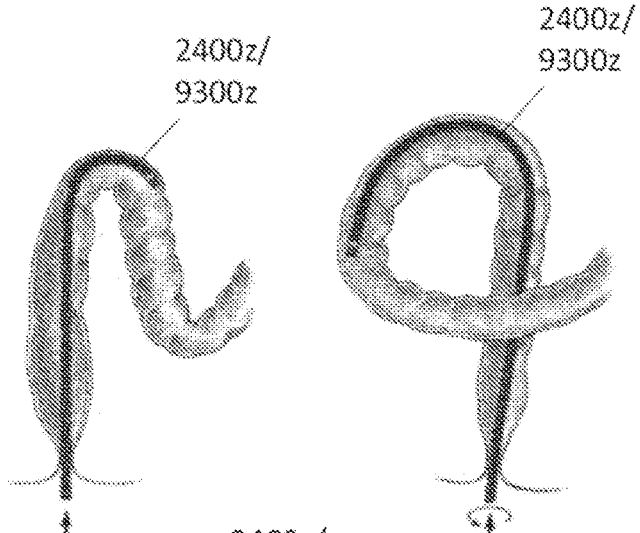
FIGS. 19A-19C show a twisting maneuver in the colon.
Figure 19C:
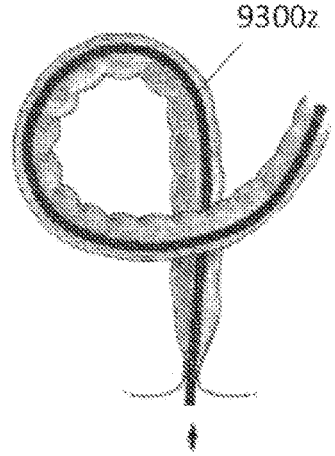

In some examples, the system 2400z/9300z can be used to perform a maneuver similar to twisting the entire system 24002/9300z from the proximal end (e.g., to assist in unfurling or unlooping the anatomy). That is, the maneuver can enable the system 2400z/9300z to mimic the movement that would occur if the system 2400z/9300z were bent at a fixed angle and then the entire system was rotated (e.g., by 90-180 degrees) from the proximal end while maintaining fixed angle of the bend. Referring to FIGS. 19A-19C, for example, this twisting maneuver can enable unfurling of a curved loop, such as of an N-loop. That is, as shown in FIG. 19A, the system 2400z/9300z can be advanced into the colon up until the first curve of the N-loop. At FIG. 19B, the system 2400z/9300z can activate the twisting maneuver (i.e., to mimic twisting) and be advanced further into the colon, thereby pulling and looping the colon over itself and enabling navigation through a larger radius of curvature rather than the tight radius of curvature in the N-loop. The system 2400z/9300z can then be advanced further into the colon through the large radius curve. Although shown as being used in the colon to straighten an N-loop, it should be understood that this twisting maneuver could be used in other anatomical locations.

In one specific example, the twisting maneuver can be performed by activating a plurality of the cables on the inner rigidizing device 2410/9310 simultaneously. For example, in some examples, the inner rigidizing device 2410/9310 can include a steerable distal end that is controlled by actuating four cables (two cables to control the actuation in the "x-plane" and two cables to control the actuation in the "y-plane"). The "x-plane" (or roll) can be controlled by moving the actuator 1738x left-right while the "y-plane" (or pitch) can be controlled by moving the actuator 1738x up-down. Moving the actuator 1738x up can pull the y-positive cable taught and tilt the inner rigidizing device 2410/9310 "north." When the twisting maneuver is actuated (e.g., by pressing an actuator, such as a button, on the control 1736x), the motion of the actuator 1738x and x,y output can be no longer correlated in the same way. Rather, when a bend is formed and the twisting maneuver is actuated, the computational device 1737x can calculate the polar coordinates radius r and angle θ using the equations below:

$$r=\sqrt{x2+y2} \text{ and } \theta=a\tan 2(x,y)$$

Once those values are calculated, a unique cosine and sine curve can be calculated that will serve as the calculator to output the new x and y coordinates, where r serves as the amplitude for the y axis and θ is the initial location along the x-axis between intervals (−180°, 180°]. In this twisting maneuver, the actuator 1738x may simply require one axis (e) to output both the x and y values necessary to actuate the bending section. The computational device 1737x can cycle through the range (−180, 180] and output x and y using the equations below:

$$x = r\cos(\theta) \text{ and } y = r\sin(\theta)$$

In this example, movement of the actuator 1738x left or right can cause the computational device 1737x to cycle through a value θ up or down between a range of (−180 and as described above, which can result in a computation of the x and y values for movements of the cables. Moving the actuator 1738x left-right can therefore result in rotating or twisting the bending section (i.e., rotating/twisting clockwise or counterclockwise).

In some examples, before the twisting maneuver, the tip of the outer rigidizing device 2400/9300 can be advanced distal to the tip of the inner rigidizing device 2410/9310 to extend the length of the arc created.

In some examples, the system 2400z/9300z can be configured to maneuver into a tighter curve than the steerable distal end section of the inner rigidizing device 2410/9310 can achieve on its own. For example, the steerable distal end section of the inner rigidizing device 2410 can be positioned such that it is only partially covered by the outer rigidizing device 2400/9310. If the rigidizing device 2400/9300 is placed in the rigid configuration (with the steerable distal end section of the inner rigidizing device 2410 partially covered), the high stiffness of the outer rigidizing device 2400/9300 can prevent the covered portion of the steerable distal end section of the inner rigidizing device 2410/9310 from bending. As a result, only the exposed portion of the distal end section will bend, enabling the formation of a tight (i.e., low radius of curvature) and small bend or curve in the distal end section.

In some examples, the system 2400z/9300z can be used to map the shape of the anatomy (e.g., the colon) through which the system 2400z/9300z passes. For example, after placement and rigidization of the outer rigidizing device 2400/9300, the inner rigidizing device 2410/9310 can be withdrawn in a flexible state into the outer rigidizing device 2400/9300. As the device 2410/9310 is withdrawn (and/or as it is inserted again after withdrawal) within the rigid outer device 2400/9300, the tension on the steering cables can be monitored (e.g., with a tension sensor and computational device 1737x as described herein) to map the shape of the rigidized outer device 2400/9300 (and thus, correspondingly, the shape of the anatomy). As another example, the outer rigidizing device 2400/9300 can be withdrawn and then reinserted. As the device 2400/9300 (in the flexible configuration) is reinserted over the rigid inner device 2410/9310, a force sensor can be used to measure the insertion forces of the outer rigidizing device 2400/9300 to measure the severity of the bends of the inner rigidizing device 2410/9310 (and thus, correspondingly, the shape of the anatomy).

Similarly, in some examples, with knowledge of the commanded distal articulations of the steerable distal end of the inner rigidizing device 2410/9310 and the subsequent shape copying sequence (including axial motion of the inner and outer devices 2410/9310, 2400/9300), an estimate of the accumulated overall shape of the system 2400z/9300z can be produced and used for control, visualization, and/or general situational awareness. Additionally, the efficiency and/or accuracy of shape copying can be modeled either empirically or analytically and applied to the overall shape estimate.

In some examples, a camera on the distal end section of the inner rigidizing device 2410/9310 can be used as part of a computer vision algorithm (e.g. by the computational device 1737x) for steering and/or control of the system 2400z/9300z. For example, the computational device 1737x can use a computer vision algorithm to determine when the steerable distal end section of the inner rigidizing device 2410/9310 is moving. The computational device 1737x can then calculate the net rotational and linear motion of the camera from the motion of elements in a camera view at a known or approximate range. This can be useful, for example, to detect how a motion of a steering cable affects the steering of the steerable distal end section to ensure calibration of the steering. As another example, the computational device 1737x can use a computer vision algorithm to enable an automatic lumen following mode (i.e., via detection of the lumen with the computer vision algorithm). In this example, for example, the user (e.g., physician) can command the insertion axis for the system 2400z/9300z, and the system 2400z/9300z can automatically articulate following the commanded path. In another example, the system 2400z/9300z can provide the user with a visual guide suggesting where to drive the inner rigidizing device 2410/9310 for optimal lumen following. In this example, the visual guide can be rendered on the endoscope view as a target for the physician to aim the camera. In another example, the system 2400z/9300z can provide the user with steering guides (e.g. a potential field) that bias the driving commands for the inner rigidizing device 2410/9310 towards the optimal trajectory while still allowing the physician to "push through" (i.e., ignore) the guides if desired.

In some examples, the system 2400z/9300z can be configured to undergo a diagnostic mode. For example, in diagnostic mode, the inner rigidizing device 2410/9310 can be partially or fully withdrawn into the outer rigidizing device 2400/9310 (and/or the outer rigidizing device 2400/9300 can be moved partially thereover). If it is suspected that a steering cable on the inner rigidizing device 2410/9310 is broken, then a diagnostic test can be performed of the steering cables and their respective actuators. For example, a motor controlling a steering cable of the inner rigidizing device 2410/9310 can be actuated such that the distal bending section of the inner rigidizing device 2410/9310 presses against the inside of the rigidized outer device 2400/9300. During this maneuver, a corresponding increase in tension on the steering cables should be seen. If there is no increase in tension, then it can be determined that the respective steering cable may be broken.

Figure 18A:
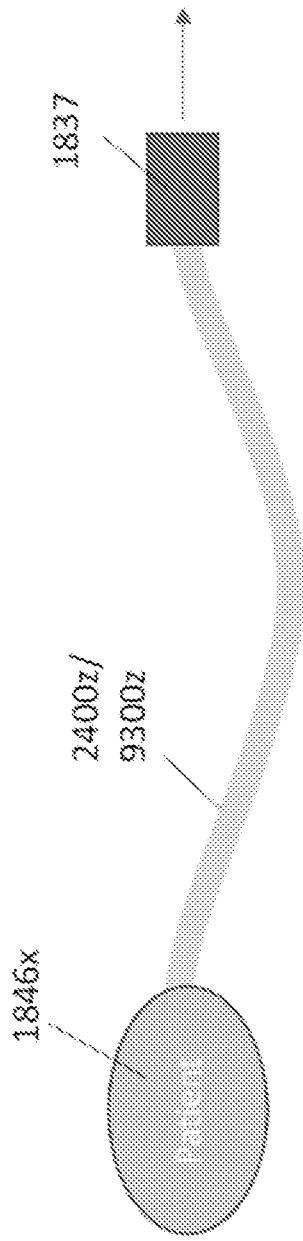
FIG. 18A shows a rigidizing system in the flexible configuration sagging.
Figure 18B:
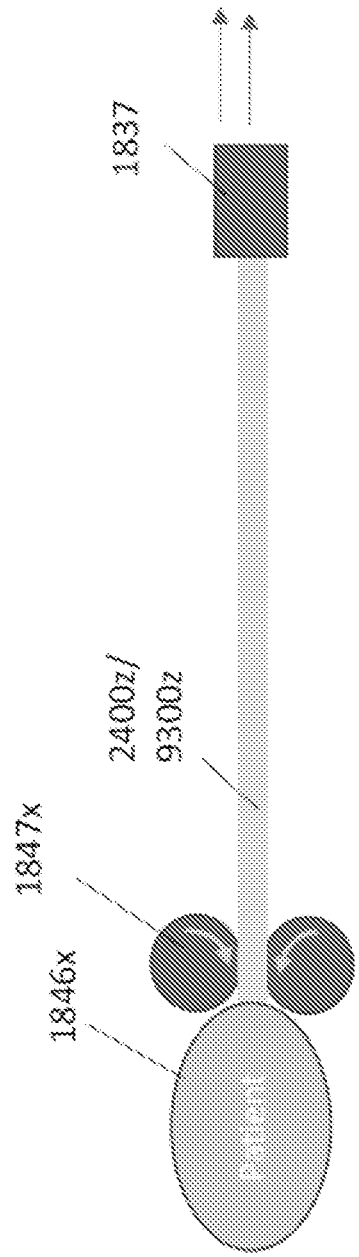
FIG. 18B shows a rigidizing system with drive wheels that prevent sagging.

Referring to FIG. 18A, in some examples, when the system 2400z/9300z is being withdrawn in the entirely flexible configuration (e.g., for removal or for a reduction maneuver), the system 2400z/9300z may sag outside of the patient's body 1846x. To compensate for this sagging, a support and/or anti-buckling device can be used to support the system 2400z/9300z outside of the body. In other examples, referring to FIG. 18B, to compensate for sagging, the system 2400z/9300z can include a plurality of drive wheels 1847x or other gripping mechanism at the entrance point (e.g., mouth or anus) to the body lumen through which the system 2400z/9300z is maneuvering. The drive wheels 1847x can advantageously maintain tension on the system 2400z/9300z as it is withdrawn, thereby keeping the portion of the system 2400z/9300z that is external to the body 1846x relatively straight and self-supporting from the body 1846x to the proximal termination point (e.g., cassette 1837). In other examples, the system 2400z/9300z can be used without an anti-buckling device and/or other mechanism to support the system 2400z outside of the body by not transitioning the system 9400z to a fully flexible configuration. That is, the system 2400z can be used and configured such that at least one device 2400, 2410 is always rigidized (i.e., as the devices 2410, 2400 are alternately advanced and rigidized). As such, the majority of the length of the system 2400z overall can be rigid during use. Due to its rigid state, the system 2400z can be stable outside of the body (i.e., during insertion) without an external anti-buckling device and/or support mechanism.

In some examples, whenever the inner rigidizing device 2410/9310 is moving forward, the position of the steering cables can be precisely controlled. In contrast, whenever the inner rigidizing device 2410/2400 is moving backwards or the outer rigidizing device 2400 is moving forwards, the tension on the cables can be precisely controlled.

It should be understood that where "tension" is described with respect to the steering cables herein (e.g., monitoring tension), other mechanisms for actuating the cables are possible (e.g., hydraulic pressure).

In some examples, the inner rigidizing device and the outer rigidizing device may be advanced by the robotic system described herein using small steps (e.g., less than 1-inch steps). Small steps may advantageously allow for more precise control of the placement and orientation of the rigidizing devices. For example, the user may steer the inner tube in the desired direction and, as the inner tube advances ahead of the outer tube by a small amount (for instance, ½, ¾ or just under 1 inch), the sequence of rigidization and advancement or retraction of the outer tube can be triggered automatically. In some examples, the present sequence of small steps can be overridden when desired. In some examples, the inner rigidizing device and outer rigidizing device may be advanced by the robotic system using medium steps (e.g., 1-3 inch steps) or large steps (e.g., greater than 3 inch steps).

The cassettes and/or tools described herein may be disposable or reusable or used and cleaned for a limited number of cycles.

The linear slides described herein can, in some examples, be U-shaped with a corresponding U-shaped tract. Alternatively, the linear slides can, in some examples, be circular with a corresponding circular shaped tract.

In some examples, the tip of the outer rigidizing device can include one or more cameras to view the end effector of the tool used with a robotic system. This can allow a controller of the robotic system to calculate the relation between the control inputs and effector outputs and adjust accordingly to give the same effector motion regardless of the tooth path (e.g., regardless of drag placed on the tool control cables during bending).

Although the outer rigidizing device for the nested systems described herein is often referred to as rigidizing via vacuum and the inner scope rigidizing device as rigidizing via pressure, the opposite can be true (i.e., the outer rigidizing device can rigidize via pressure and the inner rigidizing device via vacuum) and/or both can have the same rigidizing source (pressure and/or vacuum).

Although the inner and outer elements of the nested systems are generally described as including integrated rigidizing elements, the rigidizing elements can be separate (e.g., so as to allow relative sliding between the imaging scope elements and the rigidizing elements).

The rigidizing devices of the nested systems described herein can be designed such that inner rigidizing device can't rotate substantially within outer rigidizing device when they are assembled. For instance, the outer surface of the inner rigidizing device can have longitudinal ridges and grooves that form a spline. The inner surface of the outer rigidizing device can have corresponding ridges and grooves that mate with the same features in the outer rigidizing device.

Either or both of the rigidizing devices of the nested systems described herein can be steerable. If both rigidizing devices are steerable, an algorithm can be implemented that steers whichever rigidizing device is flexible and moving longitudinally. The algorithm can steer the flexible rigidizing device to anticipate the shape of the rigidized device thus minimizing the tendency for the moving, flexible rigidizing device to straighten the rigid device.

If one rigidizing device of the nested systems described herein requires vacuum and the other rigidizing device requires pressure, user controls can be constructed in which moving one vs. the other (outer and inner) involves flipping a switch, with the switch toggling between a first condition in which, for example, one is pressurized for rigidity when the other is vented for flexibility and a second condition in which one is vented for flexibility and the other is vacuumed for stiffness. This, for example, could be a foot pedal or a hand switch.

In some examples, the alternate movement of the nested systems described herein can be controlled manually. In other examples, the alternate movement can be controlled automatically, via a computer and/or with a motorized motion control system.

The nested systems described herein can advantageously be of similar stiffness. This can ensure that the total stiffnesses of the nested system is relatively continuous. The nested systems described herein can be small so as to fit in a variety of different anatomies. For example, for neurology applications, the outside diameter of the system can be between 0.05"-0.15", such as approximately 0.1". For cardiology applications, the outside diameter of the system can be between 0.1"-0.3", such as approximately 0.2". For gastrointestinal applications, the outside diameter of the system can be between 0.3"-1.0", such as 0.8". Further, the nested systems described herein can maintain high stiffness even at a small profile. For example, the change in relative stiffness from the flexible configuration to the rigid configuration can be multiples of 10×, 20×, 30×, and even larger. Additionally, the nested systems described herein can advantageously move smoothly relative to one another.

The nested systems described herein can advantageously navigate an arbitrary path, or an open, complex, or tortuous space, and create a range of free-standing complex shapes. The nested systems can further advantageously provide shape propagation, allowing for shape memory to be imparted from one element to another. In some examples, periodically, both tubes can be placed in a partially or fully flexible state such that, for instance, the radii or curvature of the system increases, and the surrounding anatomy provides support to the system. The pressure or vacuum being used to rigidize the tubes can be reduced or stopped to place the tubes in a partially or fully flexible state. This momentary relaxation (for instance, for 1-10 seconds) may allow the system to find a shape that more closely matches the anatomy it is travelling through. For instance, in the colon, this relaxation may gently open tight turns in the anatomy.

In some examples, the stiffness capabilities of the inner or outer rigidizing devices may be designed such that tight turns formed by the inner rigidizing device at its tip, when copied by the outer rigidizing device, are gradually opened up (made to have a larger radius) as the shape propagates proximally down the outer tube. For instance, the outer rigidizing device may be designed to have a higher minimum radius of curvature when rigidized.

The nested systems are continuous (i.e., non-segmented) and therefor provide smooth and continuous movement through the body (e.g., the intestines). The nested systems can be disposable and low-cost.

In some examples, the outer rigidizing device can be a dynamically rigidizing overtube (e.g., as described in PCT/US18/42946, the entirety of which is incorporated by reference herein). In some examples, the inner rigidizing device can be a rigidizing system or a commercially available scope, for example a 5 mm diameter nasal scope. Utilizing rigidization and a nested system enables the utilization of a smaller scope that delivers, compared to a duodenoscope, more flexibility if desired, more stiffness if desired, enhanced maneuverability, and the ability to articulate at a much smaller radius of curvature.

In some examples, upon reaching the target destination, the inner rigidizing device of a nested system can be withdrawn. The outer rigidizing device can remain rigidized and contrast can be injected through the inner element's space to fluoroscopically image.

RF coils can be used in any of the nested systems described herein to provide a 3-D representation of whatever shape the nested system takes. That representation can be used to re-create a shape or return to a given point (e.g., for reexamination by the doctor after an automated colonoscopy).

In some examples, the nested systems described herein can be useful as a complete endoscope, with the internal structure carrying the payload of working channels, pressurization lines, vacuum lines, tip wash, and electronics for lighting and imaging (vision systems, ultrasound, x-ray, MRI).

The nested systems described herein can be used, for example, for colonoscopy. Such a colonoscopy nested system can reduce or eliminate looping. It could eliminate the need for endoscopic reduction. Without looping, the procedure can combine the speed and low cost of a sigmoidoscopy with the efficacy of a colonoscopy. Additionally, colonoscopy nested systems can eliminate conscious sedation and its associated costs, time, risks, and facility requirements. Further, procedural skill can be markedly reduced for such colonoscopy procedures by using the nested systems described herein. Further, in some examples, the nested systems described herein can provide automated colonoscopy, wherein a vision system automatically drives the nested system down the center of the colon while looking for polyps. Such an automated system would advantageously not require sedation nor a doctor for the basic exam while allowing the doctor to follow up for further examination if required.

It should be understood that any feature described herein with respect to one example can be combined with or substituted for any feature described herein with respect to another example. For example, the various layers and/or features of the rigidizing devices described herein can be combined, substituted, and/or rearranged relative to other layers.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various examples have been described and/or illustrated herein in the context of fully functional computing systems, one or more of these example examples may be distributed as a program product in a variety of forms, regardless of the particular type of computer-readable media used to actually carry out the distribution. The examples disclosed herein may also be implemented using software modules that perform certain tasks. These software modules may include script, batch, or other executable files that may be stored on a computer-readable storage medium or in a computing system. In some examples, these software modules may configure a computing system to perform one or more of the example examples disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some examples one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one example, the features and elements so described or shown can apply to other examples. It will also be appreciated by those of skill in the art that references to a structure or feature that is disposed "adjacent" another feature may have portions that overlap or underlie the adjacent feature.

Terminology used herein is for the purpose of describing particular examples only and is not intended to be limiting of the invention. For example, as used herein, the singular forms "a", "an" and "the" are intended to include the plural forms as well, unless the context clearly indicates otherwise. It will be further understood that the terms "comprises" and/or "comprising." when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately." even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A nested robotic system, comprising:
a first rigidizing device;
a second rigidizing device positioned radially within the first rigidizing device and including a plurality of cables configured to steer a distal end of the second rigidizing device, wherein the second rigidizing device is axially slideable relative to the first rigidizing device; and
a controller configured to perform an automatic shape copying procedure to alternately translate the first rigidizing device and the second rigidizing device and to alternately rigidize the first rigidizing device and the second rigidizing device, wherein the controller is further configured to adjust a tension on the cables to compensate for unintended deflection of the distal end caused by the first rigidizing device sliding thereover, wherein the controller is configured to receive an indicator of tension in one or more of the plurality of cables and to adjust the tension on the cables based on the indicator of tension.

2. The nested robotic system of claim 1, wherein the second rigidizing device comprises a camera at a distal end thereof, and wherein the controller is configured to adjust the tension based upon an image from the camera.

3. The nested robotic system of claim 1, wherein the controller is configured to move the unrigidized first rigidizing device over the rigidized second rigidizing device to a preset or sensor-determined position relative to the second rigidizing device.

4. The nested robotic system of claim 1, wherein the controller is configured to terminate movement of the unrigidized first rigidizing device over the rigidized second rigidizing device if a preset or sensor-determined position relative to the second rigidizing device is reached.

5. The nested robotic system of claim 1, wherein the controller is configured to unrigidize the first rigidizing device by fully unrigidizing the first rigidizing device.

6. The nested robotic system of claim 1, wherein the controller is configured to articulate at least one actuator to move and/or steer the second rigidizing device.

7. The nested robotic system of claim 1, wherein the first and second rigidizing devices are configured to be rigidized by the application of pressure.

8. The nested robotic system of claim 6, wherein the at least one actuator comprises at least one cable, and wherein the controller is further configured to adjust a tension on the at least one cable to compensate for unintended deflection of a distal end caused by the first rigidizing device sliding thereover.

9. The nested robotic system of claim 8 further comprising a tension sensor configured to detect a tension in the at least one cable, wherein the controller is configured to adjust the tension based upon an output from the tension sensor.

10. The nested robotic system of claim 8, wherein the second rigidizing device comprises a camera at a distal end thereof, and wherein the controller is configured to adjust the tension based upon an image from the camera.

11. The nested robotic system of claim 8, wherein the controller is further configured to limit a tension on the at least one cable to less than a threshold amount to reduce unintended deflection of the first rigidizing device as the second rigidizing device is slid therethrough.

12. The nested robotic system of claim 1, wherein a diameter of the first rigidizing device is tapered from a larger diameter at a proximal end of the first rigidizing device to a smaller diameter at a distal end of the first rigidizing device.

13. A nested robotic system, comprising:
- a first rigidizing device;
- a second rigidizing device positioned radially within the first rigidizing device and including a plurality of cables configured to steer a distal end of the second rigidizing device, wherein the second rigidizing device is axially slideable relative to the first rigidizing device;
- a sensor configured to emit an output indicating a tension in one or more of the plurality of cables and
- a controller configured to perform an automatic shape copying procedure to alternately translate the first rigidizing device and the second rigidizing device and to alternately rigidize the first rigidizing device and the second rigidizing device, wherein the controller is further configured to adjust a tension on the cables based upon an output from the sensor to compensate for unintended deflection of the distal end caused by the first rigidizing device sliding thereover.

* * * * *